(12) United States Patent
Hatemata et al.

(10) Patent No.: US 6,658,303 B2
(45) Date of Patent: Dec. 2, 2003

(54) PROGRAM TIMER

(75) Inventors: Takeshi Hatemata, Osaka (JP); Yuichi Yoshimura, Osaka (JP)

(73) Assignee: Matsushita Electric Works, Ltd., Kadoma (JP)

( * ) Notice: Subject to any disclaimer, the term of this patent is extended or adjusted under 35 U.S.C. 154(b) by 473 days.

(21) Appl. No.: 09/736,144

(22) Filed: Dec. 15, 2000

(65) Prior Publication Data

US 2001/0014832 A1 Aug. 16, 2001

(30) Foreign Application Priority Data

Dec. 15, 1999 (JP) .................................. P. 11-356549
Jun. 30, 2000 (JP) .................................. P. 2000-199917

(51) Int. Cl.[7] .............................................. G05B 11/01
(52) U.S. Cl. .............................. 700/14; 700/9; 700/15; 700/16; 700/18; 700/23; 700/86; 713/400; 713/500; 713/502; 713/600; 713/601
(58) Field of Search ................................ 700/9, 14, 15, 700/16, 18, 23, 86, 87; 713/400, 500, 502, 600, 601

(56) References Cited

U.S. PATENT DOCUMENTS

| | | | | |
|---|---|---|---|---|
| 4,396,976 A | * | 8/1983 | Hyatt | 700/1 |
| 4,479,123 A | * | 10/1984 | Loskorn et al. | 379/357.04 |
| 4,686,641 A | * | 8/1987 | Evans | 702/122 |
| 5,481,507 A | * | 1/1996 | Suzuki et al. | 368/200 |
| 6,339,429 B1 | * | 1/2002 | Schug | 345/589 |

FOREIGN PATENT DOCUMENTS

JP        2-144604        6/1990

* cited by examiner

Primary Examiner—Ramesh Patel
(74) Attorney, Agent, or Firm—Oblon, Spivak, McClelland, Maier & Neustadt, P.C.

(57) ABSTRACT

A timer processing section 10 instructs a transmission processing section 11 to control load in accordance with a time schedule stored in a program storage section 12. The transmission processing section 11 is connected to a two-wire signal line and gives a load control instruction to each terminal to which load is connected according to a time-division multiplex transmission system. The time schedule stored in a program storage section 12 is a set of the address related to the load to be controlled and the control contents and the control time of the load. Therefore, when the time set according to the time schedule is reached, the load specified by the address is controlled.

19 Claims, 34 Drawing Sheets

FIG.5

| NO. | CONTROL MODE | OBJECT | ON TIME | OFF TIME | CONTROL INTERVAL | CONTROL DAY |
|---|---|---|---|---|---|---|
| 1 | ONE TIME | INDIVIDUAL 63-4 | 7:00 | 17:00 | --:-- | MONDAY TO FRIDAY |
| 2 | ONE TIME | P72 | 12:00 | --:-- | --:-- | MONDAY TO FRIDAY |
| 3 | ONE TIME | G127 | 5:00 | 20:00 | --:-- | MONDAY TO FRIDAY SPECIAL DAY1 |
| 4 | ONE TIME | P1 | 17:00 | --:-- | --:-- | SAT.SUN SPECIAL DAY2 |
| 5 | REPEAT | INDIVIDUAL 12-3 | 17:00 | 20:00 | 0H30M | MONDAY TO FRIDAY |
| 6 | REPEAT | P33 | 21:00 | 2:00 | 1H00M | MONDAY TO FRIDAY SAT.SUN SPECIAL DAY1 SPECIAL DAY2 |
| ... | ... | ... | | | | |
| 30 | ----- | --- | | | -H--M | |

| OPERATION ADDRESS BY TIME ZONE | CONTROL ADDRESS BY TIME ZONE | CONTROL TIME |
|---|---|---|
| INDIVIDUAL 0-1 | G1 | 0:00~8:00<br>18:00~24:00 |
| | G2 | 8:00~18:00 |

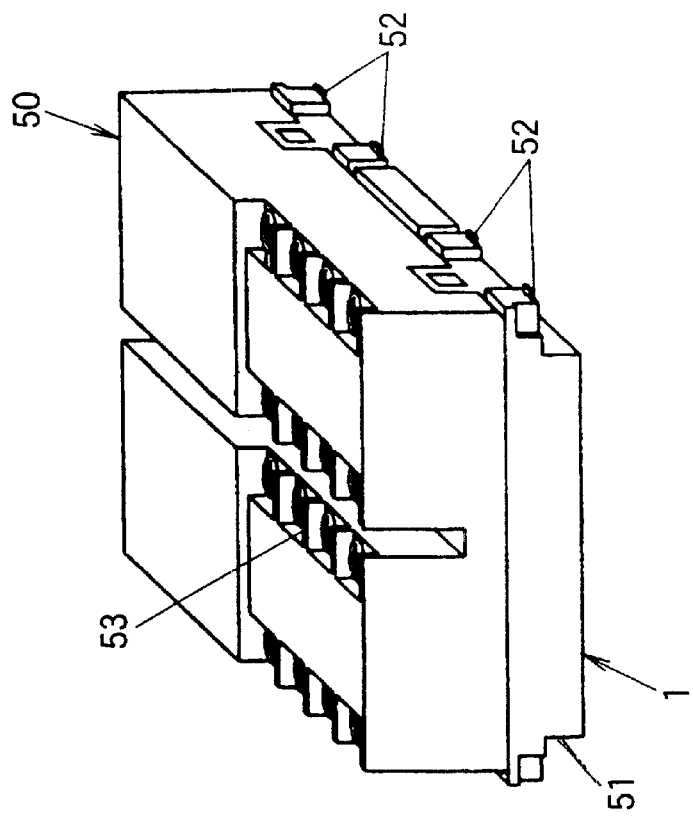
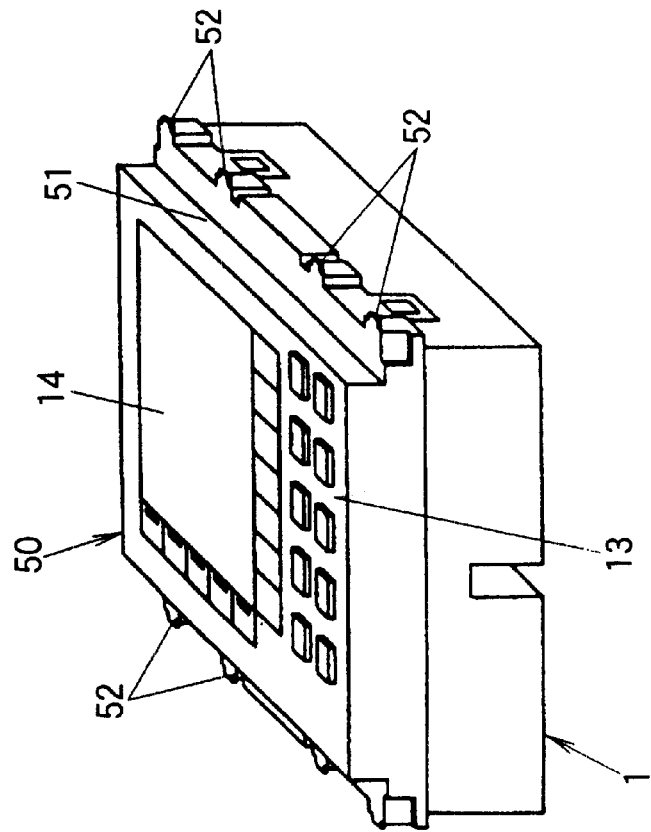
FIG.12(a)
FIG.12(b)

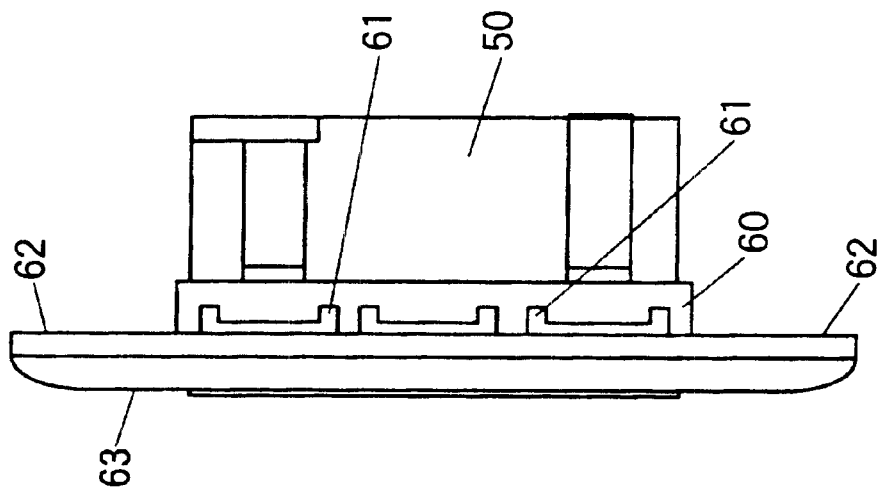
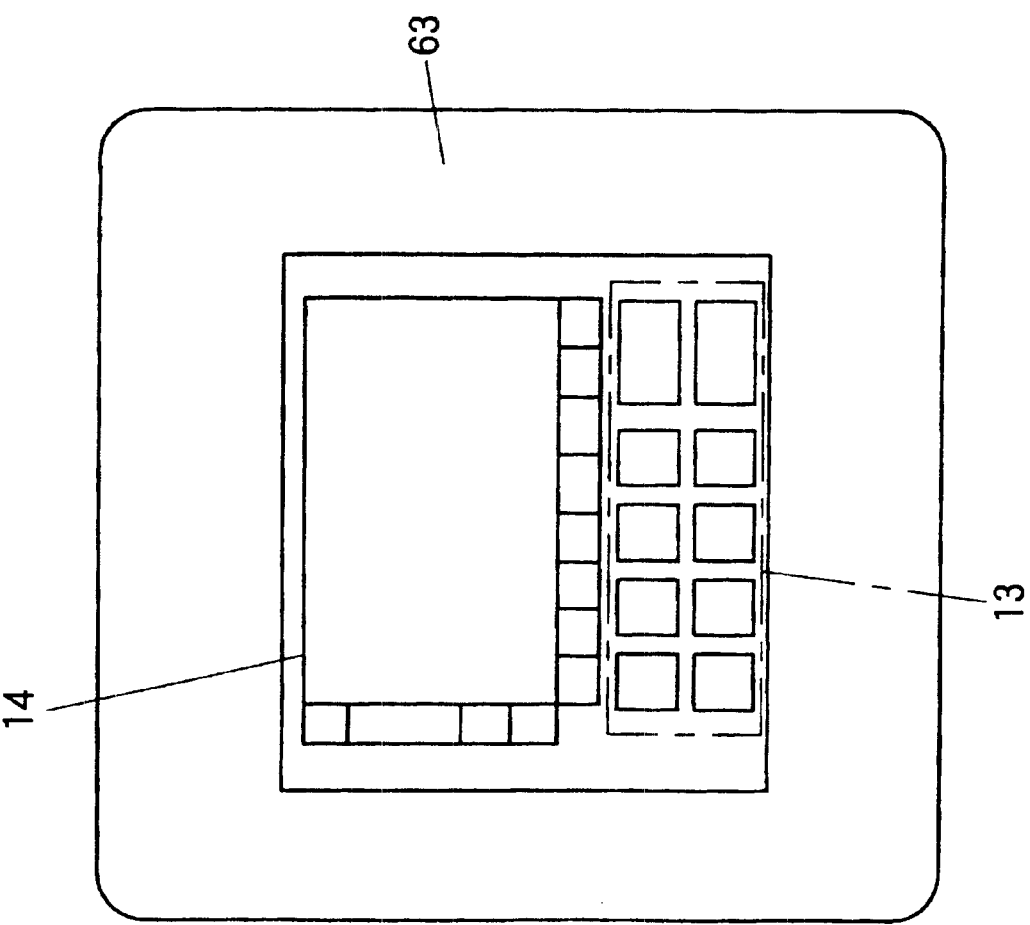

FIG.34

| PROGRAM NO. | CONTROL MODE | CONTROL TYPE | ON TIME | OFF TIME | INTER-VAL | CONTROL DAYS | |
|---|---|---|---|---|---|---|---|
| 1 | NORMAL | P2 | 8:30 | --:-- | --- | MON TUE WED THU FRI | SPECIAL DAY2 |
| 2 | NORMAL | P1 | 9:00 | --:-- | --- | MON TUE WED THU FRI | SPECIAL DAY2 |
| 3 | REPETITION | P3 | 12:00 | 12:30 | 0H30M | MON TUE WED THU FRI | |
| 4 | NORMAL | P1 | 13:00 | --:-- | --- | MON TUE WED THU FRI | |
| 5 | REPETITION | P2 | 18:00 | 19:00 | 1H00M | MON TUE WED THU FRI | |
| 6 | REPETITION | P4 | 20:00 | 24:00 | 1H00M | MON TUE WED THU FRI | |
| 7 | REPETITION | P4 | 7:00 | 24:00 | 1H00M | SAT SUN SPECIAL DAY1 | |
| 8 | REPETITION | P4 | 12:00 | 24:00 | 1H00M | | SPECIAL DAY2 |

PROGRAM TIMER

BACKGROUND OF INVENTION

1. Field of Invention

This invention relates to a program timer unit used with a remote supervisory control system wherein a transmission signal is transmitted to a signal line according to a time-division multiplex transmission system and load control responsive to supervisory input can be performed using the transmission signal, and more particularly to a program timer unit in a remote supervisory control system for controlling loads in accordance with control programs in which weekly and yearly load control setup times, time schedule, control contents, etc., are set.

2. Related Art

A program timer generally for storing a time schedule and controlling load when the current time counted by an internal clock section matches the time set as the time schedule is provided (JP-A-2-144604). This kind of program timer is adapted to turn on/off an output contact in accordance with a time schedule and can control as many loads as the number of circuits responsive to the number of output contacts.

JP-A-2-144604 discloses an art of using a program timer in a remote supervisory control system for connecting terminals by a two-wire signal line by adopting a time-division multiplexing control system (the remote supervisory control system will be discussed in [Mode for Carrying out the Invention]), and output contracts for eight circuits provided in the program timer are used as supervisory input of each terminal. Therefore, the output contacts of the program timer are handled equivalently to switches and it is made possible to control loads in accordance with the time schedule of the program timer.

That is, as shown in FIG. 25, a program timer 1 as supervisory input is connected to a terminal 32 connected to a signal line Ls in a remote supervisory control system. In the figure, power supply of the terminal 32 is provided by stepping down the voltage of commercial power supply AC with a transformer 34.

By the way, as described above, to control loads in accordance with the time schedule of the program timer 1 in the remote supervisory control system, a separate terminal 32 for receiving as many supervisory inputs as the number of circuits of output contacts is required and moreover as many lines as the number of circuits need to be connected between the program timer 1 and the terminal 32 and thus construction work is cumbersome. Since the number of circuits of loads that can be controlled by the program timer 1 is limited by the number of circuits of output contacts, the number of circuits of loads to be controlled cannot be increased; in contrast, if the number of circuits of loads to be controlled is less than the number of circuits of output contacts, the output contacts become fruitless.

The program timer described in JP-A-2-144604 gives only supervisor input to the remote supervisory control system and cannot receive an instruction from the remote supervisory control system and thus an instruction cannot be given to the program timer 1 unless an operation section of the program timer 1 is operated. For example, if a holiday time schedule is to be selected, the program timer 1 must be operated and cannot be given an instruction for selecting the holiday time schedule from the remote supervisory control system. Further, to temporarily stop control of the program timer 1 or use control of the program timer 1 for any other control than the time schedule, the program timer 1 must also be operated. Moreover, the program timer 1 often is installed in a console and thus the operator cannot operate the program timer 1 unless he or she goes to the console installation location and opens the console; operating the program timer 1 consumes labor and time.

SUMMARY OF INVENTION

It is therefore the main object of the invention to provide a program timer not requiring any additional terminal for connecting to a remote supervisory control system and enabling the number of circuits of loads to be set to any desired number and it is another object of the invention to provide a program timer for enabling various instructions to be given with transmission signals in conjunction with a remote supervisory control system.

Another object of the invention to provide a program timer unit in a remote supervisory control system for making it possible to reduce costs and the installation space.

According to the first aspect of the present invention, there is provided a program timer used with a remote supervisory control system wherein a plurality of terminals comprising unique addresses are connected to a signal line and a transmission signal is transferred according to a time-division multiplex transmission system between a transmission unit connected to the signal line and the terminals and load connected to another terminal can be controlled in response to supervisory input to one of the terminals using the address correspondence, the program timer comprising a program storage section for storing a set of the address related to the load to be controlled and the control contents and the control time of the load as a time schedule, a setting and operation section for setting the control contents and the control time by address and setting a time schedule in the program storage section, a clock section for counting the current time, and a signal processing section, when the control time in each time schedule stored in the program storage section matches the current time counted by the clock section, for functioning as a terminal with the control contents in the time schedule as supervisory input with the address in the time schedule as the address. Since the program timer comprises the signal processing section that can be connected to the signal line connected to the transmission unit, it can be connected directly to the signal line and can control a plurality of loads only with a set of terminals to connect to the signal line regardless of the number of the loads to be controlled (in the embodiment, the signal line is a two-wire line and thus a pair of terminals is only needed). In addition, an additional terminal formerly required becomes unnecessary and consequently, the construction work is facilitated and the flexibility of load control is enhanced.

According to a second aspect of the present invention, in the first aspect of the present invention, time schedules corresponding to a plurality of days are stored in the program storage section on a daily basis, a basic time schedule repeatedly used and a special-day time schedule other than the basic time schedule can be set as the time schedules, and the program timer further includes a special-day specification terminal to which external contact input of no voltage can be connected for specifying which of the basic time schedule and the special-day time schedule is to be used. An appropriate external contact input is connected to the special-day specification terminal, whereby use of the special-day time schedule can be specified from a different location from the installation location of the program timer.

According to the third aspect of the present invention, in the first aspect of the present invention, time schedules corresponding to a plurality of days are stored in the program storage section on a daily basis, a basic time schedule repeatedly used and a special-day time schedule other than the basic time schedule can be set as the time schedules, and the signal processing section comprises a schedule mode flag for specifying which of the basic time schedule and the special-day time schedule is to be used, wherein when the address of a transmission signal transmitted via the signal line matches the address related to the schedule mode flag, the signal processing section switches the schedule mode flag in response to the control contents of the transmission signal. Use of the special-day time schedule can be specified from a different location from the installation location of the program timer by relating to the terminal connected to the signal line.

According to a fourth aspect of the present invention, in the first aspect of the present invention, time schedules corresponding to a plurality of days are stored in the program storage section on a daily basis, a basic time schedule repeatedly used and a special-day time schedule other than the basic time schedule can be set as the time schedules, the signal processing section comprises a schedule mode flag for specifying which of the basic time schedule and the special-day time schedule is to be used, and if the schedule mode flag is set so as to specify the special-day time schedule before the current time counted by the clock section reaches a specific time, the signal processing section automatically switches the schedule mode flag to setting of indicating the basic time schedule at the specific time. The time schedule can be automatically restored to the basic time schedule on the day following use of the special-day time schedule only for one day and if the user forgets about in releasing the special-day time schedule temporarily used, the time schedule can be restored to the basic time schedule on the next day; convenience is enhanced.

According to a fifth aspect of the present invention, the program timer further includes a timer control stop terminal to which external contact input of no voltage can be connected for selecting load control based on the time schedule or stopping the load control based on the time schedule. It is made possible to specify whether or not control based on the time schedule is to be performed from a different location from the installation location of the program timer.

According to a sixth aspect of the present invention, in the first aspect of the present invention, the signal processing section comprises a control mode flag for selecting load control based on the time schedule or stopping the load control based on the time schedule and when the address of a transmission signal transmitted via the signal line matches the address related to the control mode flag, the signal processing section switches the control mode flag in response to the control contents of the transmission signal. Whether or not use of the time schedule is required can be specified from a different location from the installation location of the program timer by relating to the terminal connected to the signal line.

According to a seventh aspect of the present invention, in the first aspect of the present invention, the signal processing section comprises a control mode flag for selecting load control based on the time schedule or stopping the load control based on the time schedule and if the control mode flag is set so as to specify stopping the load control based on the time schedule before the current time counted by the clock section reaches a specific time, the signal processing section automatically switches the control mode flag to setting of specifying the load control based on the time schedule at the specific time. If the load control based on the time schedule is temporarily stopped, the mode can be automatically restored to the load control mode using the time schedule on the next day and if the user forgets about in releasing after temporarily stopping the load control based on the time schedule, the mode can be automatically restored to the mode using the time schedule on the next day; convenience is enhanced.

According to an eighth aspect of the present invention, in the first aspect of the present invention, when the address of a transmission signal transmitted via the signal line matches the address set as a synchronous address, the signal processing section instructs the clock section to adjust the current time to a stipulated time. The transmission signal transmitted via the signal line can be used to adjust the time in the clock section and it is made possible to adjust the time in synchronization with another clock. Therefore, when a plurality of program timers exist on the signal line, it is made possible to almost match the times in the clock sections of the program timers for setting almost the same load control timing.

According to a ninth aspect of the present invention, the program timer further includes a program-by-time-zone storage section for storing a set of one operation address by time zone related to a terminal receiving supervisory input, at least one control address by time zone related to the load to be controlled, and a time zone using the control address by time zone as time zone control data and when the address of a transmission signal transmitted via the signal line matches the operation address by time zone, the signal processing section functions as a terminal with the control contents specified by the supervisory input as supervisor input with the control address by time zone paired with the operation address by time zone as the address in the time zone containing the current time counted by the clock section and if either of the operation address by time zone and the control address by time zone is unset, the signal processing section does not function as a terminal. It is made possible to change the load to be controlled in response to the time zone. For example, with a plurality of illumination loads as loads, it is made possible to control in such a manner that all illumination loads are to be controlled in the daytime and 80% of the illumination loads are to be controlled in the nighttime.

According to a tenth aspect of the present invention, according to the first aspect of the present invention, the setting and operation section has a function of setting the number of repetitions and the time interval of placing the load in the same control state as a time schedule. A time schedule with comparatively less data is simply set, whereby the load can be controlled repeatedly in the same state. For example, when illumination loads are to be controlled, if a time schedule is set so as to turn off the illumination loads every given time, if the user turns on the illumination load after the illumination loads are turned off at the control on time, the operation of again turning off the illumination loads in the setup time interval after the illumination loads are first turned off is repeated; the user can be urged to go away from the workplace and can be prevented from forgetting about in turning off the illumination loads.

According to an eleventh aspect of the present invention, the program timer further includes a daylight saving time terminal to which external contact input of no voltage can be connected for selecting a mode of advancing the current time counted by the clock section by a given time or a mode of restoring the time to the former time mode. It is made possible to specify the transition to the daylight saving time from a different location from the installation location of the program timer.

According to a twelfth aspect of the present invention, the program timer further includes a daylight saving time flag for selecting a mode of advancing the current time counted by the clock section by a given time or a mode of restoring the time to the former time mode, wherein when the address of a transmission signal transmitted via the signal line matches the daylight saving time address related to the daylight saving time flag, the signal processing section switches the daylight saving time flag in response to the control contents of the transmission signal. It is made possible to specify the transition to the daylight saving time from a different location from the installation location of the program timer by relating to the terminal connected to the signal line.

According to a thirteenth aspect of the present invention, a program timer unit used with a remote supervisory control system wherein an operation terminal and a control terminal each having a unique address are connected to transmission unit via a two-wire signal line, data is transmitted and received with a time-division multiplex transmission signal, the transmission unit sends a transmission signal containing address data to the signal line, thereby accessing the operation terminal and the control terminal separately, and upon reception of supervisory data from the operation terminal with supervisory input in a signal return period set in synchronization with the transmission signal, the transmission unit generates control data based on the supervisory input and transmits the control data to the control terminal having preset address correspondence with the operation terminal generating the supervisory data for controlling load connected to the control terminal, the program timer unit comprises input means for inputting data containing load control time and control contents, program creation means for creating a load control program based on the data input through the input means, storage means for storing the created control program, clock means for counting the current time, transmission signal transmission-reception means for transmitting and receiving a transmission signal to and from the transmission unit via the signal line, and timer control means for generating supervisory data in sequence based on the current time data output from the clock means and the control program read from the storage means and causing the transmission signal transmission-reception means to send the generated supervisory data to the signal line. The supervisory data generated in sequence by the timer control means can be sent through the transmission signal transmission-reception means to the transmission unit via the signal line. Thus, the need for using a contact input terminal is eliminated, and costs and the installation space can be reduced.

According to a fourteenth aspect of the present invention, the program timer unit comprises a cabinet housing the means, the cabinet being formed as dimensions corresponding to dimensions of circuit breaker for agreement type wiring for light distribution panelboard. Since the dimensions of the cabinet correspond to the dimensions of circuit breaker for agreement type wiring for light distribution panelboard, the cabinet (program timer unit) can be easily disposed at an off-the-shelf distribution panelboard, etc., corresponding to the dimensions of the circuit breaker for agreement type wiring for light distribution panelboard.

According to a fifteenth aspect of the present invention, the program creation means creates a weekly program in which the load control time and control contents are set for each day of the week and a special-day program in which the load control time and control contents are set for special date and time. Different control times and control contents can be set for each day of the week according to the weekly program and for a special day such as a holiday, a special-day program can be created for setting different control times and control contents from those on usual days of the week; administration of the system can be facilitated.

According to a sixteenth aspect of the present invention, the program timer unit further includes display means for displaying at least items of data that can be input through the input means. Since the operator can enter data while seeing the display means, the data entry work through the input means is facilitated.

According to a seventeenth aspect of the present invention, the data of sunset times and sunrise times for each district is stored in the storage means and the program creation means reads the data of the sunset times and the sunrise times in the district specified through the input means from the storage means and creates a control program based on the read data. It is made possible to perform load control responsive to the sunrise time and the sunset time without adding any other machine such as a brightness sensor and costs and the installation space can be reduced. Moreover, simply by specifying a district through the input means, a control program responsive to the sunrise time and the sunset time in the district is created, so that the ease-of-use of the program timer unit is improved.

According to an eighteenth aspect of the present invention, the Japan area is divided into a plurality of districts and data of yearly sunset times and sunrise times in each district is stored in the storage means. The ease-of-use of the program timer unit is more improved.

According to a nineteenth aspect of the present invention, the program timer unit further includes synchronous signal input/output means for inputting and outputting a time correction signal from and to the outside at least on the hour, wherein the current time of the clock means is corrected based on the time correction signal input from the synchronous signal input/output means on the hour. The precision of the current time counted by the clock means can be enhanced and the time lag can be prevented from occurring between the program timer unit and any other timer machine, for example.

BRIEF DESCRIPTION OF THE DRAWINGS

In the accompanying drawings:

FIG. 5 is a drawing to show a time schedule setting example in the embodiment of the invention;

FIG. 11A is a front view, FIG. 11B is a lower face view, and FIG. 11C is a side view;

FIGS. 12A and 12B show the appearance of another configuration example of the embodiment of the invention; FIG. 12A is a perspective view of the front and FIG. 12B is a perspective view of the rear;

FIGS. 13A and 13B show the appearance of the configuration example shown in FIGS. 12A and 12B; FIG. 13A is a front view and FIG. 13B is a side view;

FIG. 34 is a schematic representation to describe control programs in the embodiment of the invention;

DETAILED DESCRIPTION OF PREFERRED EMBODIMENTS

A programmable timer of an embodiment described below is suitable for use at places where a yearly event schedule is almost determined, such as offices and schools, and it is assumed that a yearly time schedule can be set in the program timer. However, if the program timer is a program timer for setting a daily or weekly time schedule, application of the technical philosophy of the invention is not hindered.

Figure 2:
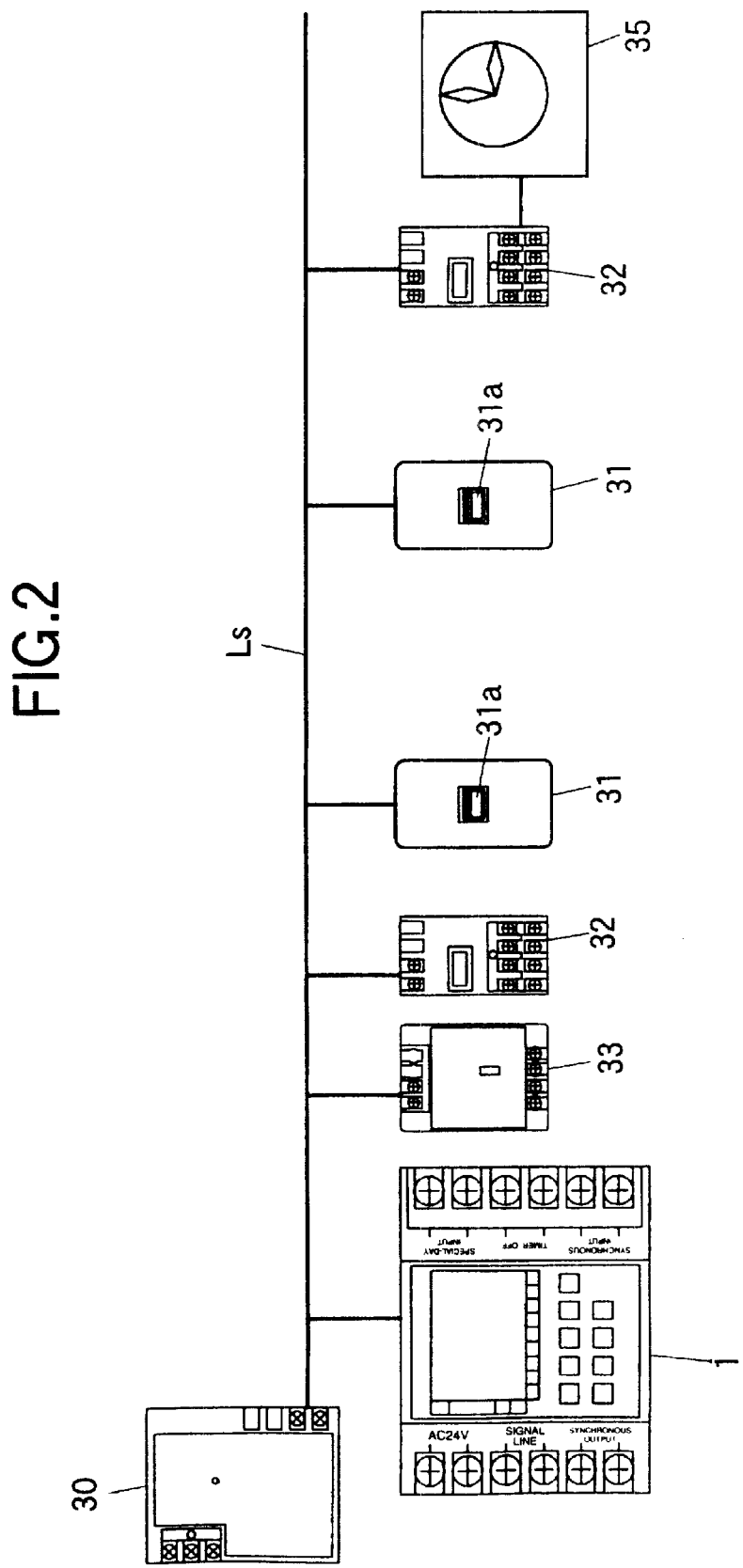
FIG. 2 is a drawing to show the use form of the embodiment of the invention.

A program timer 1 in the embodiment is connected to a signal line Ls in a remote supervisory control system for use, as shown in FIG. 2. Therefore, first the basic configuration of the remote supervisory control system will be discussed. The remote supervisory control system comprises a plurality of terminals 31 to 33 connected to a two-wire signal line Ls (multidrop connection) connected to a transmission unit 30. The terminal 31, 32 has a function of sending supervisory input to the transmission unit 30 upon reception of the supervisory input. The terminal 31 comprises a pushbutton switch 31a and accepts supervisory input in response to the push operation of the switch 31a. The terminal 32 comprises a terminal block 32a and accepts contact input from the outside connected to the terminal block 32a (contact on/off) as supervisory input. Therefore, the terminal 32 can receive sensor output of a brightness sensor for turning on or off output in response to the surrounding brightness or the like as supervisory input. The terminal 33, which is used for control, contains a relay and controls load (not shown) as the relay contact is opened or closed. The terminals 31 to 33 have their respective addresses set and the transmission unit 30 uses the addresses to uniquely identify the terminals 31 to 33. Generally, a latching-type relay is used as the relay and to operate the relay, the terminal 33 supplies pulse-like power to the relay. As the terminal 33, a terminal of the type for controlling an external remote control relay is also available.

Figure 3:
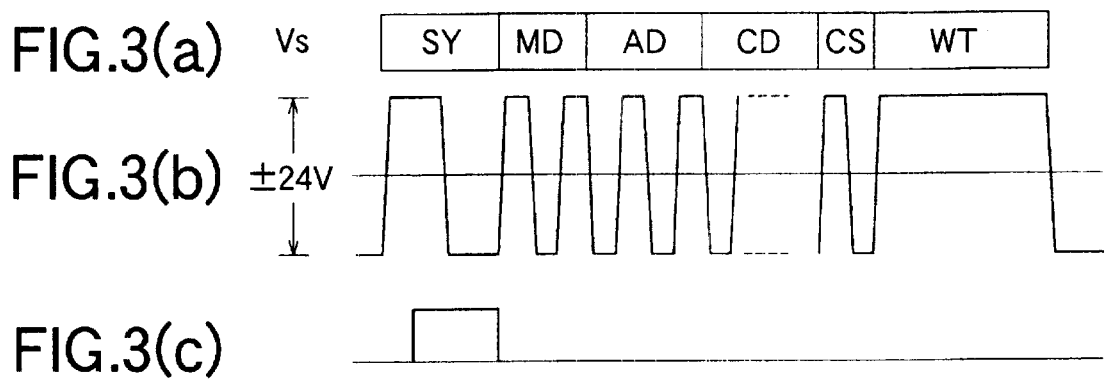
FIGS. 3 (a) to (c) are schematic representations of the operation of the embodiment of the invention.

The transmission unit 30 sends a transmission signal Vs in a format shown in FIG. 3A to the signal line Ls. That is, the signal is a hyperbolic (±24 V) time-division multiplex signal consisting of a synchronizing signal SY indicating the signal sending start, mode data MD indicating the mode of the transmission signal Vs, address data AD for calling the terminals 31 to 33 separately, control data CD for controlling illumination load L, check sum data CS for detecting a transmission error, and a signal return period WT, a time slot for receiving a return signal (supervisory data) from the terminals 31 to 33. Data is transmitted according to pulse width modulation (FIG. 3B). If the address data AD transmitted with the transmission signal Vs received via the signal line Ls matches the preset address, the corresponding terminal 31, 32, or 33 inputs the control data CD from the transmission signal Vs and returns supervisory data as a current mode signal (signal sent by short-circuiting the signal line Ls via proper low impedance) in the signal return period WT of the transmission signal Vs.

To transmit data from the transmission unit 30 to any desired one of the terminals 31 to 33, the transmission signal Vs with the mode data MD set to a control mode and the address of the corresponding terminal 31–33 as the address data AD is sent to the signal line Ls. Then, the terminal 31–33 having the address matching the address data AD receives the control data CD and returns supervisory data in the signal return period WT. The transmission unit 30 acknowledges that the control data CD has been transmitted to the desired terminal 31–33 based on the relationship between the sent control data CD and the supervisory data received in the signal return period WT. The terminal 33 generates a load control signal to control load in accordance with the received control data CD and the terminal 31 generates a supervisory signal to produce load operation check display in accordance with the received control data CD.

On the other hand, the transmission unit 30 sends the transmission signal Vs with the mode data MD set to a dummy mode at given time intervals at the normal time (constant polling). When supervisory input occurs in the terminal 31, 32, the terminal 31, 32 attempts to transmit occurrence of the supervisory input to the transmission unit 30. That is, the terminal 31, 32 generates an interrupt signal as shown in FIG. 3C in synchronization with the synchronizing signal SY of the transmission signal Vs with the dummy mode and at the same time, sets an interrupt flag for the subsequent transfer of information to and from the transmission unit 30. Upon reception of the interrupt signal, the transmission unit 30 sets the mode data MD to an interrupt polling mode and sends the transmission signal while increasing the high-order half bits of the address data AD (the high-order four bits if the address data AD consists of eight bits) in sequence. The terminal 31, 32 generating the interrupt signal returns the low-order half bits of the address to the transmission unit 30 in the signal return period WT when the high-order four bits of the address data AD of the transmission signal with the interrupt polling mode match the high-order four bits of the address set in the terminal 31, 32. Thus, the transmission unit 30 searches for the terminal 31, 32 generating the interrupt signal 16 at a time in batch, so that terminal 31, 32 can be found in a comparatively short time.

When the transmission unit 30 acquires the address of the terminal 31, 32 generating the interrupt signal, it sets the mode data MD to a supervisory mode and sends the transmission signal having the acquired address data AD to the signal line Ls. In response to the transmission signal, the terminal 31, 32 returns the information to be transmitted in the signal return period WT. Last, the transmission unit 30 sends a signal for giving an interrupt reset instruction to the terminal 31, 32 generating the interrupt signal for resetting the interrupt flag in the terminal 31, 32. The information transmission from the terminal 31, 32 to the transmission unit 30 is now complete as the transmission unit 30 transmits four signals (dummy mode, interrupt polling mode, supervisory mode, and interrupt reset) to the terminal 31, 32. To know the operation state of the terminal 33 to which load is connected, the transmission unit 30 may send the transmission signal with the mode data MD set to supervisory data.

For one terminal 31 to 33 to enable load control of a maximum of four circuits, a two-bit load number indicating each circuit uniquely is added to the address data AD. Hereinafter, the above-described addresses of the terminals 31 to 33 will be referred to as channels and the channel and the load number will be collectively called address. This means that each supervisory input and each load are given individual addresses. The supervisory inputs and loads in a one-to-one correspondence with each other are set to the same channel for easily understanding the correspondence (in fact, the operation side and the control side are distinguished from each other to the channel. For example, the high-order several bits of the address data represent the operation side or the control side and the low-order several bits are used as the channel).

By the way, in this kind of remote supervisory control system, the transmission unit 30 manages the correspondence between supervisory input and load addresses and thus if the addresses of loads of a plurality of circuits are related to the address of supervisory input of one circuit as related data in the transmission unit 30, the loads of a plurality of circuits can be controlled in batch with the supervisory input of one circuit. Such batch control includes group control and pattern control. In the group control, a plurality of loads are controlled to the same control state; in the pattern control, a plurality of loads are controlled to the previously separately setup control state. The group control and the pattern control are effective particularly for controlling illumination loads and can be used to turn on or off a plurality of illumination loads all together at a place where a large number of illumination loads are arranged, such as an office space. In contrast to the batch control, control wherein the load of one circuit is related to the supervisory input of one circuit in a one-to-one correspondence is called individual control. Each address in the individual control is represented in the format of channel-load number by combining channel and load number (for example 2-0), each address in the pattern control is represented in the format of P number (for example, P1), and each address in the group control is represented in the format of G number (for example, G3). In the individual control, supervisory input and load are set to the same address (channel-load number), whereby they correspond to each other in a one-to-one manner.

As described above, the addresses of the illumination loads L of a plurality of circuits need to be registered in relation to the address of the switch of the pattern switch in the transmission unit 30 to perform pattern control, and this kind of setting operation is referred to as pattern setting. This also applies to group control and therefore the setting operation for performing group control will be hereinafter called group setting.

Figure 26:
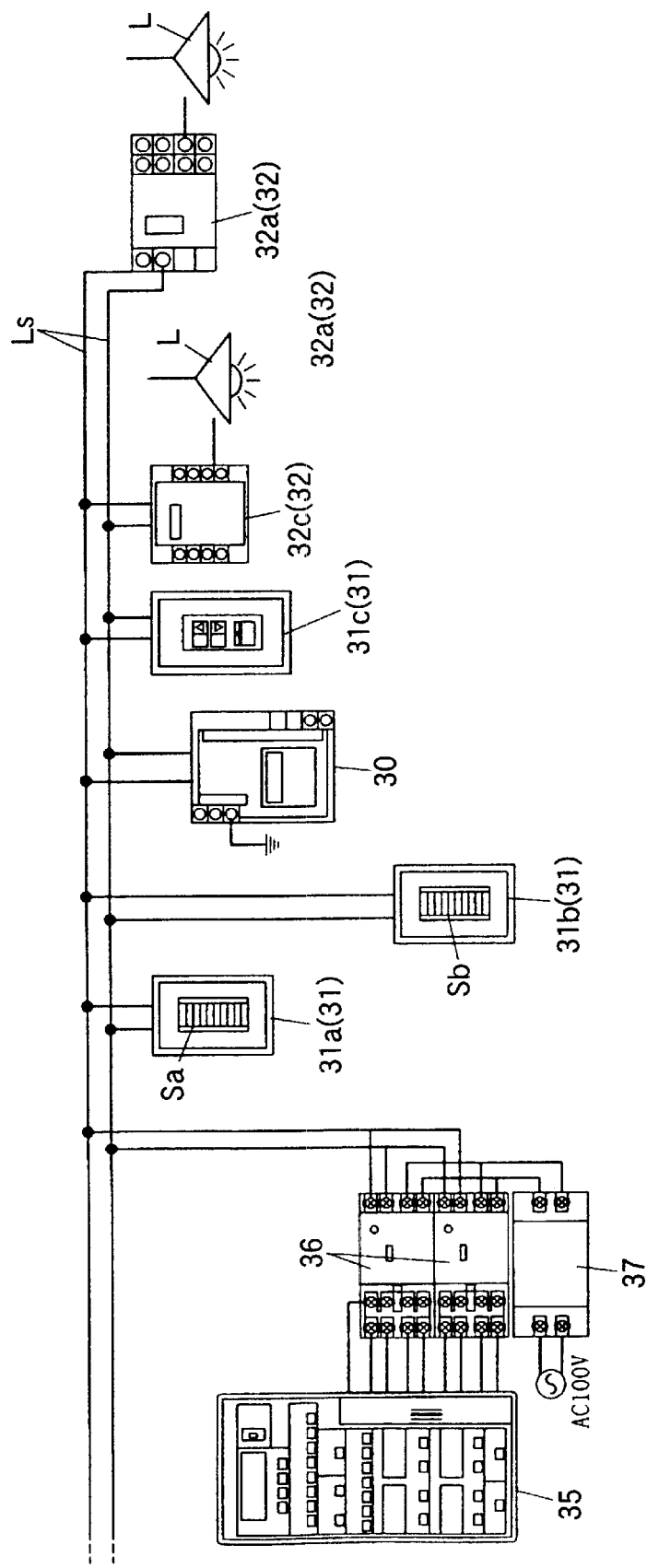
FIG. 26 is a system configuration diagram of a remote supervisory control system using an example in a related art.

By the way, as shown in FIG. 26, the remote supervisory control system has two operation modes of control mode for performing illumination loads L and setting mode for performing pattern setting and group setting. That is, when the remote supervisory control system is operated, the transmission unit 30 first enters the normal control mode and sends a transmission signal in a dummy mode to the signal line Ls. If an interrupt signal does not exist, the transmission unit 30 performs constant polling for repeatedly generating the transmission signal in the dummy mode. On the other hand, if an interrupt signal exists, the transmission unit 30 identifies the operation terminal 31 and inputs a request sent from the operation terminal 31. If a request for changing the operation mode is not made, the transmission unit 30 determines the current operation mode and if the current operation mode is the control mode, the transmission unit 30 controls the illumination load L; if the current operation mode is the setting mode, pattern setting or group setting is performed. When a request for changing the operation mode is made, the transmission unit 30 changes the operation mode in response to the request contents.

To perform pattern setting in the setting mode, the switch Sb of any desired pattern switch 31b is operated, next the switches Sa related to the illumination loads L to be controlled by the switch Sb are operated. Here, it is assumed that the relationship between the switches Sa and the illumination loads L is preset. According to the procedure, the state of each illumination load L responsive to the switch Sa operation is input to the transmission unit 30 as relation data and the states of a plurality of illumination loads L are related to one switch Sb. The group setting is also almost similar to the pattern setting.

On the other hand, in this kind of remote supervisory control system, a pattern setting unit (not shown), a kind of operation terminal 31, may be used. The pattern setting unit corresponds to one unit provided with a plurality of operation terminals 31 and comprises a large number of switches (for example, it comprises switches for 64 circuits and the switches can be switched by operating a separate switch so as to make it possible to operate four circuits for each switch. Therefore, 256 circuits can be operated). An address is assigned to each switch, whereby the switch can be used as a switch of any desired operation terminal 31.

To use the pattern setting unit, the switch assigned as the pattern switch is selected, then the control state of each illumination load L is set by operating the switch assigned as the discrete switch, and relation data is created and is transferred to the transmission unit 30. That is, the relation data can be created at the location where the pattern setting unit is installed, so that the job is facilitated as compared with the case where the discrete switch 31a and the pattern switch 31b are used for performing the pattern setting.

A dimming control terminal 32c containing a dimmer that can adjust light output of illumination load L, a dimming operation terminal 31c for specifying the dimming amount when the dimming control terminal 32c is used, and the like can be used as the terminals. Further, a control terminal with a motor-driven machine of a motor-driven curtain, a motor-driven shutter, etc., as a load and an operation terminal paired with the control terminal may be used.

By the way, in the remote supervisory control system in the related art described above, a program timer unit 35 for performing load control (timer control) for automatically turning on/off illumination loads L at a preset time may be installed instead of operating the discrete switch 31a and the pattern switch 31b for turning on/off the illumination loads L. A program for specifying the times turning on and off load control and the control contents of individual control, group control, pattern control, etc., for each day of the week for one week is recorded in the program timer unit 35 and the program setup time data is compared with the current time data and when they match, an internal output relay is opened/closed, whereby a contact signal of no voltage is output. The input terminals of contact input terminal 36 are connected to contact signal output terminals of the program timer unit 35 and the contact input terminal 36 transmits supervisory data responsive to the contact signal output from the program timer unit 35 to the transmission unit 30, which then transmits control data responsive to the supervisory data to the control terminal 32, whereby the load control responsive to the control contents of the program is performed at the setup time. A remotely-controlled transformer 37 for stepping down power supply 100 VAC to 24 V and supplying the operating voltage is connected to the program timer unit 35 and the contact input terminal 36.

Figure 1:
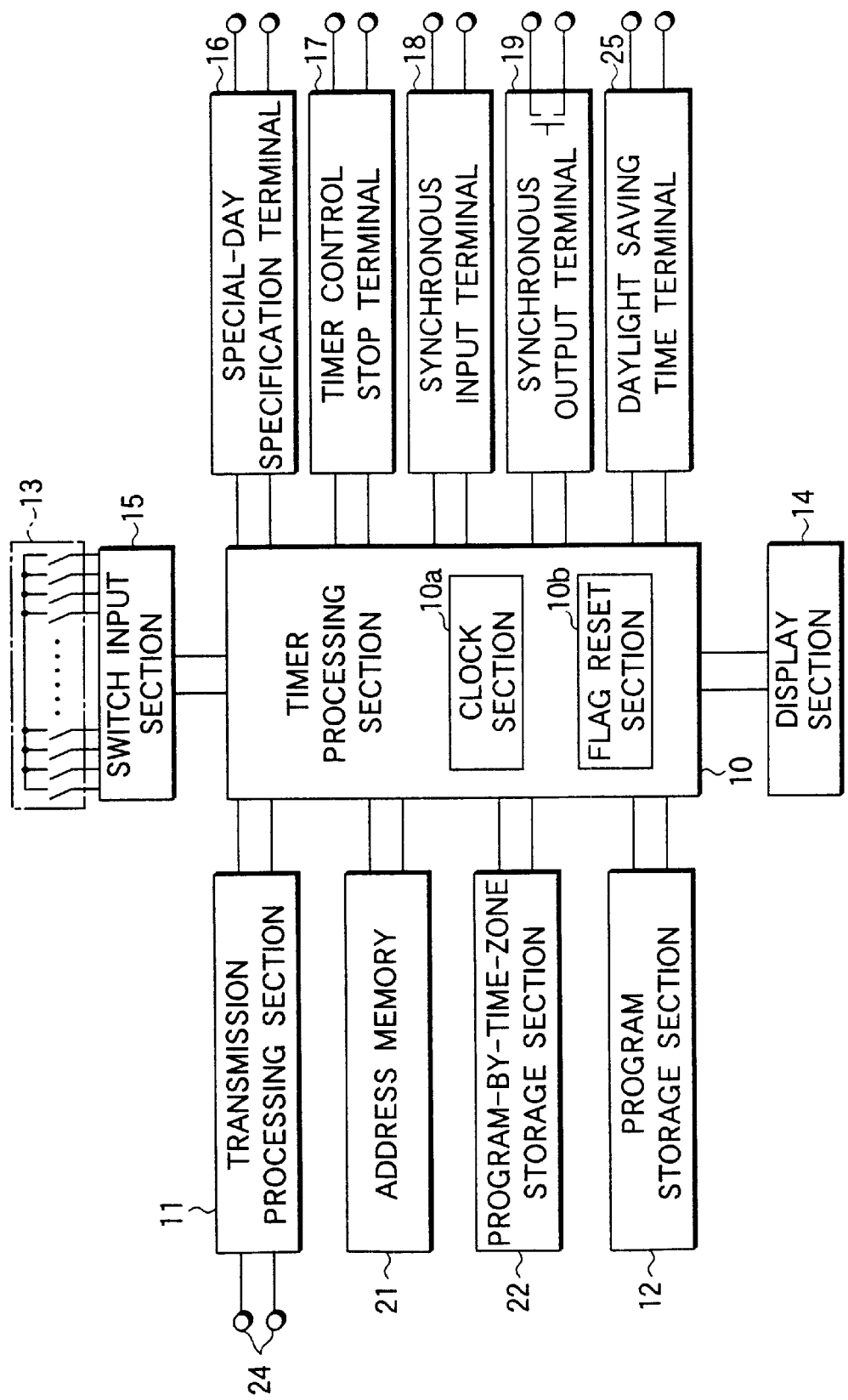
FIG. 1 is a block diagram to show an embodiment of the invention.

By the way, the program timer 1 of the invention has a configuration shown in FIG. 1 and comprises a transmission processing section 11 connected to the signal line Ls and functioning as a terminal of the remote supervisory control system. Upon reception of supervisory input generated in a timer processing section 10 (the timer processing section 10 and the transmission processing section 11 make up a signal processing section), the transmission processing section 11 generates an interrupt signal Vi like the terminal 32 and upon reception of a transmission signal Vs transmitted over the signal line Ls, the transmission processing section 11 gives various instructions based on the control data CD of the transmission signal Vs to the timer processing section 10. The basic operation of the timer processing section 10 is similar to that of a general program timer. A set of the load to be controlled and the control contents and control time of the load is previously stored in a program storage section 12 as a time schedule and when the current time counted by a clock section 10a provided in the timer processing section 10 (in the embodiment, years months days and hours minutes seconds are counted) matches the control time in the time schedule, the load specified in the time schedule is controlled according to the control contents. However, with the programmable timer in the related art, the load to be controlled is specified by the output terminal; in the embodiment, the load to be controlled is specified by the address in the time schedule and the timer processing section 10 gives the address together with the control contents to the transmission processing section 11. The transmission processing section 11 uses the address received from the timer processing section 10 to transfer a transmission signal. This means that the transmission processing section 11 uses the address received from the timer processing section 10 as the transmission address and operates like the terminal 32 with the control contents as supervisory input. If the correspondence between the supervisory input (terminal 31, 32) and the load (terminal 33) is preset in the transmission unit 30, the address corresponding to the address of the supervisory input is set as a time schedule, whereby the load corresponding to the supervisory input can be made to be controlled. Therefore, in addition to the individual control described above, the group control and the pattern control are also possible. This means that a plurality of loads can be controlled in batch at the control time.

To set a time schedule, a switch section 13 as a setting and operation section and a display section 14 are used. The switch section 13 consists of a plurality of pushbutton switches and the operation contents of the switch section 13 are input through a switch input section 15 to the timer processing section 10. The display section 14 comprises a liquid crystal display and can display the current setup time schedule, the time schedule stored in the program storage section 12, the current time, the operation mode of the timer processing section 10, etc. Thus, the switch section 13 and the display section 14 can be used to set a combination of the control contents and control time by address as a time schedule. This means that the control contents and control time may be related to the address of the supervisory input corresponding to the load to be controlled (the same as the address of the load).

The time schedule basically is set on a daily basis and the control time in the time schedule basically is set by combining a day of the week and hours minutes. In addition to the time schedule repeated daily (basic time schedule), temporary time schedules corresponding to a holiday, an event, etc., (special-day time schedules) can also be set.

Figure 4:
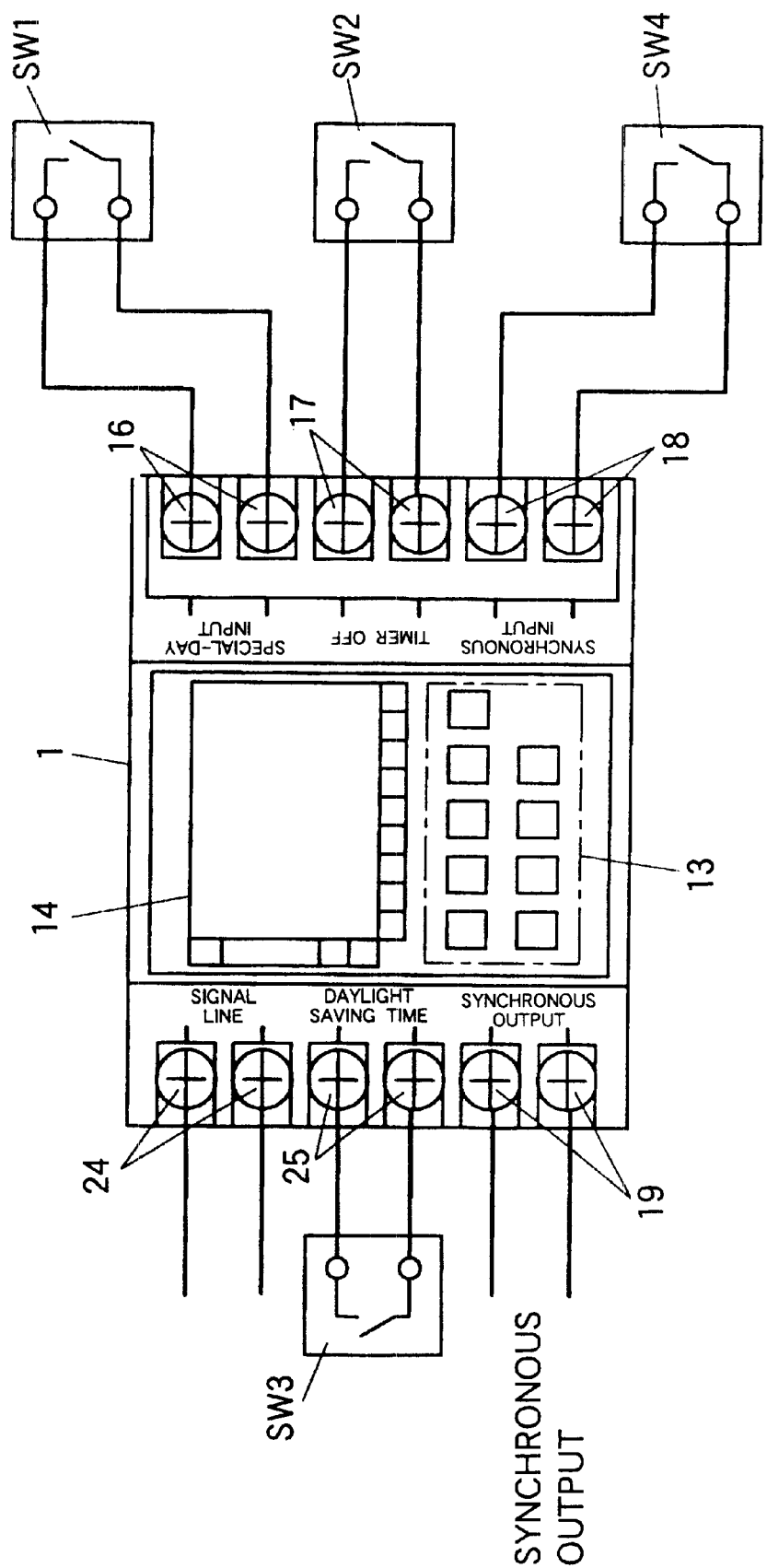
FIG. 4 is a drawing to show the use form of the embodiment of the invention.

Use of the basic time schedule or the special-day time schedule is selected as follows: A special-day specification terminal 16 is added to the timer processing section 10 and external contact input of no voltage can be connected to the special-day specification terminal 16. As the external contact input of no voltage, normally a switch SW1 is used as shown in FIG. 4. When the switch SW1 (external contact input) connected to the special-day specification terminal 16 is on and the special-day specification terminal 16 is short-circuited, the special-day time schedule is used; when the switch SW1 is off and the special-day specification terminal 16 is opened, the basic time schedule is used.

Address memory 21 is also added to the timer processing section 10 and is provided with a schedule mode flag having a similar function to that of the special-day specification terminal 16. When the schedule mode flag is set, the timer processing section 10 uses the special-day time schedule; when the schedule mode flag is reset, the timer processing section 10 uses the basic time schedule. A specific address (special-day specification address) is related to the schedule mode flag. When the address data AD in a transmission signal transmitted on the signal line Ls matches the special-day specification address, the transmission processing section 11 sets or resets the schedule mode flag in response to the control data CD of the transmission signal. In short, the schedule mode flag is related to the terminal 31 provided with the switch 31*a* as load, whereby an instruction for setting or resetting the schedule mode flag can be given by operating the switch 31*a*. In other words, use of the basic time schedule or the special-day time schedule can be selected by operating the remote switch 31*a* without operating the switch section 13 of the program timer 1. However, which of the basic time schedule and the special-day time schedule is selected is indicated on the terminal 31. To do this, when the transmission processing section 11 receives a transmission signal containing a special-day specification address, the transmission processing section 11 returns information in the signal return period WT of the transmission signal. In the embodiment, two schedule mode flags are provided and different special-day addresses are related thereto. Therefore, two types of special-day time schedules can be selected.

Since the special-day time schedule normally is used temporarily as described above, often it is restored to the basic time schedule on the day following use of the special-day time schedule. However, often the user forgets about in switching the special-day time schedule to the basic time schedule. Thus, it is convenient to automatically switch the schedules. Then, the timer processing section 10 is provided with a flag reset section 10*b* so that when the schedule mode flag is set and the special-day time schedule is indicated before the day of the week at the current time counted by the clock section 10*a* is changed (namely, the specific time is set to 0 am), the schedule mode flag is reset for restoring to the mode of using the basic time schedule at the point in time at which the day of the week is changed. The flag reset section 10*b* can be used to prevent the special-day time schedule from being used day after day. The time at which the schedule mode flag is reset in the flag reset section 10*b* need not necessarily be the point in time at which the day of the week is changed; in general use, the time may be any time before the human being starts to use the load on the next day.

By the way, the user might want to temporarily stop load control based on the time schedule. Execution or stopping of load control based on the time schedule is selected as follows: A timer control stop terminal 17 is added to the timer processing section 10 and external contact input of no voltage can be connected to the timer control stop terminal 17. As the external contact input of no voltage, normally a switch SW2 is used as shown in FIG. 4. When the switch (external contact input) SW2 connected to the timer control stop terminal 17 is on and the timer control stop terminal 17 is short-circuited, load control based on the time schedule is not executed; when the switch SW2 is off and the timer control stop terminal 17 is opened, the time schedule is used to control the load.

The address memory 21 added to the timer processing section 10 is provided with a control mode flag having a similar function to that of the timer control stop terminal 17. When the control mode flag is set, the timer processing section 10 does not execute load control based on the time schedule; when the control mode flag is reset, the timer processing section 10 executes load control based on the time schedule. A specific address (timer control stop address) is related to the control mode flag. When the address data AD in a transmission signal transmitted on the signal line Ls matches the time control stop address, the transmission processing section 11 sets or resets the control mode flag in response to the control data CD of the transmission signal. That is, the control mode flag is related to the terminal 31 provided with the switch 31*a* as load, whereby an instruction for setting or resetting the control mode flag can be given by operating the switch 31*a*.

The configuration enables the user to select execution or stopping of load control based on the time schedule by operating the remote switch 31*a* without operating the switch section 13 of the program timer 1. However, execution or stopping of load control based on the time schedule is indicated on the terminal 31. To do this, when the transmission processing section 11 receives a transmission signal containing a timer control stop address, the transmission processing section 11 returns information in the signal return period WT of the transmission signal.

Further, normally load control based on the time schedule is stopped temporarily and thus if load control based on the time schedule is stopped, often it is restored to the mode of executing load control based on the time schedule on the next day. Then, the load control stop mode can be released automatically. That is, in the flag reset section 10*b* of the timer processing section 10, when the control mode flag is set and an instruction for stopping load control based on the time schedule is given before the day of the week at the current time counted by the clock section 10*a* is changed (namely, the specific time is set to 0 am), the control mode flag is reset for restoring to the mode of executing load control based on the time schedule at the point in time at which the day of the week is changed. This can prevent stopping of load control based on the time schedule day after day from being misidentified as a failure. The time at which the control mode flag is reset in the flag reset section 10*b* need not necessarily be the point in time at which the day of the week is changed; in general use, the time may be any time before the human being starts to use the load on the next day. The time at which the control mode flag is reset by the flag reset section 10*b* may differ from the time at which the schedule mode flag is reset.

By the way, the program timer 1 of the embodiment is provided with a function of selecting daylight saving time to use the daylight saving time advancing the current time counted by the clock section 10*a* by a given time (normally, one hour). Setting the daylight saving time or the normal time is selected as follows: A daylight saving time terminal 25 is added to the timer processing section 10 and external contact input of no voltage can be connected to the daylight saving time terminal 25. As the external contact input of no voltage, normally a switch SW3 is used as shown in FIG. 4. When the switch (external contact input) SW3 connected to the daylight saving time terminal 25 is on and the daylight saving time terminal 25 is short-circuited, the current time in the clock section 10*a* is advanced one hour; when the switch SW3 is off and the daylight saving time terminal 25 is opened, the current time in the clock section 10*a* is restored to the former time.

The address memory 21 is provided with a daylight saving time flag having a similar function to that of the daylight saving time terminal 25. When the daylight saving time flag is set, the timer processing section 10 advances the current time in the clock section 10*a* one hour; when the daylight saving time flag is reset, the timer processing section 10 restores the current time in the clock section 10*a* to the normal time. A specific address (daylight saving time address) is also related to the daylight saving time flag. When the address data AD in a transmission signal transmitted on the signal line Ls matches the daylight saving time address, the transmission processing section 11 sets or resets the daylight saving time flag in response to the control data CD of the transmission signal. That is, the daylight saving time flag is related to the terminal 31 provided with the switch 31a as load, whereby an instruction for setting or resetting the daylight saving time flag can be given by operating the switch 31a. Consequently, setting the current time in the clock section 10a to the daylight saving time or the normal time can be selected by operating the remote switch 31a without operating the switch section 13 of the program timer 1. Also in this case, whether or not the daylight saving time is adopted is indicated on the terminal 31. To do this, when the transmission processing section 11 receives a transmission signal containing a daylight saving time address, the transmission processing section 11 returns information in the signal return period WT of the transmission signal.

By the way, the user might want to place loads in the same control state repeatedly. For example, the control state of turning off all illumination loads every given time is repeated at given time intervals and if the human being turns on the illumination load after the illumination loads are once turned off, all illumination loads are again turned off in a given time after the illumination loads are turned off. Such operation is repeated two or more times. If the control is performed, the user can be urged to go away from the illumination load installation location (for example, go home from his or her workplace) and moreover all illumination loads are turned off every given time and thus the user can be prevented from forgetting about in turning off the illumination loads. To perform this kind of control, in the embodiment, the control on time and off time and the control time interval (control interval) are set. This means that setting the on time and the off time and the control time interval becomes equivalent to setting the number of times control is to be performed and the time interval. For example, if a time schedule is set so as to turn off load every 30 minutes from 17:00 to 20:00, control of turning off the load is repeated at 17:00, 17:30, 18:00, . . . , 19:30, and 20:00, namely, turning off the load is repeated seven times under the control. The contents of this kind of control are set in the setting and operation section consisting of the switch section 13 and the display section 14.

As described later, the on time and the off time and the time interval are set for the pattern control; for the individual control and the group control, the load turning on time and off time are set in addition to the on time and the off time. That is, one on/off cycle of load is defined and the operation is repeated between the control on time and the control off time.

Further, in the embodiment, the time in the clock section 10a can be adjusted by an external signal. That is, a synchronous input terminal 18 and a synchronous output terminal 19 are added to the timer processing section 10 and as external contact input of no voltage, an external clock contact SW4, etc., can be connected to the synchronous input terminal 18 as shown in FIG. 4. The synchronous output terminal 19 generates contact output of no voltage. When the external contact input connected to the synchronous input terminal 18 is turned on, the time in the clock section 10a is adjusted to the stipulated time, 12:00 or 24:00. However, only the external contact input turned on when the time counted in the clock section 10a is within the range of ±5 minutes with respect to 12:00 or 24:00 is handled as effective input, and if the external contact input is turned on outside the range, it is ignored. The time range in which the external contact input is accepted is thus limited, whereby in the normal operation, the time in the clock section 10a can be prevented from shifting five minutes or more with respect to the actual time. When the external contact input to the synchronous input terminal 18 is turned on, the synchronous output terminal 19 outputs on, so that it is made possible to adjust the time in the clock section 10a of any other program timer 1 using the output of the synchronous output terminal 19 as the external contact input.

A synchronous address is also set in the above-described address memory 21. When the address data AD in a transmission signal transmitted on the signal line Ls matches the synchronous address, the transmission processing section 11 instructs the clock section 10a to adjust the time to 12:00 or 24:00 as when the external contact input to the synchronous input terminal 18 is turned on. That is, if the transmission signal rather than the switch SW4 is used, the time can also be adjusted. If a facilities clock 35 is connected to the terminal 32 connected to the signal line Ls as in FIG. 2 and the terminal 32 is related to the synchronous address and supervisory input is given to the terminal 32 when 12:00 or 24:00 is reached in the facilities clock 35, the transmission signal matching the synchronous address is received and time adjustment is automatically made each time 12:00 or 24:00 is reached in the facilities clock 35. The synchronous address corresponds to the function of the synchronous input terminal 18 and upon reception of the transmission signal having the address matching the synchronous address, time adjustment is made, but a synchronous address corresponding to the function of the synchronous output terminal 19 may be provided together. The synchronous address is used to transmit a transmission signal Vs indicating that time adjustment has been made. Therefore, when another program timer 1 is connected to the signal line Ls, the is related to the synchronous address of the program timer 1, whereby the time in the clock section 10a of the program timer 1 can be adjusted. Time adjustment is executed at two times of 12:00 and 24:00, but may be executed only at either of the times or may be executed at any other stipulated time. Further, the time range in which the external contact input to the synchronous input terminal 18 or the synchronous address is received is ±5 minutes, but the time range may be changed whenever necessary. Although a slight time delay occurs when time adjustment is made by the above-described method, the control time has an accuracy of about one minute in the embodiment and thus a slight time lag does not introduce a problem.

Time schedules written into the program storage section 12 to perform the above-described processing is in the format as shown in FIG. 5. In FIG. 5, one horizontal row provides one time schedule, No. indicates the program number to distinguish one time schedule from another, and CONTROL MODE indicates control executed once a day or control repeated in the same control state in a manner as described above. TO BE CONTROLLED indicates the address related to the load to be controlled and INDIVIDUAL 63-4 means that the load corresponding to the address of channel 63 and load number 4 is controlled in the individual control. P1 means that the loads belonging to the pattern named P1 are controlled in batch in the pattern control. G127 means that the loads belonging to the group named G127 are controlled in batch in the group control. Thus, INDIVIDUAL, P, and G denote the individual control, the pattern control, and the group control respectively, and each following part corresponds to the address. ON TIME and OFF TIME correspond to the times at which the load is turned on and off. CONTROL INTERVAL is the time interval to control the load in the same state repeatedly. As seen in the figure, for the pattern control, only the control on time is specified and the off time is not specified, because the load operation state may be controlled to the preset state in the pattern control. Under CONTROL DAYS, the days are represented by days of the week or special days. In the embodiment, either of two types of special-day time schedules can be selected. To select either of the two special-day time schedules, two special-day addresses may be related as described above or one special-day time schedule may be selected by external contact input and the other may be selected using the special-day address. In any way, the time schedule is set for each load to be controlled.

Figure 6:
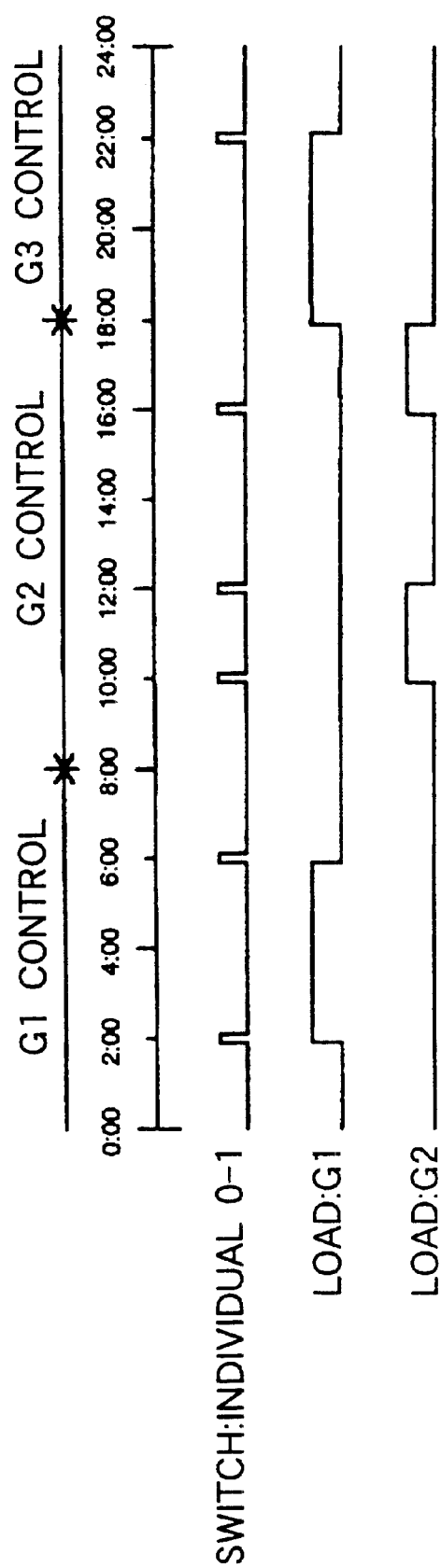
FIG. 6 is a schematic representation of the operation of the embodiment of the invention.

The program timer 1 of the embodiment comprises a function of changing the load related to supervisory input in response to the time zone, as shown in FIG. 6. In the example shown in the figure, address 0-1 is set in the switch 31a for the individual control and G1 group control and G2 group control can be performed by operating the switch 31a. However, from 0:00 to 8:00 and 18:00 to 24:00, the group control of the loads belonging to the G1 group is performed when the switch 31a is operated, and from 8:00 to 18:00, the group control of the loads belonging to the G2 group is performed when the switch 31a is operated. As seen in FIG. 6, the loads are turned on and off alternately each time the switch 31a is operated.

Figures 7, 8:
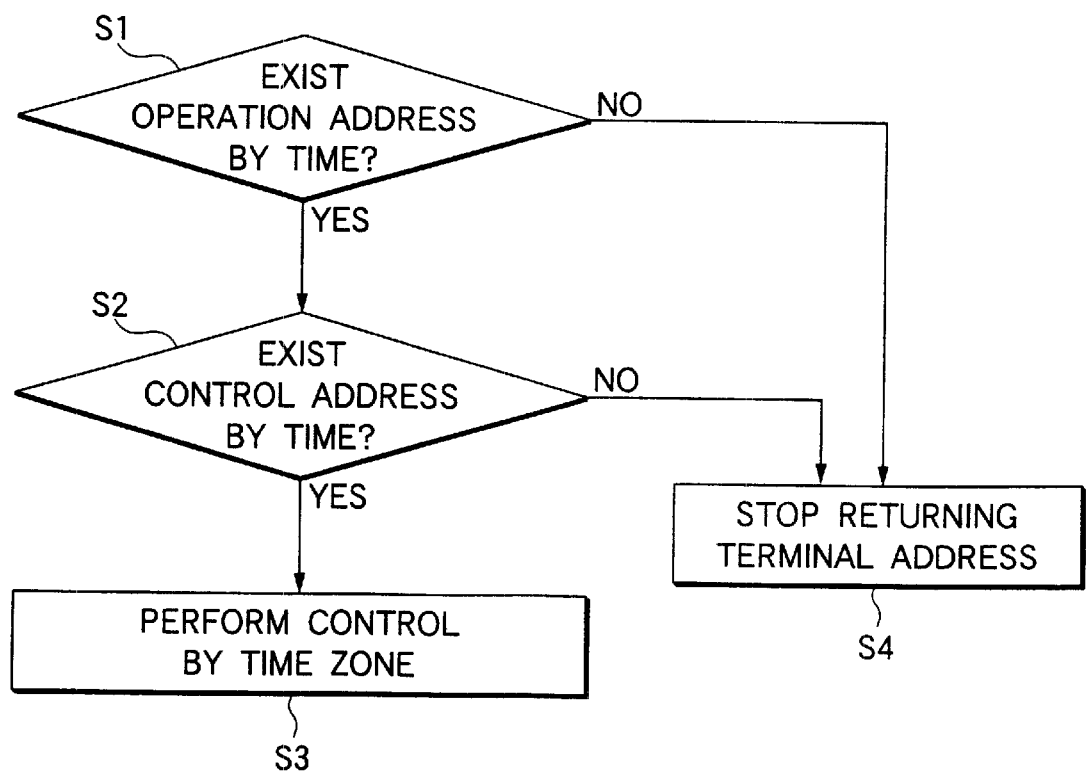
FIG. 7 is a drawing to show an address setting example in the embodiment of the invention.
FIG. 8 is a flowchart of the operation of the embodiment of the invention.

To enable the above-described operation, the timer processing section 10 is provided with a program-by-time-zone storage section 22. A set of one operation address by time zone related to supervisory input of the switch 31a, etc., at least one control address by time zone related to the load to be controlled, and the time zone using the control address by time zone is stored in the program-by-time-zone storage section 22 as time zone control data. For example, the time zone control data to perform the control shown in FIG. 6 is in the format as shown in FIG. 7. Only the address of the supervisory input to perform the individual control can be used as the operation address by time zone and individual control, group control, and pattern control addresses can be used as the control addresses by time zone. The time zone set as the control address by time zone is set as CONTROL TIME.

In the transmission processing section 11, as shown in FIG. 8, if the address of a transmission signal transmitted via the signal line Ls matches the operation address by time zone (S1), the program-by-time-zone storage section 22 is referenced through the timer processing section 10 and if the program-by-time-zone storage section 22 stores the control address by time zone corresponding to the control time containing the current time counted by the clock section 10a (S2), the control address by time zone is used to control the load (S3). On the other hand, when either of the operation address by time zone and the control address by time zone is not set, no response is made to the transmission signal. This means that if either of the operation address by time zone and the control address by time zone is unset, the transmission processing section 11 does not function as a terminal for the transmission unit 30. Therefore, the control address by time zone may be set only for some time zone of a day and load control based on supervisory input can be suppressed in the time zone in which no control address by time zone is set.

Figure 9:
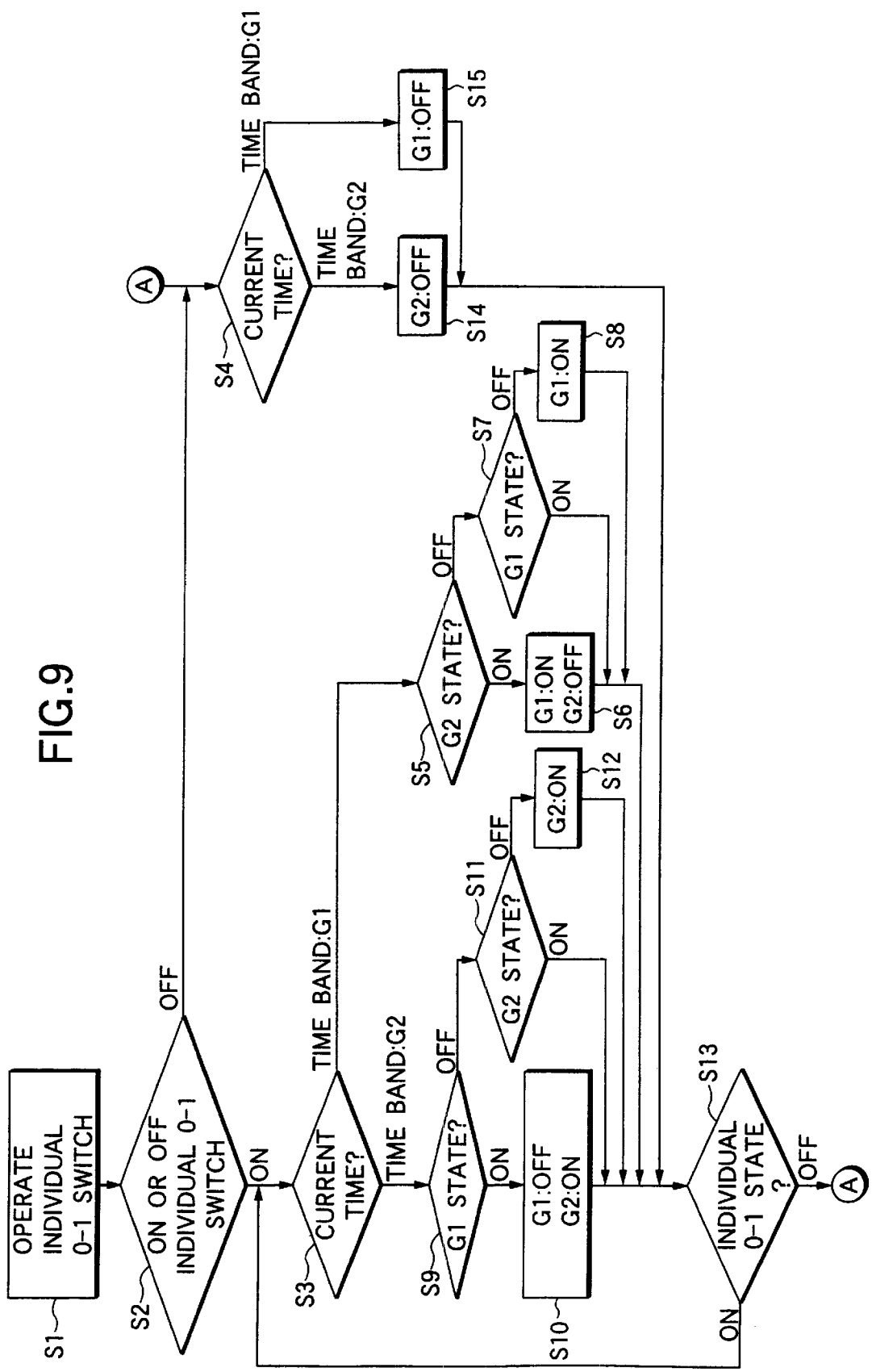
FIG. 9 is a flowchart of the operation of the embodiment of the invention.

FIG. 9 shows the operation of the program timer 1 with the switch 31a as supervisory input using the time zone control data shown in FIG. 7. When the switch 31a with 0-1 for individual control is operated (S1), first whether or not the switch 31a indicates on or off is determined (S2). That is, whenever the switch 31a is pressed, control on and off are inverted; if the current state of control for the pressed switch 31a, indicated by a flag is on, the control is turned off and if the current state is off, the control is turned on. Regardless of whether the control is on or off, the current time is acquired from the clock section 10a and the time zone control data corresponding to the switch 31a with 0-1 is checked for determining which of the time zones G1 and G2 the current time belongs to (S3 and S4). If the control is on at step S2 and the time zone is determined G1 at step S3 (namely, instruction for controlling G1 on), first whether the control state of G2 is on or off is determined (S5) and if the control state of G2 is on, G1 is switched on and G2 is switched off (S6). On the other hand, if the control state of G2 is already off, whether the control state of G1 is on or off is determined (S7) and if the control state of G1 is on, the control state is continued intact; if G1 is off, G1 is turned on (S8).

If the current time belongs to G2 at step S3 (namely, instruction for controlling G2 on), first whether the control state of G1 is on or off is determined (S9) and if the control state of G1 is on, G1 is switched off and G2 is switched on (S10). On the other hand, if the control state of G1 is already off, whether the control state of G2 is on or off is determined (S11) and if the control state of G2 is on, the control state is continued intact; if G2 is off, G2 is turned on (S12).

Then, processing similar to that at step S2 is performed for checking the control state (S13) and if the on instruction continues, control returns to step S3 and which time zone the current time belongs to is determined. When change occurs in the time zone to which the current time belongs while the on instruction continues by the processing, the preceding time zone control can be switched to the following time zone control. For example, in FIG. 6, the load changes from G2 to G1 at 18:00 and the operation corresponds to the processing. If an instruction for changing the control state to off state is given, control goes to step S4 and off processing described later is performed.

If an instruction is given so as to turn off the control state at step S2 or S13, the time zone to which the current time belongs is determined (S4). If the time zone is G1, the control state of G1 is turned off (S14) and if the time zone is G2, the control state of G2 is turned off (S15).

The control based on the time zone control data as described above is enabled, whereby if a plurality of illumination loads are controlled in batch, it is made possible to control in such a manner that all illumination loads are turned on and off by supervisory input in the daytime and 80% of the illumination loads are turned on and off by supervisory input in the nighttime. As seen from the above-described operation, the function of converting from the operation address by time zone to the control address by time zone is provided and thus supervisory input for the individual control can also be used for batch control.

It is desirable that AC power supply provided by stepping down the voltage of commercial power supply AC with a transformer 34 (see FIG. 10) is used as the power supply of the program timer 1, but internal power supply may be provided by rectifying and stabilizing the transmission signal Vs without using the transformer 34. Particularly, the daylight saving time terminal 25 need not be provided in general specifications and thus if the daylight saving time terminal 25 is not required, it is desirable to provide a power supply terminal in place of the daylight saving time terminal 25 and connect the transformer 34 to the power supply terminal. To provide the daylight saving time terminal 25, internal power supply may be provided from the transmission signal Vs without providing the power supply terminal. A backup internal battery is provided so that the function of the clock section 10a can also be maintained when power fails.

The special-day address, the timer control stop address, the synchronous address for synchronous input, the synchronous address for synchronous output, and the daylight saving time address can be set as described above. Now, assume that the addresses are set to 0-1, 1-1, 2-1, 2-2, and 3-1, that the addresses 0-1 and 1-1 are assigned to the two terminals 31 each comprising the switch 31a in FIG. 2, and that address 2-1 is assigned to the terminal 32 to which the facilities clock 35 is connected. Thus, it is made possible to specify whether or not a special-day time schedule is to be used by operating the switch 31a of the terminal 31 with the address 0-1 and it is made possible to specify whether or not a time schedule is to be used for load control by operating the switch 31a of the terminal 31 with the address 1-1. Further, it is also made possible to automatically make time adjustment in the clock section 10a using the synchronous address when the facilities clock 35 reaches a predetermined time.

Figure 10:
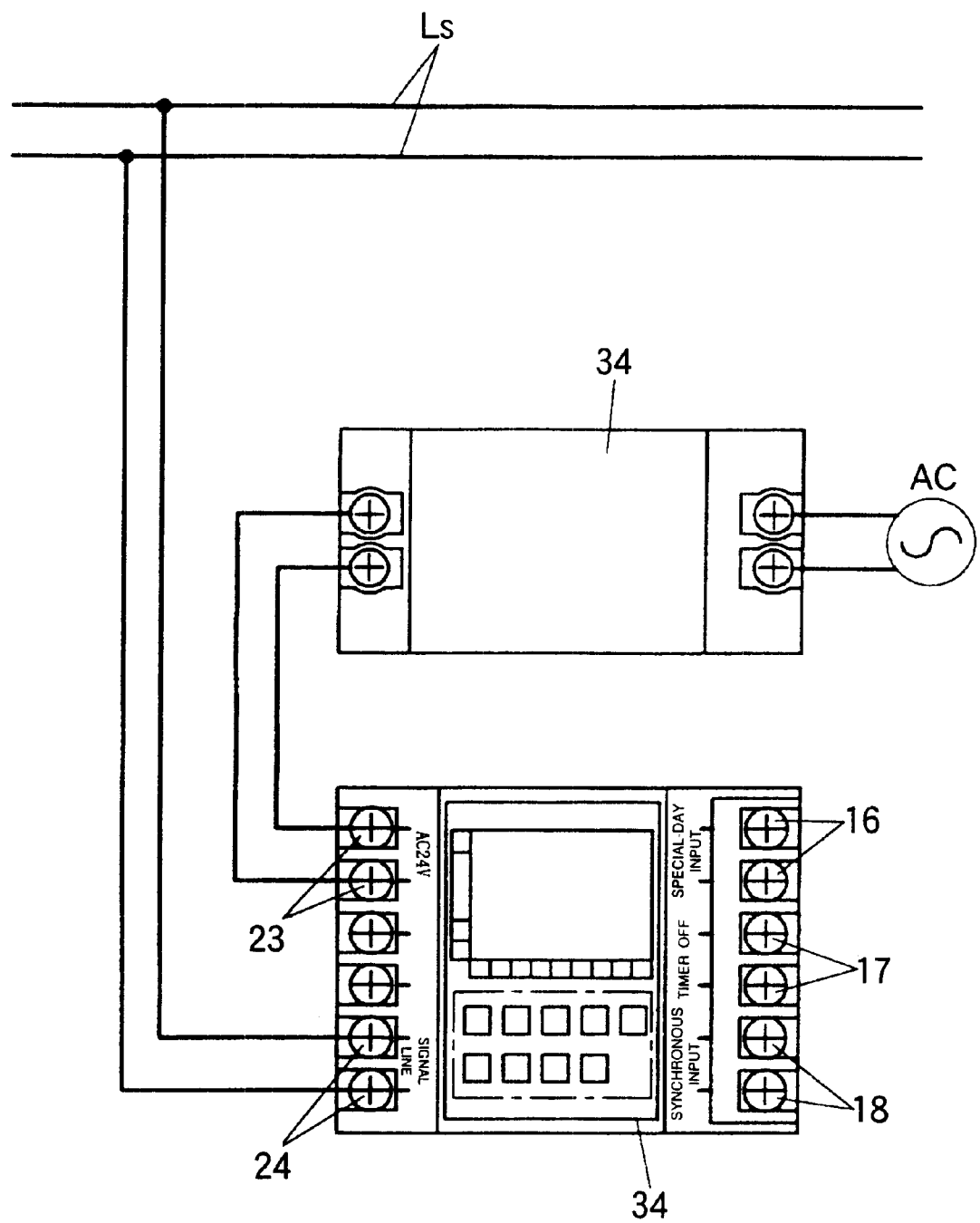
FIG. 10 is a drawing to show the use form of the embodiment of the invention.
Figure 11A:
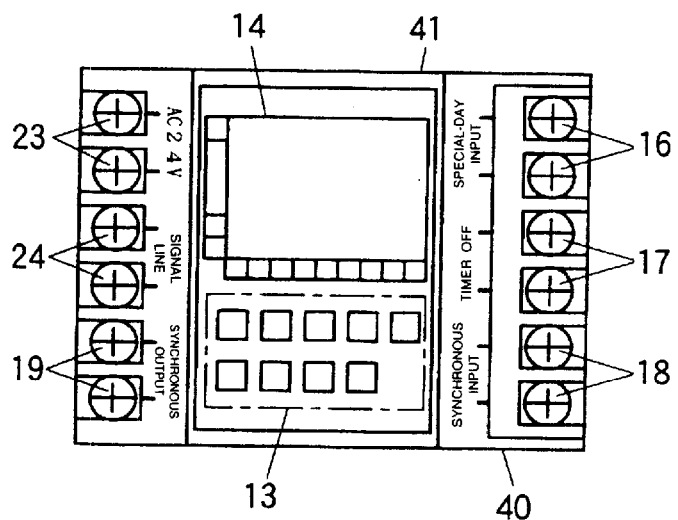
FIGS. 11A to 11C show the appearance of the embodiment of the invention.
Figure 11B:
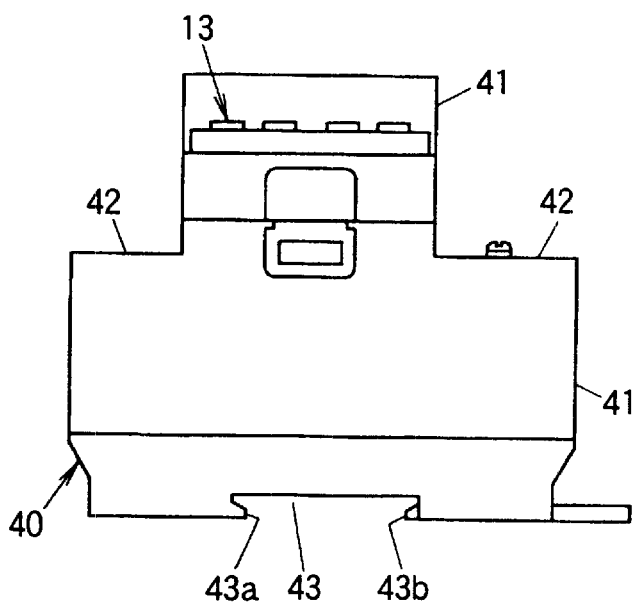
Figure 11C:
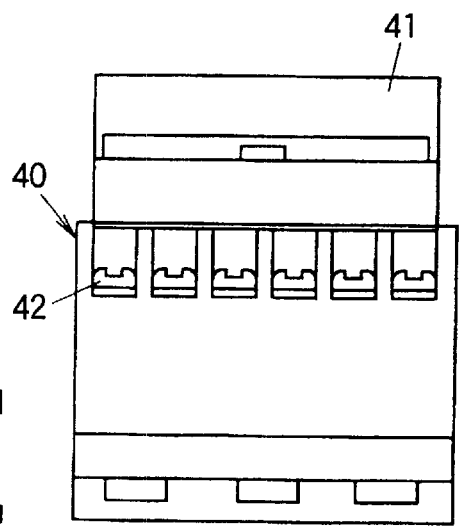

The program timer 1 of the embodiment is housed in a cabinet 40 having dimensions of integral multiple of the dimensions of a cabinet for one pole, unit dimensions of so-called distribution panelboard agreement dimensions (dimensions of a circuit breaker for agreement type wiring for a light distribution panelboard (refer to JIS C8371)). A projection board 41 on which the switch section 13 and the display section 14 are placed is formed at the center of the front (the top in FIG. 11B) of the cabinet 40 and a terminal block 42 is placed on each side. In the configuration example shown in FIG. 11, a power supply terminal 23 is provided in place of the daylight saving time terminal 25, the power supply terminal 23, a signal terminal 24 connected to the signal line Ls, and the synchronous output terminal 19 are arranged in one margin of the cabinet 40, and the special-day specification terminal 16, the timer control stop terminal 17, and the synchronous input terminal 18 are arranged in an opposite margin of the cabinet 40. The cabinet 40 shown in the figure can be provided with six pairs of screwed terminals. Not only the daylight saving time terminal 25, but also the synchronous output terminal 19 can be omitted, in which case if the power supply terminal 23 is provided, five pairs of terminals may be used and thus it is desirable to enlarge the insulating distance between the power supply terminal 23 and the signal terminal 24 with unassigned space as much as one pair of terminals between, as shown in FIG. 10. The terminal configuration is selected appropriately as required, as described above.

An attachment groove 43 is formed in the rear (the lower face in FIG. 11B) of the cabinet 40. The attachment groove 43 is formed on one side wall with a hook claw 43a and on an opposite side wall with a retention claw 43b that can be advanced and retreated from side to side facing the hook claw 43a. An attachment rail placed in a distribution panelboard (so-called DIN rail) is inserted into the attachment groove 43 so that the cabinet 40 can be fixed to the attachment rail. That is, this kind of attachment rail is of so-called top hat form with flange pieces projected outward integrally from the tip margins of both side pieces of a member formed like U in cross section, and each flange piece is sandwiched between the bottom of the attachment groove 43 and the hook claw 43a and the retention claw 43b. The joint form to this kind of attachment rail is known in the distribution panelboard. Since the retention claw 43b can be advanced and retreated, the cabinet 40 can be removed from the attachment rail by retreating the retention claw 43b from the attachment groove 43.

Figure 14:
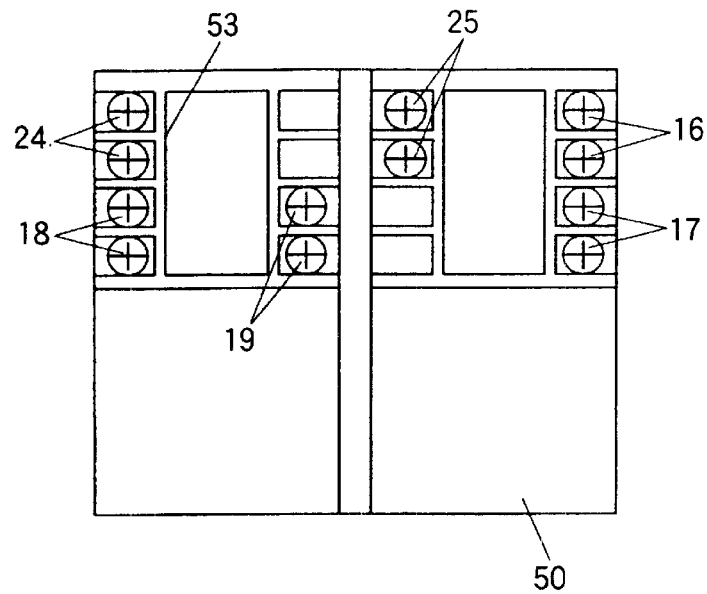
FIG. 14 is a rear view of the configuration example shown in FIGS. 12A and 12B.

The above-described cabinet 40 is assumed to be placed in a panel such as a distribution panelboard. However, to place the program timer 1 on a wall, etc., a cabinet 50 that can be attached to an attachment frame used to construct recessed wiring appliances called Large-size ganged type (refer to JIS C8304) is used as shown in FIGS. 12 to 14. The cabinet 50 has a projection board 51 in the front center portion and attachment claws 52 projected on both sides, and a terminal block 53 with an arrangement of screwed terminals is placed on the rear of the cabinet 50. Like the cabinet 40 of the distribution panelboard agreement dimensions, the terminal block 53 comprises six pairs of terminals and a configuration example provided with daylight saving terminal 25 is shown in the figure. Therefore, no power supply terminal is provided.

The cabinet 50 shown in FIGS. 12 to 14 has dimensions called double-size ganged-type. It has dimensions of two rows each with an arrangement of three wiring appliances of module dimensions in recessed wiring appliances of Large-size ganged-type. An attachment frame 60 for attaching the cabinet 50 of the form is a synthetic resin molded article and comprises hold holes 61 engaging the attachment claws 52. The attachment frame 60 also comprises an attachment piece 62 for attaching with box screws screwed into a recessed box recessed in a wall or attaching to a wall panel with a member called nip hardware. One end part of the nip hardware is retained so as be supported on the attachment piece 62 and the screw amount with a turnbuckle screwed into the nip hardware through the attachment piece 62 is changed, thereby changing the distance between an opposite end part and the attachment frame 60. Therefore, if an attachment hole is made in a wall panel and the nip hardware is inserted in to the attachment hole and the attachment frame 60 is abutted against the surrounding of the attachment hole on the surface of the wall panel and in this state, the turnbuckle is fastened, the surrounding of the attachment hole is clamped between the attachment frame 60 and the nip hardware and the attachment frame is fixed to the wall panel. A decorative plate 63 is attached to the front of the attachment frame 60 and projection board section 53 is exposed through an exposure window 64 disposed at the center of the decorative plate 63. An engagement leg (not shown) engaging the attachment frame 60 is projected on the rear of the decorative plate 63.

Figure 15:
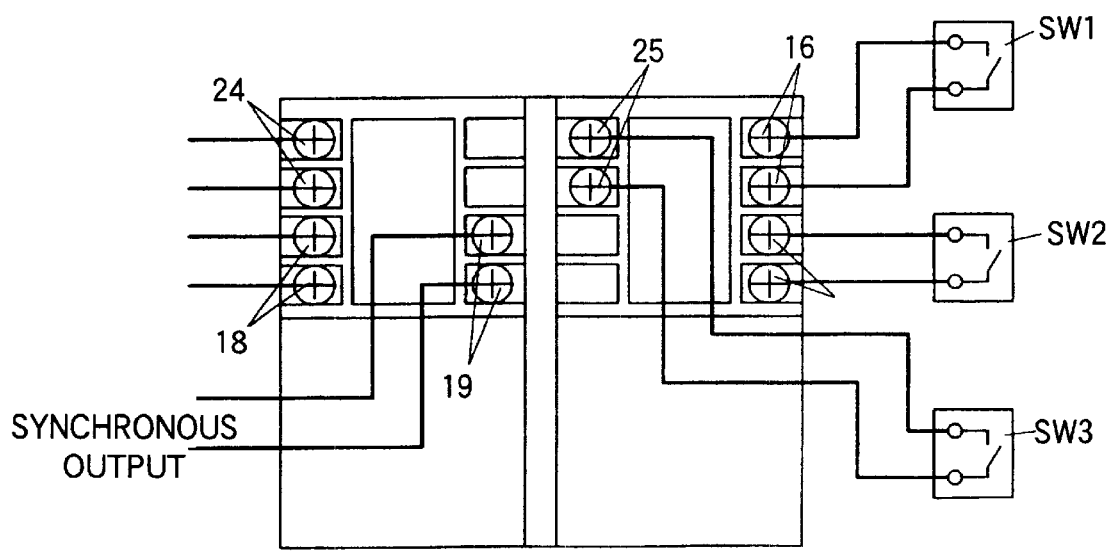
FIG. 15 is a drawing to show the use form of the configuration example shown in FIGS. 12A and 12B.
Figure 16:
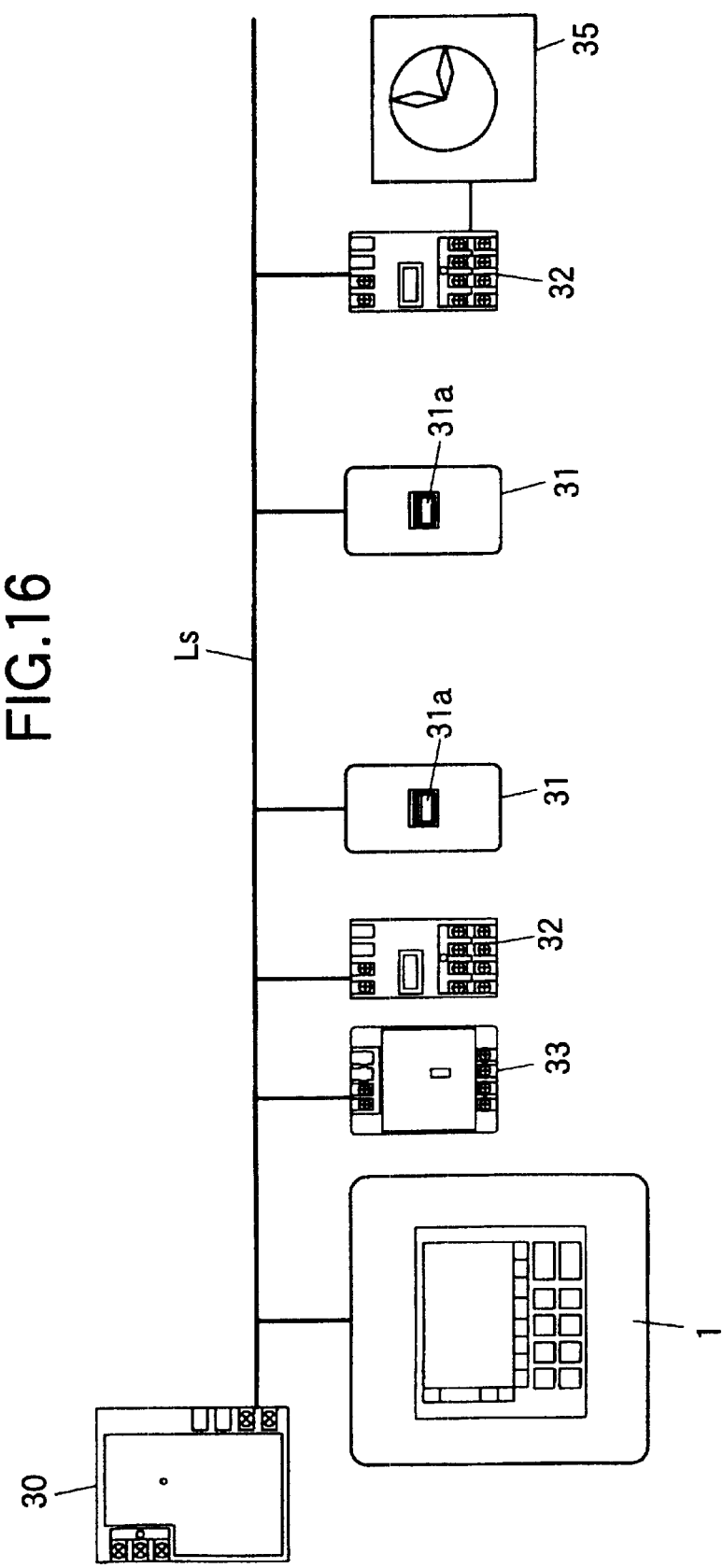
FIG. 16 is a drawing to show the use form of the configuration example shown in FIGS. 12A and 12B.

The program timer 1 comprising the cabinet 50 shown in FIGS. 12 to 14 is also used like the above-described program timer 1. That is, switches SW1 to SW3 (SW4) are connected to the program timer 1 as required, as shown in FIG. 15. The program timer 1 is connected to the transmission unit 30 via the signal line Ls, as shown in FIG. 16.

Figure 17:
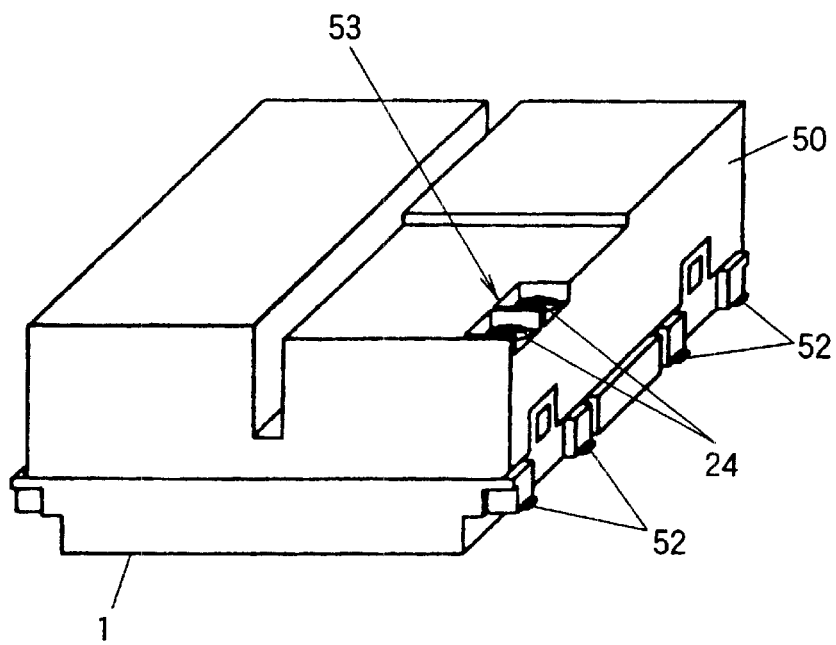
FIG. 17 is a perspective view to show still another configuration example of the embodiment of the invention.
Figure 18:
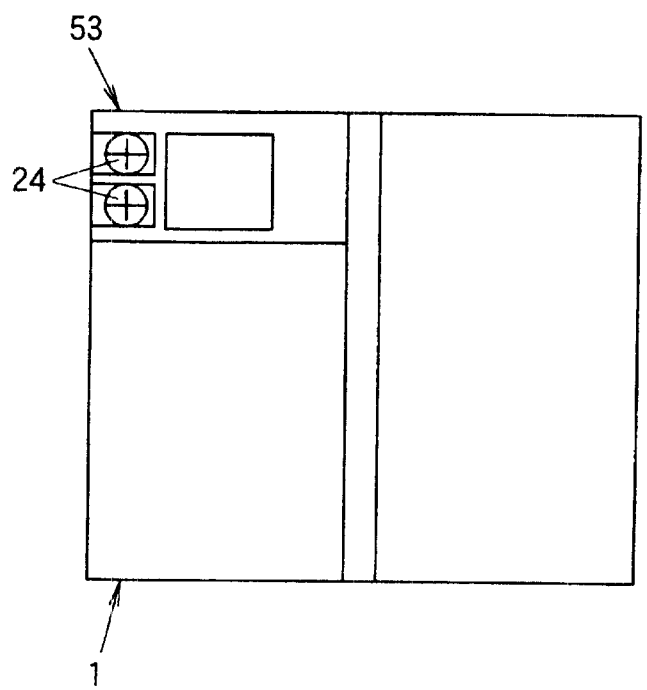
FIG. 18 is a rear view of the configuration example shown in FIG. 17.

If the program timer 1 does not receive any input/output other than connection to the signal line Ls, a configuration may be adopted wherein only the signal terminal 24 for connecting to the signal line Ls is provided on the rear of the cabinet 50, as shown in FIGS. 17 and 18.

By the way, the program timer 1 of the embodiment has a function of using the sunrise time and the sunset time as time schedule times. This function, called solar function, requires data for computing the sunrise time and the sunset time every day for each region (in fact, often the sunrise time and the sunset time are corrected to times close to the sunrise time and the sunset time at which light and darkness change). Therefore, to use the solar function, the use district (one of the districts into which the Japan area is divided in response to the sunrise time and the sunset time) is selected and time correction relative to the sunrise time and the sunset time can be made as required.

Figure 19:
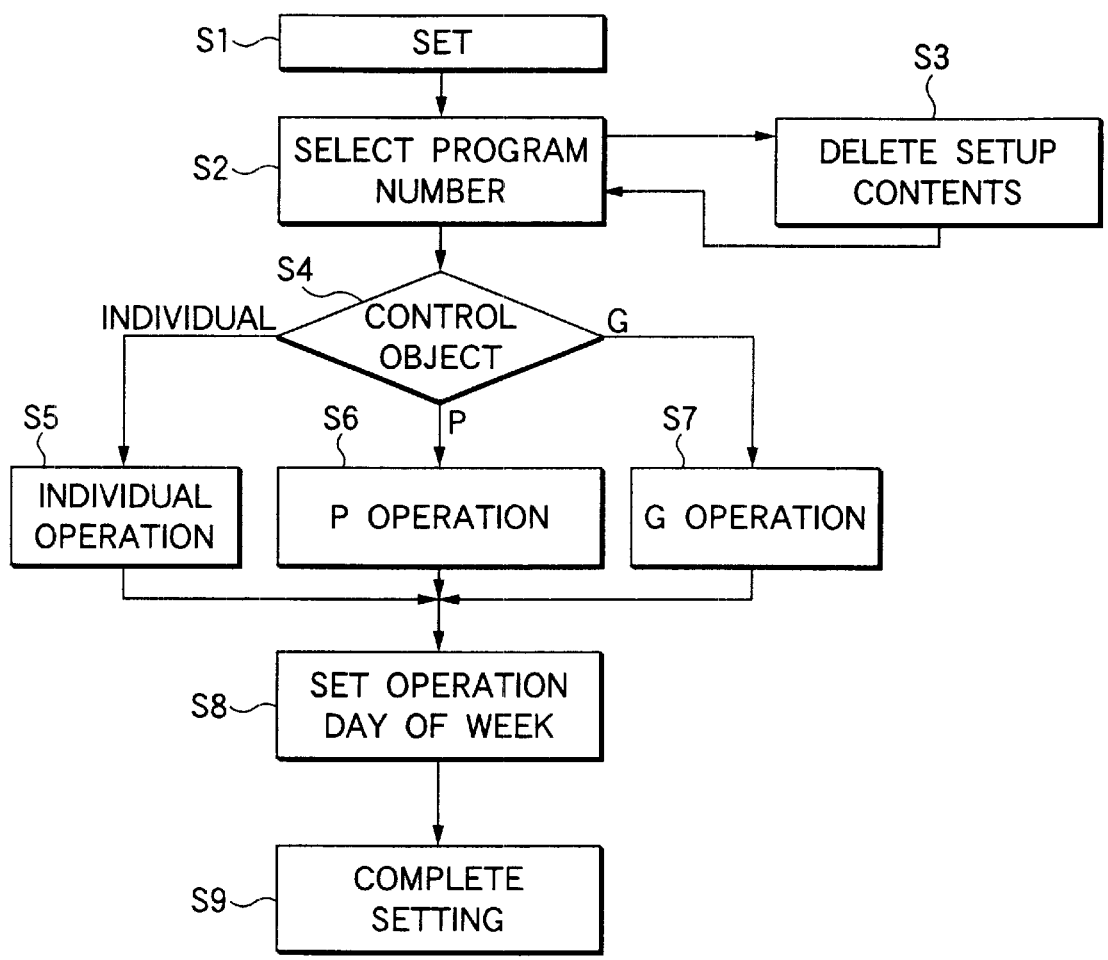
FIG. 19 is a flowchart of the operation of the embodiment of the invention.

A time schedule is set as follows: As shown in FIG. 19, in a setting mode (S1), a program number is selected (S2)

and if another time schedule is already assigned to the program number to set that time schedule, the contents are deleted (S3). Next, individual control (INDIVIDUAL), pattern control (P), or group control (G) is selected for the load to be controlled (S4) and the time is set separately (S5 to S7). Then, if the day of the week on which the load control is to be performed at the setup time is set (S8), setting the basic time schedule is complete (S9). As the time setting method (namely, operation mode) at steps S5 to S7, normal setting (NORMAL) of setting the control on and off times each time, repetition setting (REPETITION) of setting repetition previously described in the first embodiment, or solar setting (SOLAR) using the sunrise time and the sunset time can be selected.

The individual control and the group control are almost the same in setting procedure. In the normal setting, the on time (control turning on time) and the off time (control turning off time) are set. In the repetition setting, the start time and the end time of control repeating the same operation, namely, the on time (control turning on time) and the off time (control turning off time) are set, and to set one on and off sequence in the period, the on time and the off time of one cycle are set. In the solar setting, setting with the sunset time as the on time and the sunrise time as the off time, setting with the sunset time as the on time and a regular time as the off time, or setting with a regular time as the on time and the sunrise time as the off time is possible.

Figure 20:
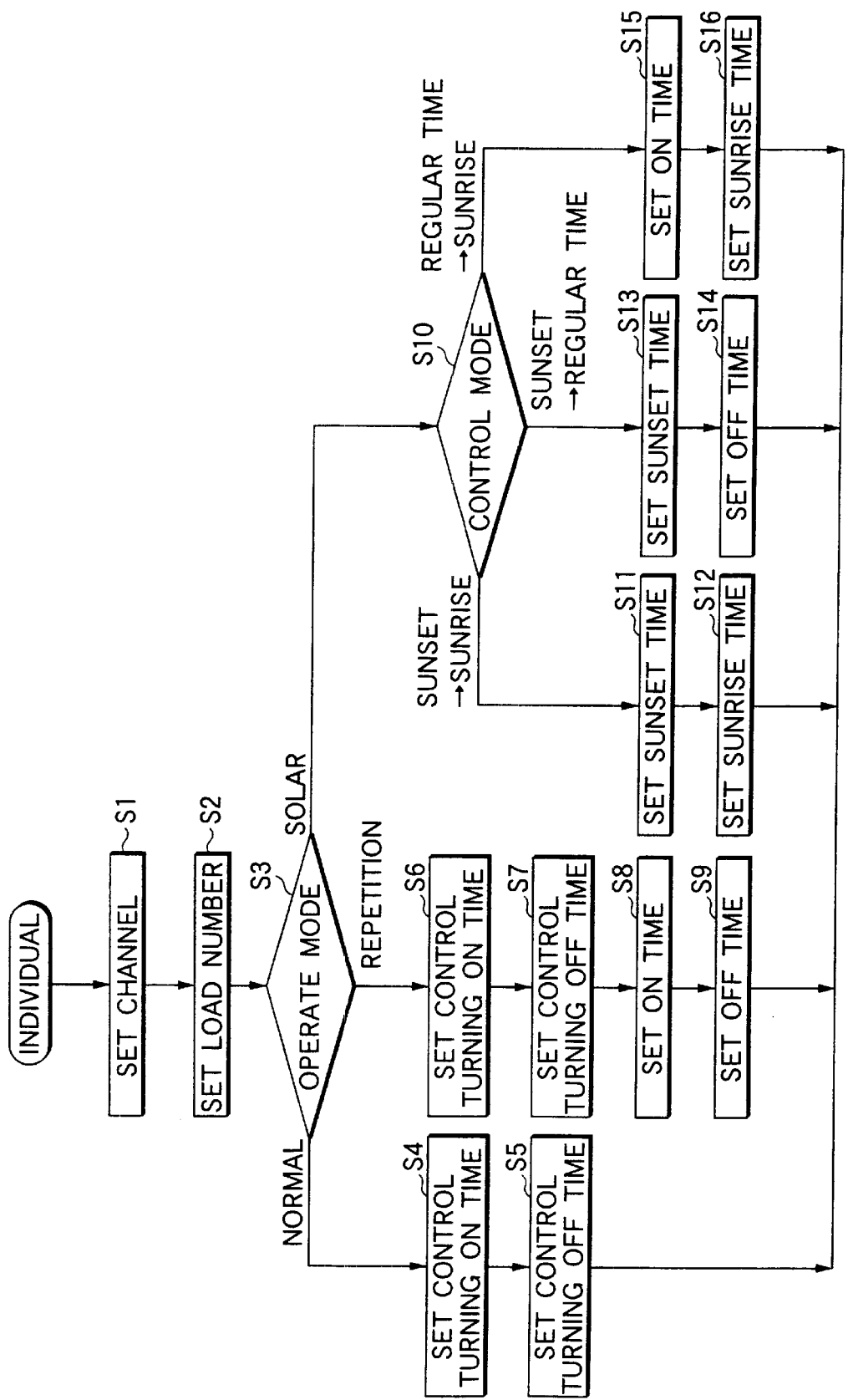
FIG. 20 is a flowchart of the operation of the embodiment of the invention.

In the individual control, as shown in FIG. 20, an address (channel and load number) is set (S1 and S2), then the operation mode is selected (S3). When the normal setting is selected, the control turning on time and the control turning off time are set (S4 and S5) as described above. When the repetition setting is selected, the control turning on time and the control turning off time are set (S6 and S7) and the on time and the off time of one cycle are set (S8 and S9). When the solar setting is selected, further the operation mode is selected (S10) and setting with the sunset time as the on time and the sunrise time as the off time (S11 and S12), setting with the sunset time as the on time and a regular time as the off time (S13 and S14), or setting with a regular time as the on time and the sunrise time as the off time (S15 and S16) is executed.

Figure 21:
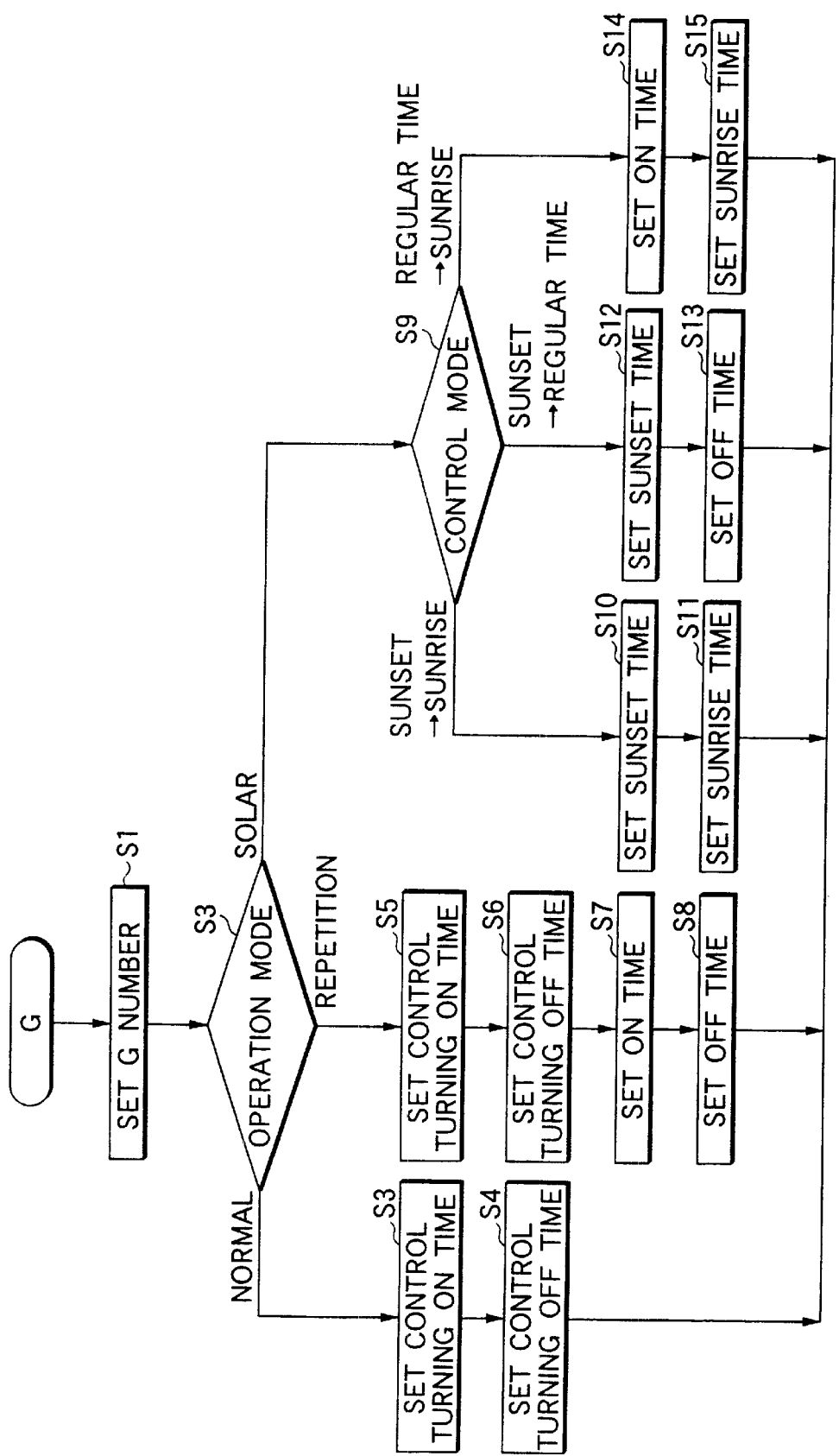
FIG. 21 is a flowchart of the operation of the embodiment of the invention.

In the group control, a setting procedure almost similar to that in the individual control is adopted. As shown in FIG. 21, the group number is set (S1), then the operation mode is selected (S2). When the normal setting is selected, the control turning on time and the control turning off time are set (S3 and S4) as described above. When the repetition setting is selected, the control turning on time and the control turning off time are set (S5 and S6) and the on time and the off time of one cycle are set (S7 and S8). When the solar setting is selected, further the operation mode is selected (S9) and setting with the sunset time as the on time and the sunrise time as the off time (S10 and S11), setting with the sunset time as the on time and a regular time as the off time (S12 and S13), or setting with a regular time as the on time and the sunrise time as the off time (S14 and S15) is executed.

Figure 22:
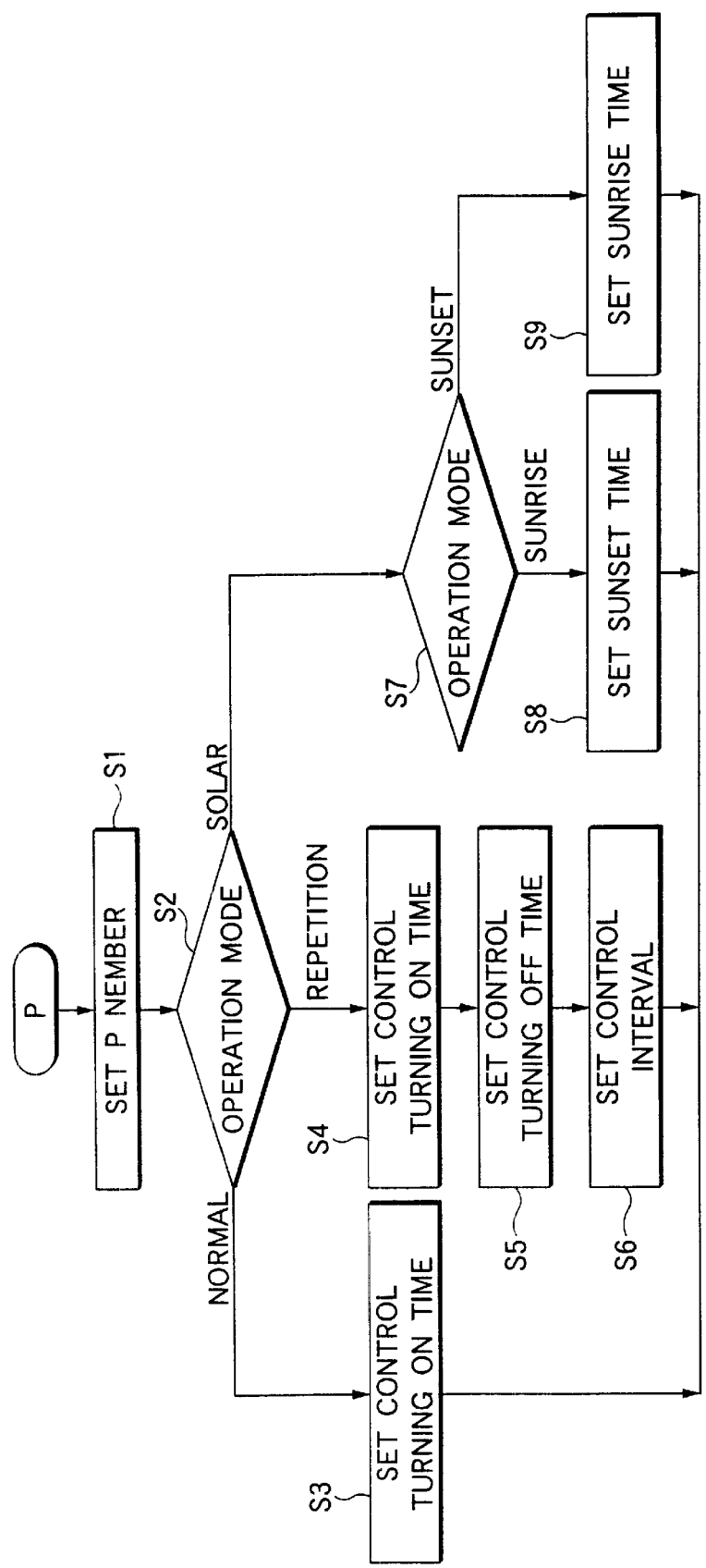
FIG. 22 is a flowchart of the operation of the embodiment of the invention.

In the pattern control, the control turning on time is set, but the control turning off time is not set. Thus, as shown in FIG. 22, the group number is set (S1) and the operation mode is selected (S2). When the normal setting is selected, only the control turning on time is set (S3). When the repetition setting is selected, the control turning on time and the control turning off time are set (S4 and S5) and the control time interval is set (S6). When the solar setting is selected, further which of the sunset time and the sunrise time is to be used is specified (S7) and the sunset or sunrise time is set (S8, S9).

An example of setting the time schedule as described above is the time schedule previously described with reference to FIG. 5.

Figure 23:
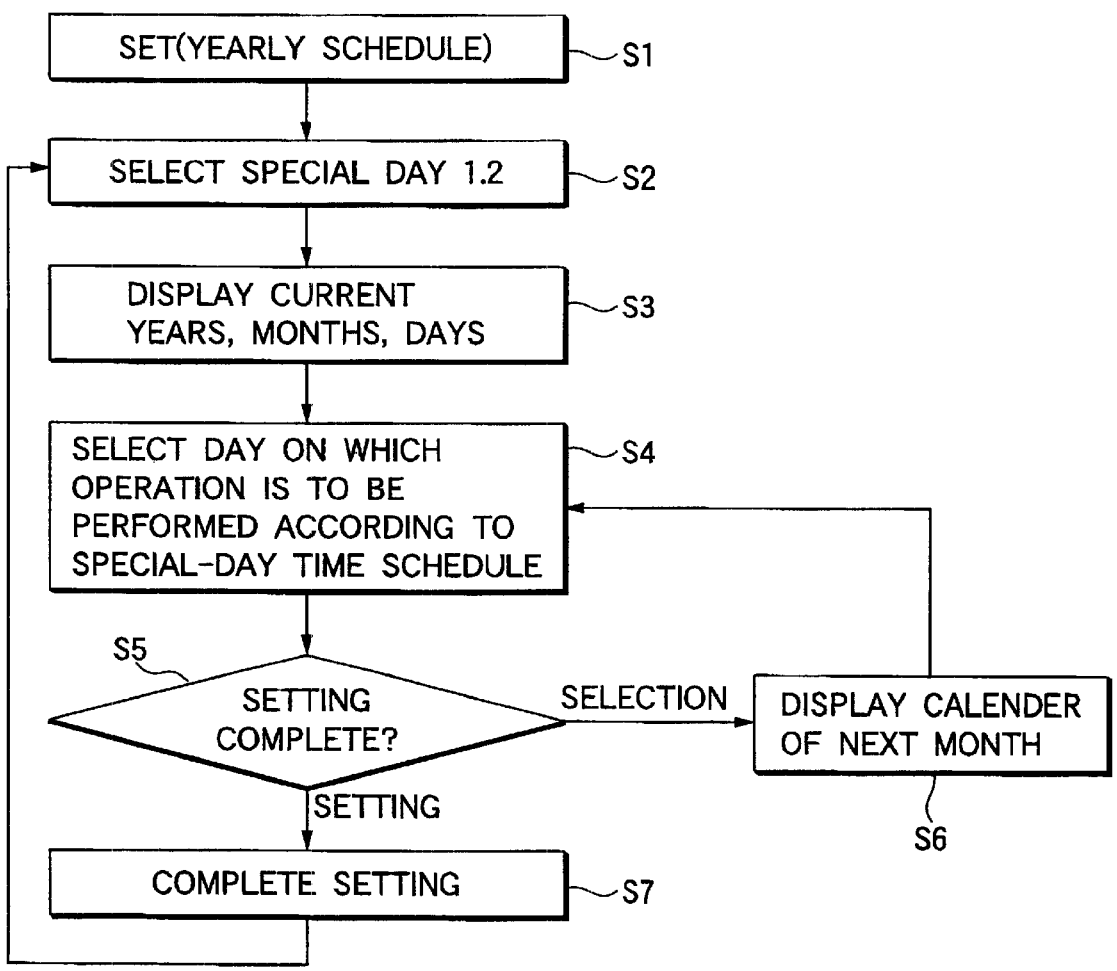
FIG. 23 is a flowchart of the operation of the embodiment of the invention.

By the way, whether or not a special-day time schedule is used is specified by using the switch SW1 or the special-day address and in addition, a special day can also be built in a yearly schedule. In this case, as shown in FIG. 23, a basic time schedule (yearly schedule) is set (S1), then a setting mode of a special-day time schedule is selected by operating the switch section 13 (S2). Then, the current time (years months days) is displayed on the display section (S3). In this state, a day in a month can be specified and the day to use the special-day time schedule selected at step S2 is specified (S4). Further, to specify a day to use the special-day time schedule in another month (S5), selection is specified by operating the switch section 13 and the calendar of the next month is displayed (S6) and the day to use the special-day time schedule is selected (S4). If setting is specified by operating the switch section 13 after the special-day time schedule is thus assigned to the desired day, setting is complete (S7).

Figure 24:
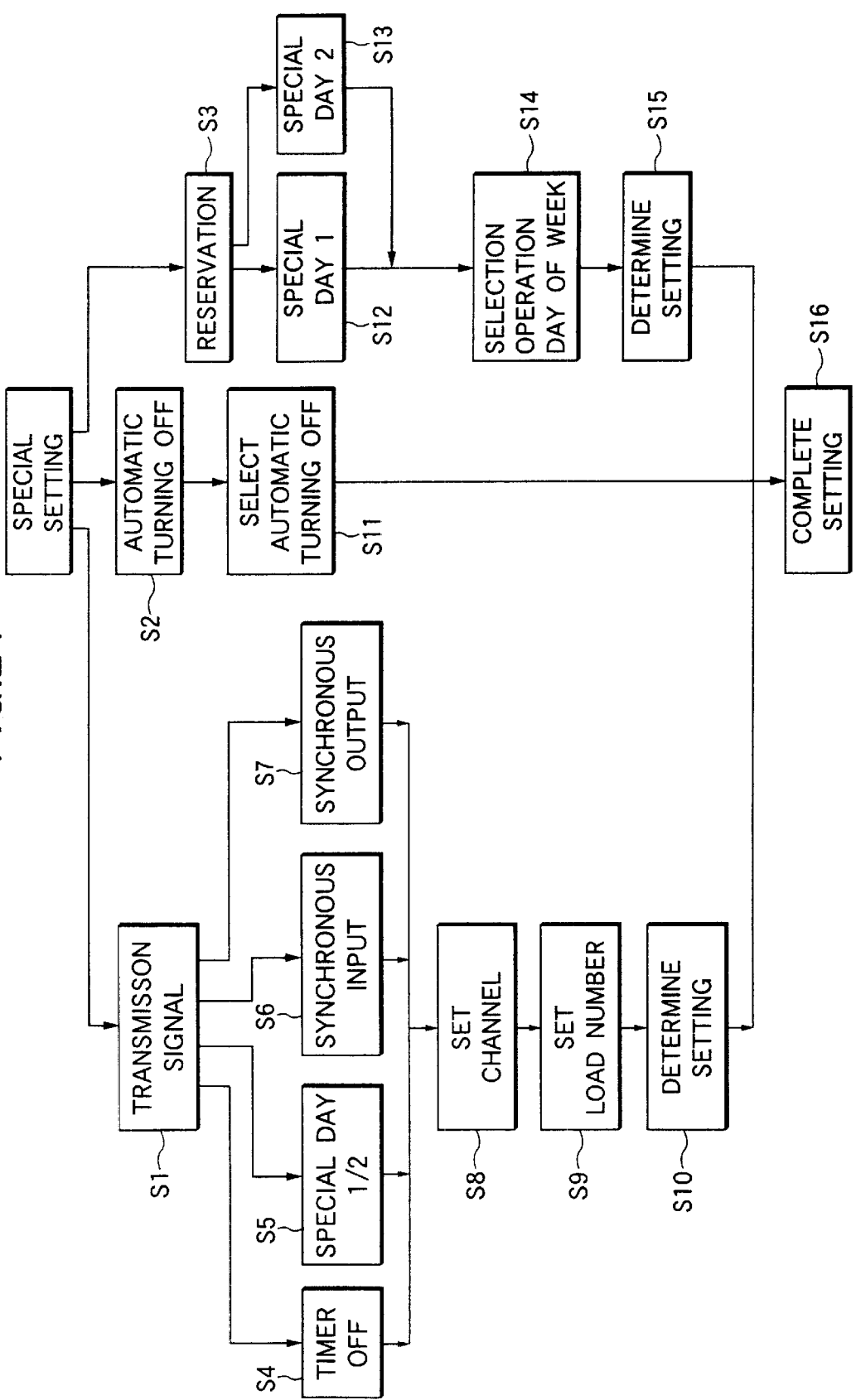
FIG. 24 is a flowchart of the operation of the embodiment of the invention.
Figure 25:
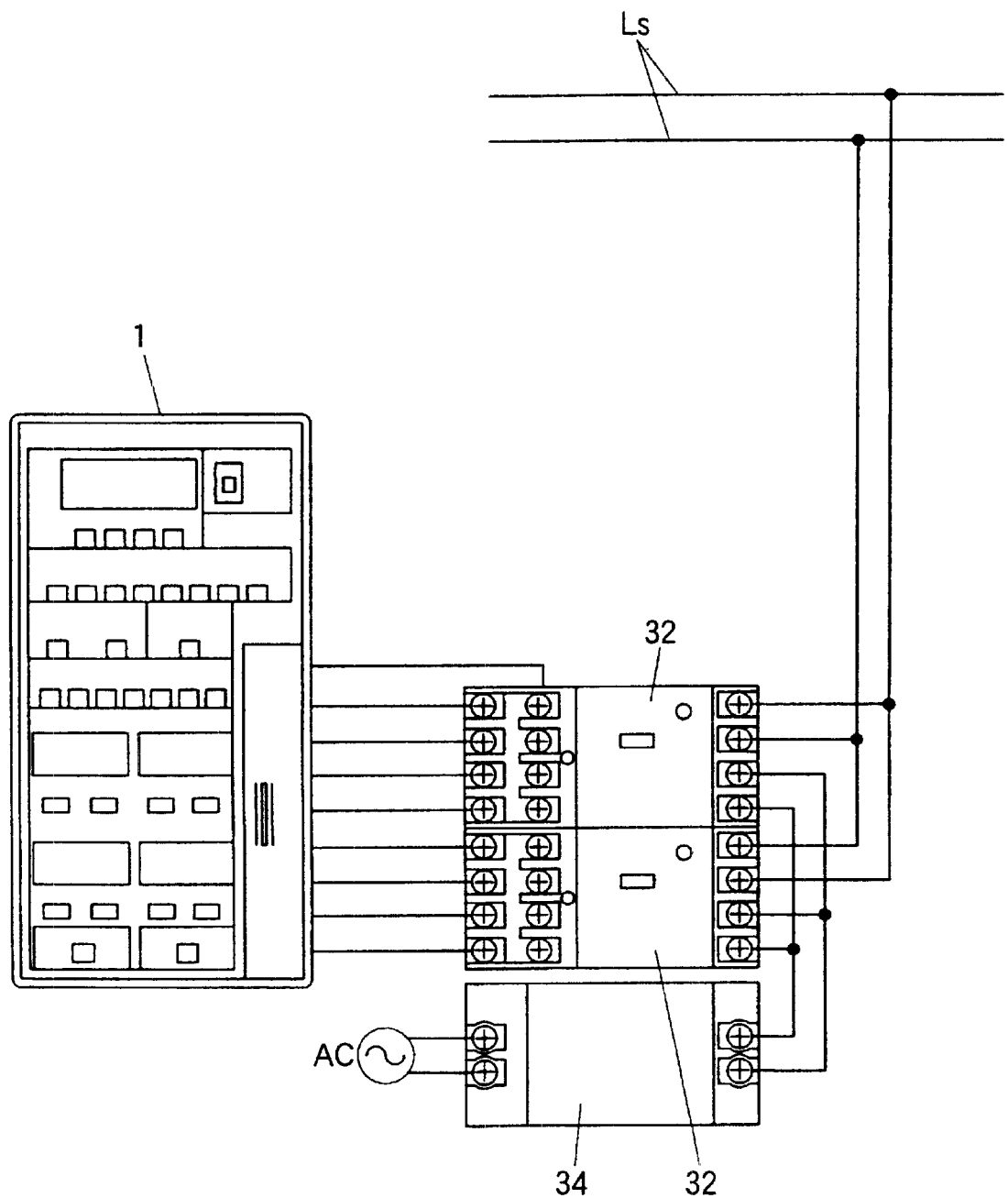
FIG. 25 is a drawing to show the use form in an example in a related art.

The program timer 1 of the embodiment also enables setting operation shown in FIG. 24 as special setting. That is, in the special setting, setting concerning a transmission signal (S1), setting concerning automatic turning off loads (assuming illumination loads) (S2), and reservation of the day of the week to use a special-day time schedule (S3) are enabled. In the setting concerning a transmission signal, the timer control stop address, the special-day address, the synchronous address for synchronous input, and the synchronous address for synchronous output can be set. To use a daylight saving time address, it can also be set. Which address is to be set is specified (S4 to S7) and the address is specified with the channel number and the load number (S8 and S9), then when the desired address is set, the setting is determined (S10). The automatic turning off is not the gist of the invention and will not be discussed here, but an automatic turning off mode can be selected (S11). Further, to reserve the day of the week to use a special-day time schedule, the special-day time schedule and the day of the week are selected (S12 to S14) and the setting is determined (S15). If the special setting is thus complete (S16), control returns to the initial state of the special setting and thus if the special setting is released, the operation makes the transition to the normal operation.

In the above-described embodiments, the remote supervisory control system of the type wherein the transmission unit 30 transmits a transmission signal in a dummy mode at the normal operation time and when the terminal 31, 32 receiving supervisory input generates an interrupt signal in synchronization with the transmission signal, the terminal 31, 32 is found and the transmission unit 30 receives the supervisory input is shown as an example. However, the operation for the transmission unit 30 to send a transmission signal with each address changed cyclically may be adopted. That is, the transmission unit 30 accesses the terminals 31 and 32 in the stipulated order and the terminal 31, 32 receiving supervisory input returns the supervisory input to the transmission unit 30 when it is accessed from the transmission unit 30.

Figure 27:
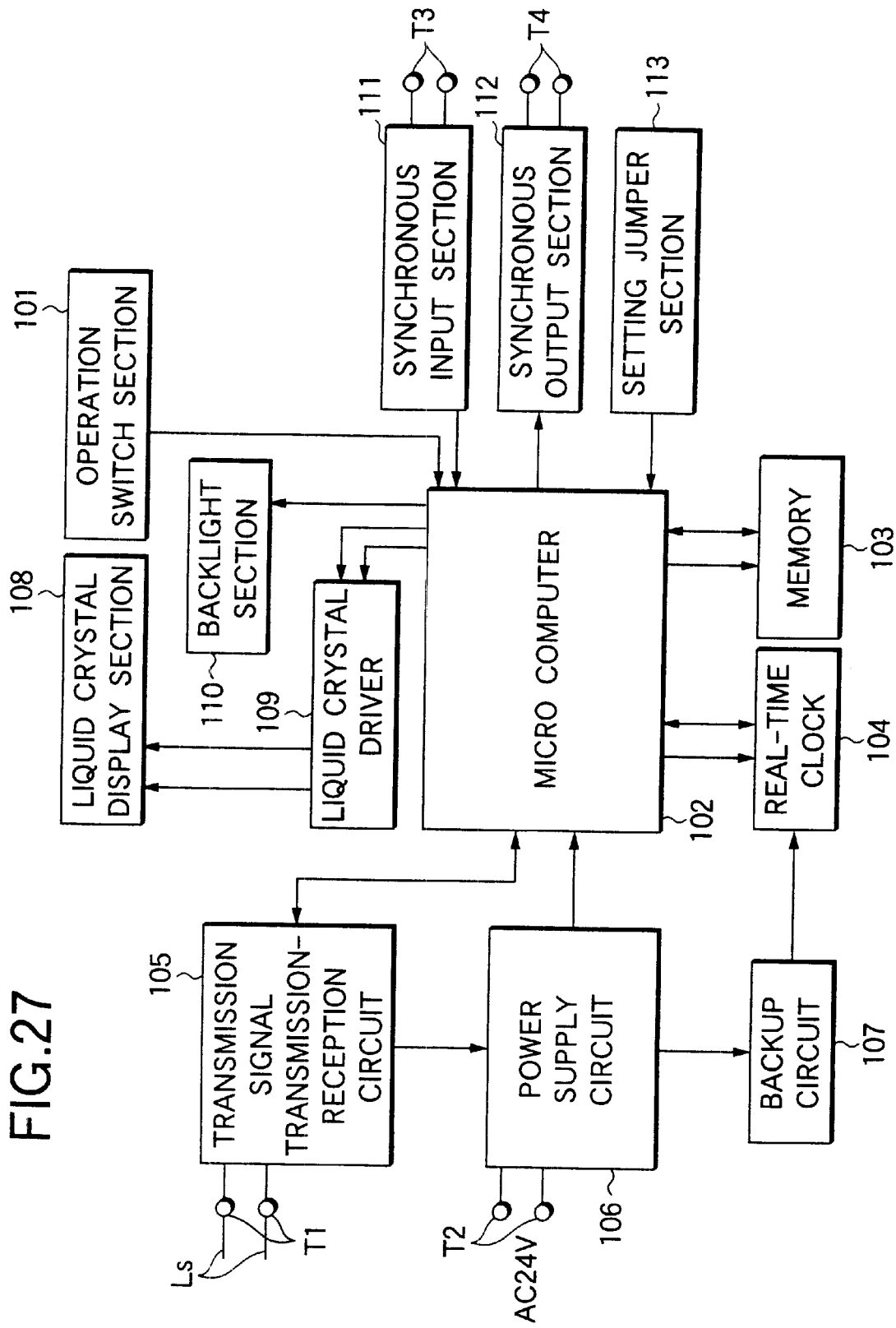
FIG. 27 is a circuit block diagram to show an embodiment of the invention.

FIG. 27 is a block diagram of a program timer unit of an embodiment of the invention. The program timer unit of the embodiment comprises an operation switch section 101, input means for inputting data containing the load control time and the load control contents, a microcomputer 102, program creation means for creating a load control program based on the data input through the operation switch section 101, memory 103, storage means for storing the created control program, a real-time clock, clock means for counting the current time, a transmission signal transmission-reception circuit 105, transmission signal transmission-reception means for transmitting and receiving a transmission signal Vs to and from a transmission unit 130 via a signal line Ls, a power supply circuit 106 for generating operating power of the sections containing the microcomputer 102 from a voltage of 124 VAC supplied from a remotely-controlled transformer 137, a backup circuit 107 for supplying operating power to the real-time clock 104 if the power supply from the power supply circuit 106 stops due to a power outage, etc., a liquid crystal display section 108, display means for displaying at least items of data that can be input through the operation switch section 101, a liquid crystal driver 109 for driving the liquid crystal display section 108 under the control of the microcomputer 102, a backlight section 110 for illuminating the liquid crystal display section 108 from the rear, and a synchronous input section 111 and a synchronous output section 112 for inputting a time correction signal from the outside and outputting a time correction signal to the outside at least on the hour, wherein the microcomputer 102, timer control means, generates supervisory data in sequence based on the current time data output from the real-time clock 104 and the control program read from the memory 103 and sends the generated supervisory data through the transmission signal transmission-reception circuit 105 to the signal line Ls.

Figure 28:
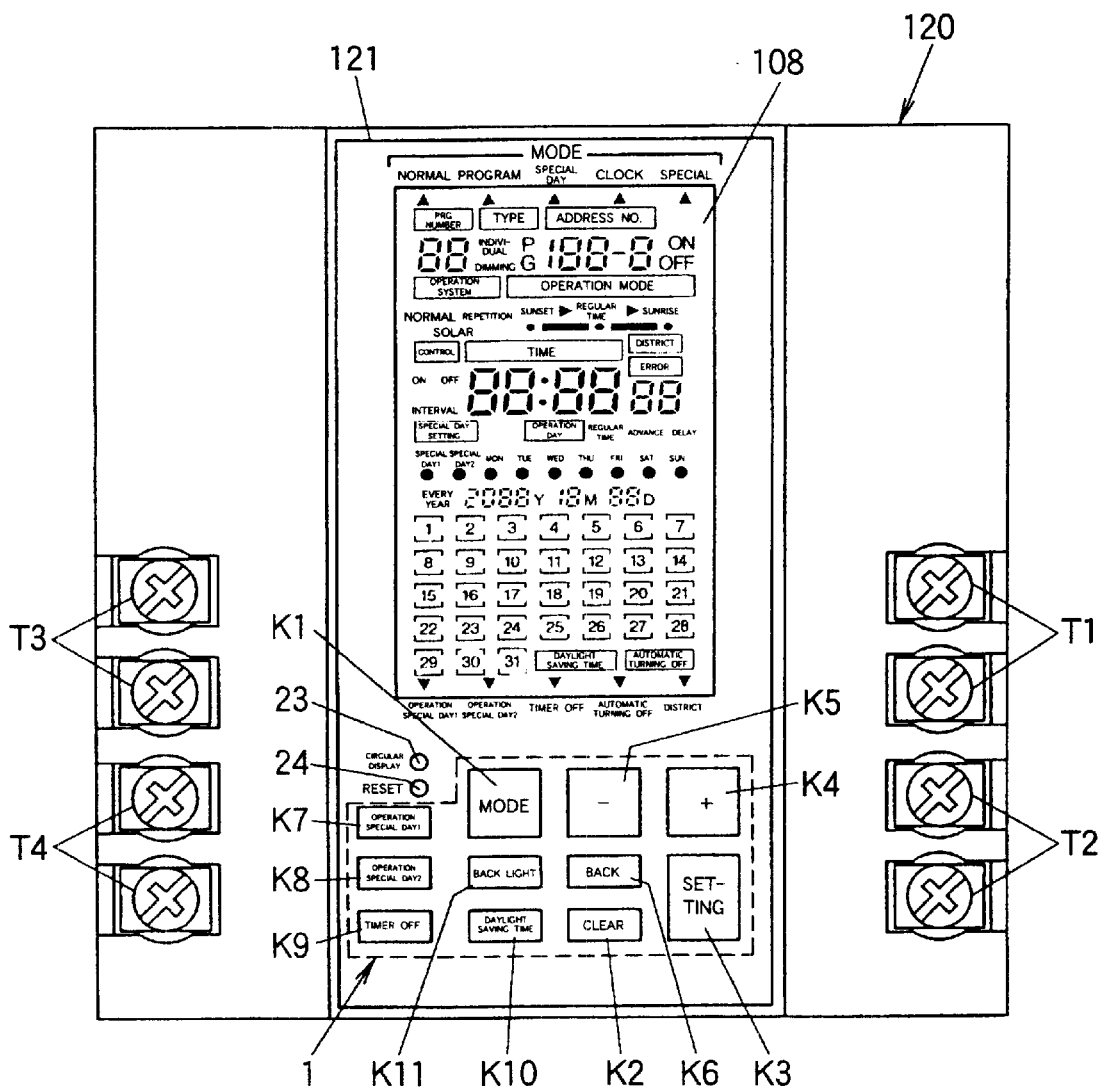
FIG. 28 is a front view of the embodiment of the invention.

The operation switch section 101 is formed of a key matrix using so-called rubber switches using elasticity of rubber as a return force of press operation. The key matrix is provided with a mode key K1, a clear key K2, a set key K3, an up key K4, a down key K5, a return key K6, a special-day 1 operation key K7, a special-day 2 operation key K8, a timer off key K9, a daylight saving time setting key K10, and a backlight key K11 (the keys K1 to K11 are pressed), as shown in FIG. 28. When any of the keys K1 to K11 is pressed, a signal is input to the input port of the microcomputer 102 corresponding to the pressed key.

The memory 103, which is formed of electrically rewritable nonvolatile semiconductor memory, such as EEPROM, stores a control program, data of the sunrise time and the sunset time for each region (described later), and the like in addition to the operation program of the microcomputer 102 and can retain the storage contents if the power supply stops due to a power outage, etc. The transmission signal transmission-reception circuit 105 is a circuit for enabling data to be transferred to and from the transmission unit 130 via the signal line Ls of the remote supervisory control system connected to signal line terminal T1, T1.

The power supply circuit 6 steps down AC voltage supplied from the remotely-controlled transformer 137 through power supply terminal T2, T2, then stabilizes rectified and smoothed DC voltage, thereby generating and outputting the operating voltage (for example, 5 VDC) of the microcomputer 102, etc. The backup circuit 107 comprises a large-capacity electrolytic capacitor charged at all times with the output voltage of the power supply circuit 106. When the power supply from the power supply circuit 106 stops due to a power outage, etc., the backup circuit 107 uses the charges of the electrolytic capacitor to supply the operating power to the real-time clock 104. The backup circuit 107 enables the real-time clock 104 to continue to count the current time within about 124 hours of a power outage.

The liquid crystal display section 108 is formed of an LCD panel of segment type TN and is driven by the liquid crystal driver 109, thereby producing various displays as described later. The backlight section 110 consists of several light emitting diodes and is turned on and off under the control of the microcomputer 102, as described later.

The synchronous input section 111 inputs a DC voltage signal input to synchronous input terminal T3, T3 (described later) to an input port of the microcomputer 102 through a photocoupler and the synchronous output section 112 outputs a signal output from an output port of the microcomputer 102 as a DC voltage signal from synchronous output terminal T4, T4 through the photocoupler.

The microcomputer 102 is provided with a serial port, through which the control program stored in the memory 103 can be output to the outside and the operation program of the microcomputer 102 can be rewritten. Numeral 113 in FIG. 1 denotes a setting jumper section for setting the microcomputer 102 to the above-described operation program rewrite mode, etc.

Figure 29:
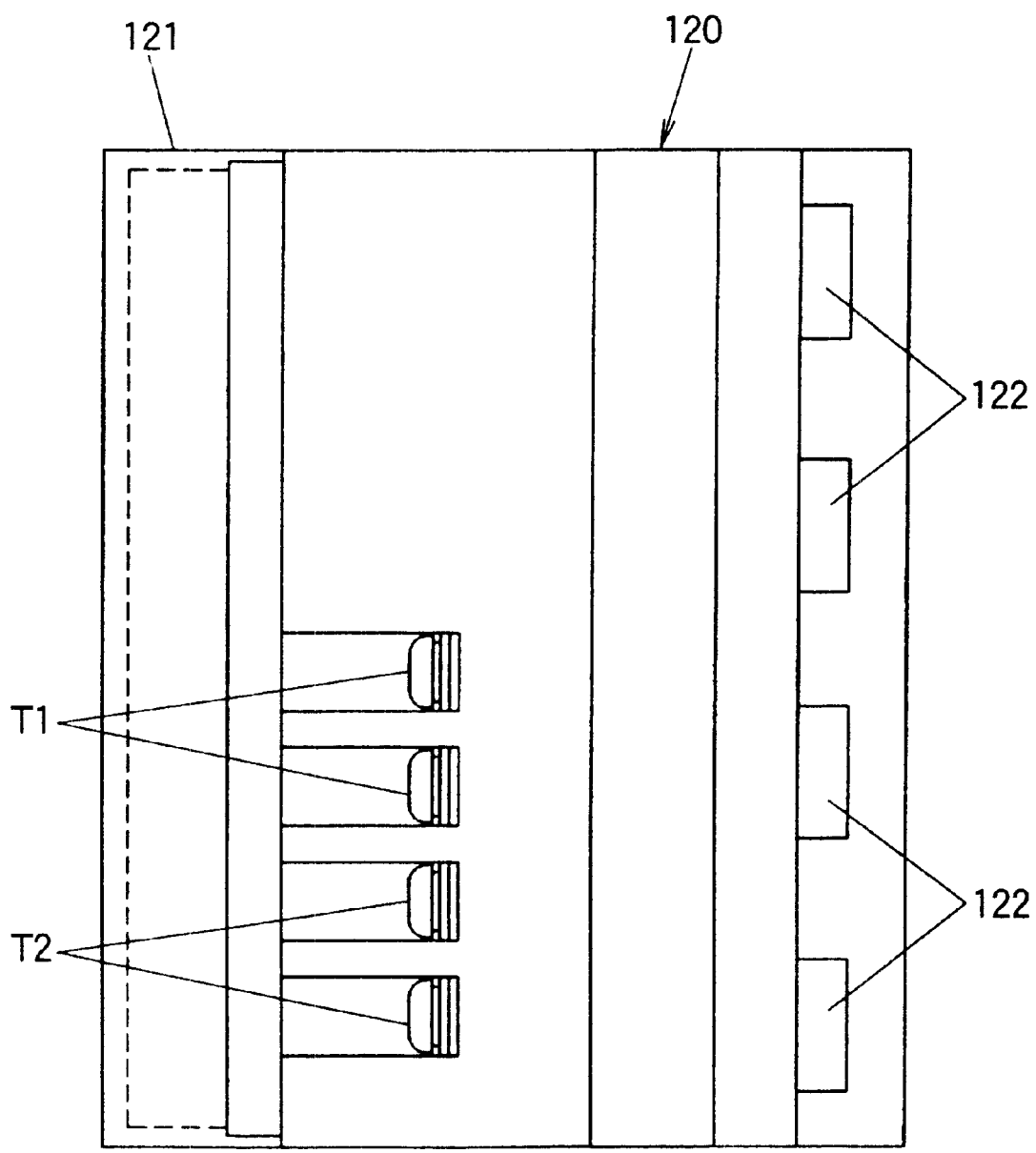
FIG. 29 is a side view of the embodiment of the invention.
Figure 30:
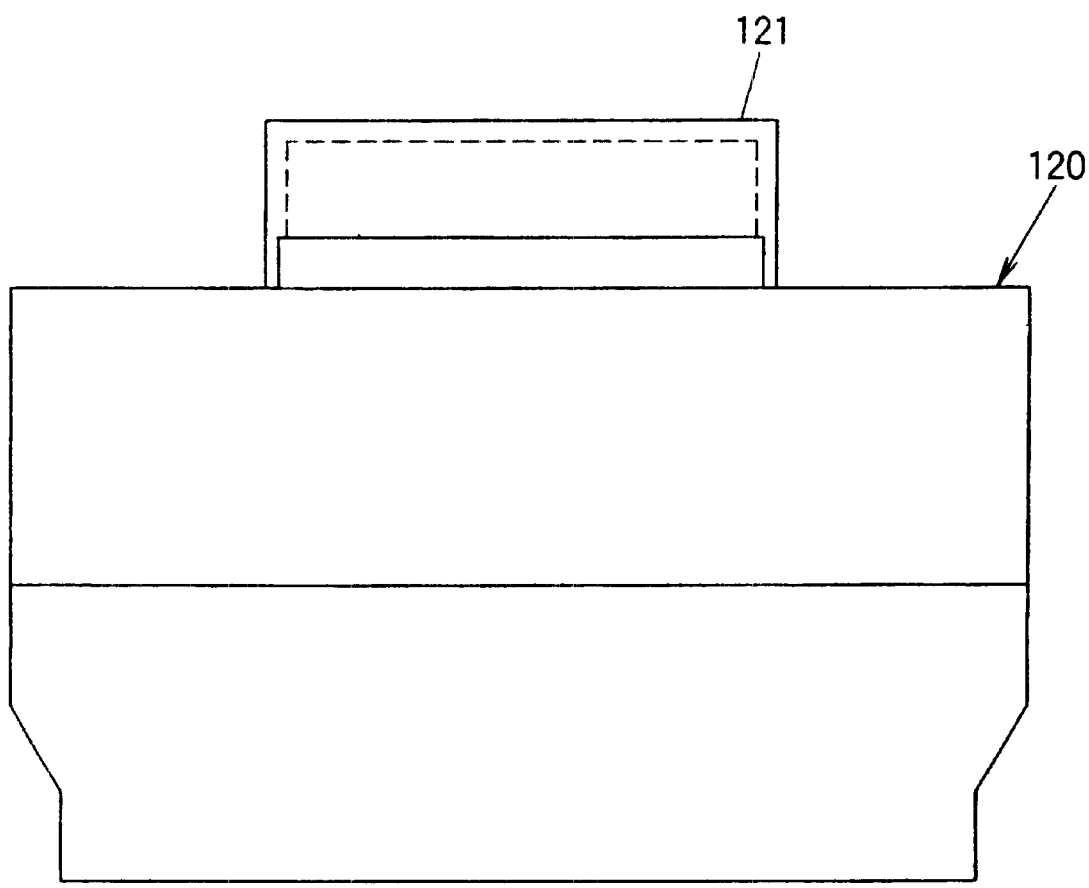
FIG. 30 is another side view of the embodiment of the invention.
Figure 31:
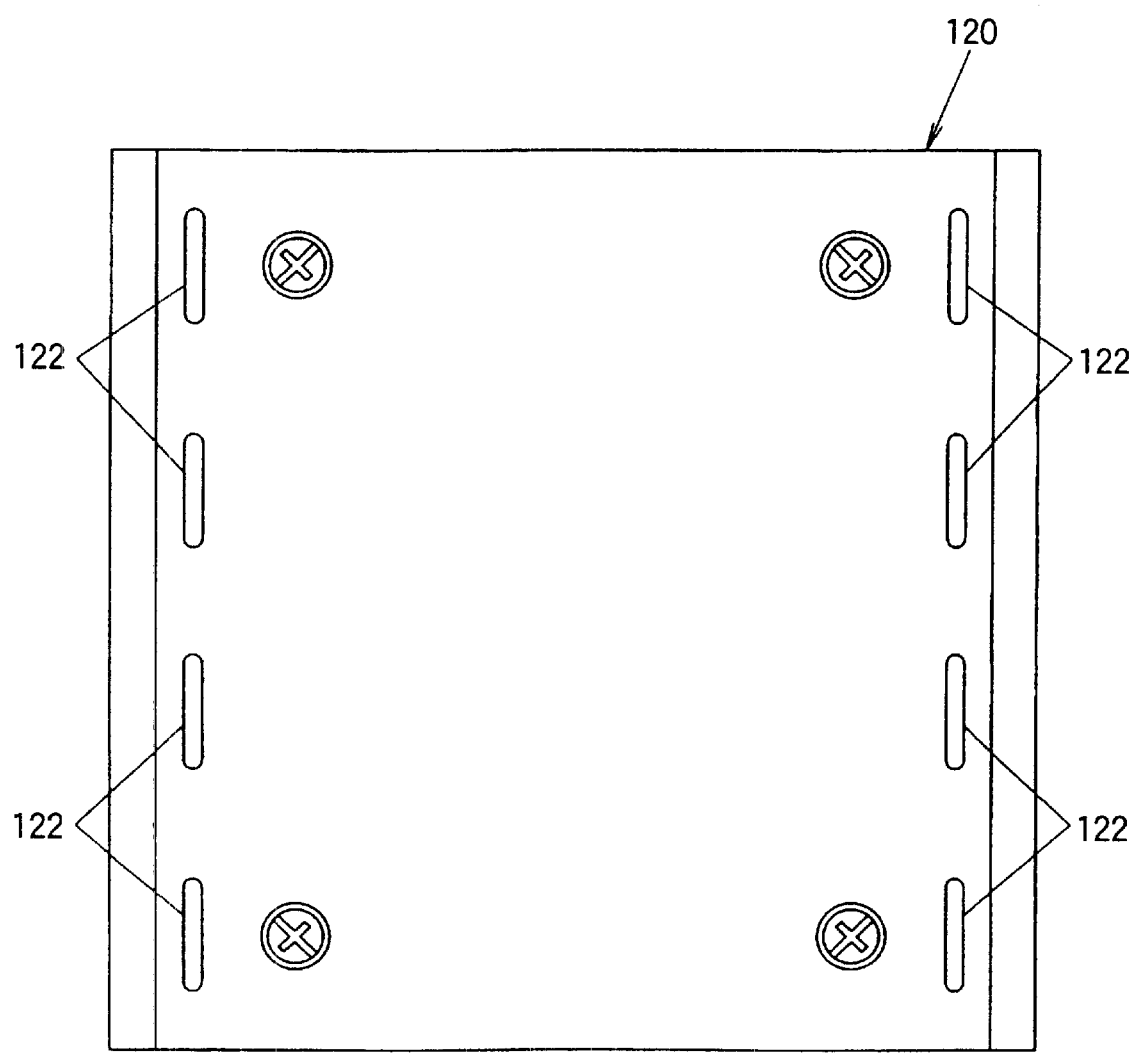
FIG. 31 is a rear view of the embodiment of the invention.

FIGS. 28 to 31 are external views of the program timer unit of the embodiment of the invention. The electronic parts of the microcomputer 102, etc., making up the above-described circuitry are mounted on a printed circuit board and housed in a cabinet 120 of a synthetic resin molded article. The cabinet 120 is shaped rightly like a rectangular parallelepiped and a projection board 121 for housing the liquid crystal display section 108 and the operation switch section 101 is projected roughly at the center of the front of the cabinet 120. A screen 108a of the liquid crystal display section 108 and the key matrix of the operation switch section 101 are exposed from the front of the projection board 121. The cabinet 120 is formed at both end parts with terminal section of press fastening screw type providing the signal line terminal T1, T1, the power supply terminal T2, T2, the synchronous input terminal T3, T3, and the synchronous output terminal T4, T4. The cabinet 120 is formed as dimensions four times the dimensions of a circuit breaker for agreement type wiring for a light distribution panelboard stipulated in Japanese Industrial Standards (JIS) (refer to JIS C8370 appendix 5). As shown in FIGS. 29 and 31, attachment claws of attachment plate (not shown) are retained in attachment holes 122 made in the rear and side, whereby the cabinet 120 can be easily disposed at an off-the-shelf distribution panelboard, etc., corresponding to the dimensions of the circuit breaker for agreement type wiring for a light distribution panelboard. Since the operation switch section 101 and the screen 108a of the liquid crystal display section 108 are exposed on the front of the projection board 121 projected on the front of the cabinet 120, when the cabinet 120 is disposed at the distribution panelboard, the front of the projection board 121 can be exposed through a notch window of a protective plate disposed inside a door of the distribution panelboard, and the operation switch section 101 can be operated and display on the screen 108a of the liquid crystal display section 108 can be visually checked without opening the protective plate, providing ease of use. The cabinet of the program timer unit 135 in the related art contains a plurality of contact output relays and thus is formed as dimensions eight times the dimensions of the circuit breaker for agreement type wiring for a light distribution panelboard. However, in the embodiment, the relays become unnecessary, so that it is made possible to miniaturize the dimensions of the cabinet 120 to about a half the dimensions of the cabinet in the related art and the installation space in the distribution panel can be reduced.

Figure 32:
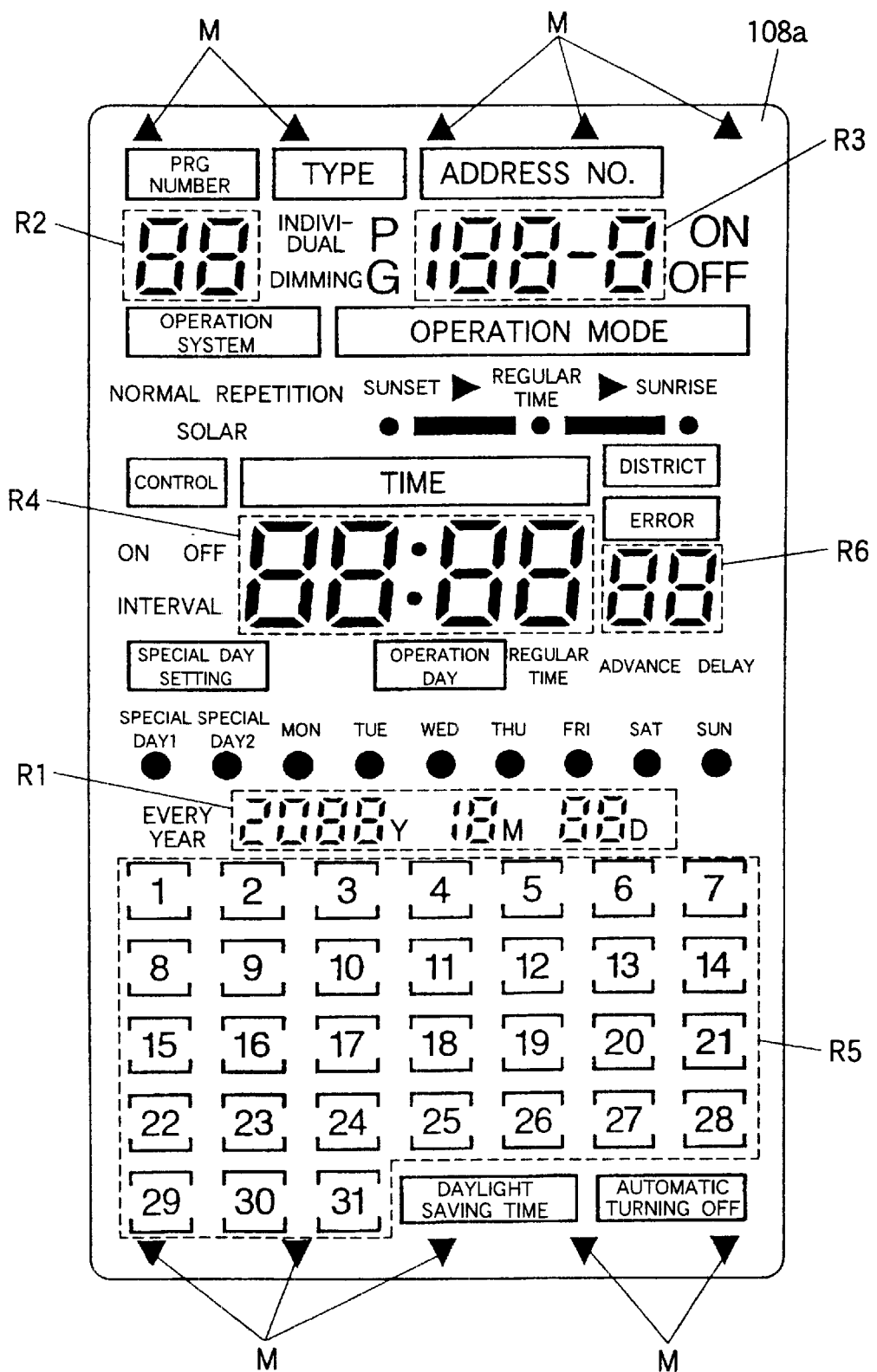
FIG. 32 is a schematic representation to describe screen display of a liquid crystal display section in the embodiment of the invention.

By the way, as shown in FIG. 32, in the surroundings of the screen 108a of the liquid crystal display section 108, character strings NORMAL, PROGRAM, SPECIAL DAY, CLOCK, and SPECIAL are represented from left to right along the top side and character string MODE is represented above the character strings, and character strings SPECIAL-DAY 1 OPERATION, SPECIAL-DAY 2 OPERATION, TIMER OFF, AUTOMATIC LIGHT TURNING OFF, and DISTRICT are represented from left to right along the bottom side. Marker M can be displayed at the points corresponding to the character strings NORMAL, PROGRAM, SPECIAL DAY, CLOCK, and SPECIAL represented along the top side in the surroundings of the screen 108a of the liquid crystal display section 108 and in the proximity of the character strings SPECIAL-DAY 1 OPERATION, SPECIAL-DAY 2 OPERATION, TIMER OFF, AUTOMATIC LIGHT TURNING OFF, and DISTRICT represented along the bottom side. The marker M is shown as reverse display (meaning that the display color is made different from the background color). This means that the marker M is used to indicate the current function being executed.

An energization indicator 123 being turned on at the power supply time from the power supply circuit 106 for indicating energization and a reset indicator being turned on when the microcomputer 102 is reset face the outside through a through hole made in the proximity of the operation switch section 101 on the front of the projection board 121.

Figure 33:
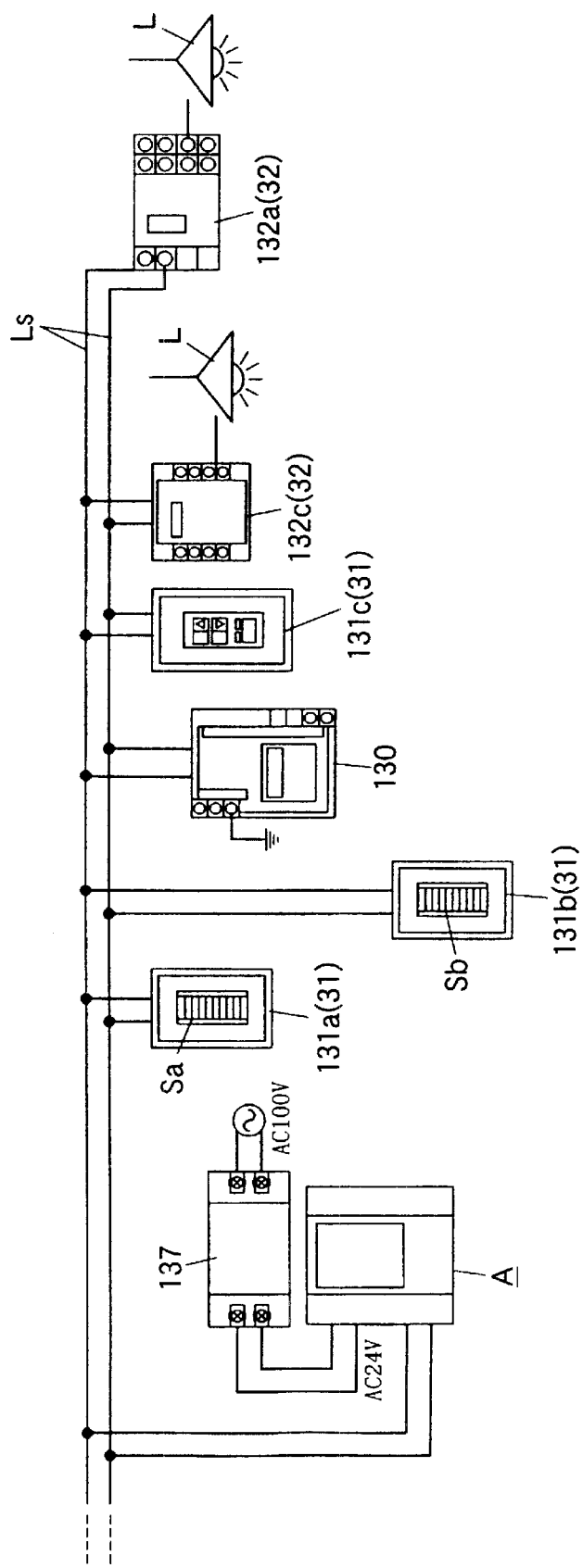
FIG. 33 is a system configuration diagram of a remote supervisory control system using the embodiment of the invention.

FIG. 33 is a system configuration diagram to show an example of a remote supervisory control system incorporating the program timer unit A of the embodiment. As compared with the system configuration shown in FIG. 26, the program timer unit A is connected to the signal line Ls in place of the program timer unit 35 in the related art and the unnecessary contact input terminal 36 in the related art is removed. The transmission unit 30, operation terminals 31, and control terminals 32 are the same as those in the related art and therefore will not be discussed again.

By the way, the microcomputer 102 of the program timer unit A includes five basic operation modes of a mode of generating supervisory data in sequence based on the current time data output from the real-time clock 104 and the control program read from the memory 103 and sending the generated supervisory data through the transmission signal transmission-reception circuit 105 to the signal line Ls for performing timer control (normal mode), a mode of creating a load control program based on the data input through the operation switch section 101 (program creation mode), a mode of setting a special day such as a national holiday (special-day setting mode), a mode of setting the current time of the real-time clock 104 (clock mode), and a mode of setting on/off, etc., the remote operation of special-day setting and the timer control function as described later (special mode). Whenever the mode key K1 of the operation switch section 101 is pressed, the normal mode, the program creation mode, the special-day setting mode, the clock mode, and the special mode are changed and selected cyclically, and the marker M in the proximity of the character string corresponding to the selected operation mode (NORMAL, PROGRAM, SPECIAL DAY, CLOCK, or SPECIAL) is reverse-displayed on the screen 108a of the liquid crystal display section 108. FIG. 32 shows the state of displaying all the characters, symbols, etc., that can be displayed on the screen 8a of the liquid crystal display section 108, and some characters, symbols, etc., are not displayed at the same time. Each display of the screen 108a of the liquid crystal display section 108 described below is produced by controlling the liquid crystal driver 109 by the microcomputer 102.

After the program timer unit A is constructed, first the current time of the real-time clock 104 needs to be set and thus the operator operates the mode key K1 of the operation switch section 101 for selecting the clock mode. When the clock mode is selected, the marker M corresponding to the character string CLOCK is reverse-displayed on the screen 108a of the liquid crystal display section 108 and the date counted by the real-time clock 104 is reverse-displayed in the format of years months days in a current time display area R1 of the screen 108a (see FIG. 32).

A year setting mode is entered just after the clock mode is selected. Whenever the operator presses the up key K4 or the down key K5, the reverse display of years in the current time display area R1 is incremented or decremented by one. After the reverse display of years in the current time display area R1 is set to the current year, the set key K3 is pressed for setting a month setting mode and likewise the up key K4 and the down key K5 are used to set the reverse display of months in the current time display area R1 to the current month. Likewise, the set key K3 is pressed for setting a day setting mode and the up key K4 and the down key K5 are used to set the reverse display of days in the current time display area R1 to the current day. In hour, minute setting mode, whenever the up key K4 or the down key K5 is pressed, the time (hours minutes) is reverse-displayed in a setup time display area R4 (described later) of the screen 108a and whenever the up key K4 or the down key K5 is pressed, the reverse display of hours, minutes in the setup time display area R4 is incremented or decremented by one (hour, minute) (see FIG. 32). If the up key K4 and the down key K5 are used to set the reverse display in the setup time display area R4 to the current time in the hour, minute setting mode, the data of the setup date and time is sent from the microcomputer 102 to the real-time clock 104 and the time counted by the real-time clock 104 is set to the current years months days and time according to the data. To return from each setting mode to the preceding mode (for example, to return from the month setting mode to the year setting mode), the return key K6 may be pressed. The memory 103 stores calendar data and the microcomputer 102 can determine days of the week corresponding to years months days from the calendar data.

Next, the operator presses the mode key K1 for selecting the special day setting mode for setting a special day such as a national holiday or an event. When the special day setting mode is selected, the marker M corresponding to the character string SPECIAL DAY is reverse-displayed on the screen 108a of the liquid crystal display section 108 and the current date is reverse-displayed in the format of years months days in the current time display area R1, character string SPECIAL DAY SETTING is reverse-displayed at the roughly center end part of the screen 108a, and a one-month calendar is reverse-displayed in a calendar display area R5 below the current time display area R1 (see FIG. 32).

In the embodiment, two special days (special days 1 and 2) can be set and the up key K4 and the down key K5 are used to select the special day to be set. If the set key K3 is pressed after the special day to be set is selected, a mode for selecting whether the special day is validated every year or only in a specific year (current year or next year) is entered. Whenever the up key K4 or the down key K5 is pressed, character string EVERY YEAR is reverse-displayed to the left of the current time display area R1 or the reverse display of years in the current time display area R1 is switched between the current year and the next year. After every year or the current year or the next year is selected, the set key K3 is pressed for setting the month setting mode and the up key K4 and the down key K5 are used to set the reverse display of months in the current time display area R1 to the month of the special day. Likewise, if the set key K3 is pressed for setting the day setting mode and the up key K4 and the down key K5 are pressed in the mode, the reverse display of days in the current time display area R1 is incremented and decremented and the selected day in the calendar display area R5 is reverse-displayed. If the set key K3 is pressed in a state in which the day to be set as the special day is reverse-displayed, the setup date data is stored in the memory 103 as the special day data. The operation is repeated, whereby a maximum of two special days can be set. The special day can be thus set while reverse display of selected months days is produced in the calendar display area R5, so that it is made very easy to set the special day.

Next, if the operator presses the mode key K1 for selecting the program creation mode, the marker M corresponding to the character string PROGRM is reverse-displayed on the screen 108a of the liquid crystal display section 108 and character string PRG NUMBER meaning the program number and the program number in a program number display area R2 below PRG NUMBER are reverse-displayed. In the embodiment, 130 control programs can be stored in the memory 103 and therefore any number of 1 to 30 can be reverse-displayed in the program number display area R2. A program number setting mode is entered just after the program creation mode is selected. Whenever the operator presses the up key K4 or the down key K5, the number reverse-displayed in the program number display area R2 is incremented or decremented by one. If the set key K3 is pressed in a state in which the program number of the program to be created is reverse-displayed in the program number display area R2, a transition is made to a load control type selection mode and character string TYPE is reverse-displayed in place of PRG NUMBER (see FIG. 32). The load control type can be selected in sequence from among INDIVIDUAL, GROUP, PATTERN, and DIMMING by pressing the up key K4 and the down key K5.

When INDIVIDUAL is selected as CONTROL TYPE, INDIVIDUAL below the character string TYPE and character string ADDRESS NO. to the right of TYPE are reverse-displayed on the screen 8a and the address number is reverse-displayed in an address number display area R3 below the character string ADDRESS NO. (see FIG. 32). In the address number display area R3, the address number is reverse-displayed in the format of channel number-load number and the channel number and the load number can be reverse-displayed separately. That is, a mode of setting the channel number of the address number is entered just after the set key K3 is pressed for selecting INDIVIDUAL and in this mode, the channel number is reverse-displayed. The channel number reverse-displayed in the address number display area R3 is incremented or decremented by pressing the up key K4 or the down key K5 when the channel number is reverse-displayed. If the set key K3 is pressed with any desired channel number reverse-displayed, the channel number is set and a transition is made to a mode of setting the load number. In this mode, the load number is reverse-displayed and the load number reverse-displayed in the address number display area R3 is incremented or decremented by pressing the up key K4 or the down key K5. If the set key K3 is pressed with any desired load number reverse-displayed, the load number is set and a transition is made to an OPERATION SYSTEM setting mode.

When a transition is made to the OPERATION SYSTEM setting mode, character string OPERATION SYSTEM below the address number display area R3 is reverse-displayed in place of TYPE and ADDRESS NO. (see FIG. 32). The operation system can be chosen between NORMAL and SOLAR by pressing the up key K4 or the down key K5. In the NORMAL operation system, the time turning on load (illumination load L) and the time turning off load (illumination load L) are set and when the current time reaches the on time, the load is turned on and when the current time reaches the off time, the load is turned off. On the other hand, the SOLAR operation system controls load based on the sunrise time and the sunset time at the installation location of the program timer unit.

When NORMAL is selected as the operation system, character string NORMAL is reverse-displayed below the character string OPERATION SYSTEM on the screen 108a. If the set key K3 is pressed, a transition is made to a mode of setting the time to turn on load (on time). Character strings CONTROL and TIME are reverse-displayed side by side below the character string NORMAL on the screen 108a and character string ON is reverse-displayed below the character string CONTROL and the time (hours minutes) is reverse-displayed in a setup time display area R4 below the character string TIME (see FIG. 32). Display of hours in the setup time display area R4 is incremented or decremented and is set to the hours of the on time by pressing the up key K4 or the down key K5, then the set key K3 is pressed for making a transition to a mode of setting minutes of the on time. Likewise, using the up key K4 or the down key K5, the reverse display of minutes in the setup time display area R4 is set to the digits of the hours of the on time. If the set key K3 is pressed in this state, a transition is made to a mode of setting the time to turn off load (off time). Display of hours in the setup time display area R4 is incremented or decremented and is set to the hours of the off time by pressing the up key K4 or the down key K5, then the set key K3 is pressed for making a transition to a mode of setting minutes of the off time. Likewise, using the up key K4 or the down key K5, the reverse display of minutes in the setup time display area R4 is set to the digits of the hours of the off time. Further, if the set key K3 is pressed from this state, a mode of setting the day of the week for controlling load is entered and character string OPERATION DAY is reverse-displayed below the character string in the setup time display area R4 on the screen 8a (see FIG. 32). A day of the week or a special day can be selected in order from among MON, TUES, WED, THURS, FRI, SAT, SUN, SPECIAL DAY 1, and SPECIAL DAY 2 by pressing the up key K4 or the down key K5, and the character string selected from among the character strings SPECIAL DAY 1, SPECIAL DAY 2, MON, TUES, WED, THURS, FRI, SAT, and SUN is reverse-displayed below the character string OPERATION DAY (see FIG. 32).

On the other hand, when SOLAR is selected as the operation system, character string SOLAR is reverse-displayed below the character string NORMAL on the screen 108a. If the set key K3 is pressed, a transition is made to a mode of selecting an operation mode from among SUNSET-SUNRISE, SUNSET-REGULAR TIME, and REGULAR TIME-SUNRISE and one of the three operation modes can be selected in order by pressing the up key K4 or the down key K5. At this time, character string OPERATION MODE is reverse-displayed below the address number display area R3 on the screen 108a and character strings SUNSET, REGULAR TIME, and SUNRISE are reverse-displayed below the character string OPERATION MODE and symbols are reverse-displayed between the character strings and below the character strings (see FIG. 32). The SUNSET-SUNRISE operation mode is to turn on illumination load L at the sunset time and turn off illumination load L at the sunrise time, the SUNSET-REGULAR TIME operation mode is to turn on illumination load L at the sunset time and turn off illumination load L at the REGULAR TIME set to the time different from the sunrise time, and the REGULAR TIME-SUNRISE is to turn on illumination load L at the REGULAR TIME set to the time different from the sunset time and turn off illumination load L at the sunrise time. The sunset time and the sunrise time are provided by reading from the memory 103, data of yearly sunset times and sunrise times in the district selected in DISTRICT SETTING in a special mode as described later.

If the operator presses the set key K3 after selecting SUNSET-SUNRISE as the OPERATION MODE, a transition is made to a mode of advancing or delaying load control to be originally performed at the sunset time. When a transition is made to the mode, character string ADVANCE or DELAY is reverse-displayed below the setup time display area R4 on the screen 108a (see FIG. 32). If the operator presses the set key K3 after selecting either ADVANCE or DELAY, he or she can use the up key K4 or the down key K5 to select the time advancing or delaying the sunset time in units of one minute in the range of 0 to 90 minutes. At this time, the time is displayed in one-minute units in a time display area R6 to the right of the setup time display area R4 on the screen 108a (see FIG. 32). To perform load control at the sunset time, 0 minutes may be selected as the time. If the set key K3 is pressed after the time advancing or delaying the sunset time is selected, then a transition is made to a mode of advancing or delaying load control to be performed at the sunrise time. Using the up key K4 or the down key K5, the time can be selected in units of one minute in the range of 0 to 90 minutes in a similar manner to that described above. If the operator presses the set key K3 after selecting the time advancing or delaying the sunrise time, the mode of setting the day of the week for controlling load previously described is entered and the character string OPERATION DAY is reverse-displayed below the character string in the setup time display area R4 on the screen 108a (see FIG. 32). The operation in the setting mode is as previously described and therefore will not be discussed again.

If the operator presses the set key K3 after selecting SUNSET-REGULAR TIME as the OPERATION MODE, a transition is made to the mode of advancing or delaying load control to be originally performed at the sunset time as described above. If the operator presses the set key K3 after selecting the time advancing or delaying the sunset time, a transition is made to a mode of setting REGULAR TIME. In the REGULAR TIME setting mode, character string REGULAR TIME is reverse-displayed below the setup time display area R4 on the screen 108a (see FIG. 32) and the time of REGULAR TIME is set in a similar manner to that of setting the on time or the off time when the NORMAL OPERATION SYSTEM is selected. If the operator presses the set key K3 several times after setting the time of REGULAR TIME, the mode of advancing or delaying load control to be performed at the sunrise time is entered, then the mode of setting the day of the week for controlling load is entered as with the SUNSET-SUNRISE OPERATION MODE.

Further, if the set key K3 is pressed after REGULAR TIME-SUNRISE is selected as the OPERATION MODE, the time of REGULAR TIME is set as with SUNSET-REGULAR TIME. If the set key K3 is pressed several times after the time of REGULAR TIME is set, the mode of setting the day of the week for controlling load is entered as with the SUNSET-SUNRISE and SUNSET-REGULAR TIME OPERATION MODEs.

Upon completion of setting the day of the week, the microcomputer 102 creates a load control program based on the contents set so far and stores the created control program in the memory 103 in relation to the first selected program number.

On the other hand, when GROUP (or DIMMING) is selected as CONTROL TYPE, G (or DIMMING) below the character string TYPE and the character string ADDRESS NO. to the right of TYPE are reverse-displayed on the screen 108a and the group number (or dimming number) is reverse-displayed in the address number display area R3 below the character string ADDRESS NO. and the group number of 1 to 127 (or dimming number of 1 to 16) is reverse-displayed in the range in which the channel number is displayed in the address number display area R3 (see FIG. 32). If the up key K4 or the down key K5 is pressed in this state, the group number (or dimming number) reverse-displayed in the address number display area R3 is incremented or decremented and if the set key K3 is pressed with any desired group number (or dimming number) reverse-displayed, the group number (or dimming number) is set and a transition is made to the OPERATION SYSTEM setting mode. Upon completion of selecting the day of the week according to a similar procedure to that when INDIVIDUAL is selected, the microcomputer 102 creates a load control program based on the contents set so far and stores the created control program in the memory 103 in relation to the first selected program number.

Further, when PATTERN is selected as CONTROL TYPE, P below the character string TYPE and the character string ADDRESS NO. to the right of TYPE are reverse-displayed on the screen 108a and the pattern number is reverse-displayed in the address number display area R3 below the character string ADDRESS NO. and the pattern number of 1 to 72 is reverse-displayed in the range in which the channel number is displayed in the address number display area R3 (see FIG. 6). If the up key K4 or the down key K5 is pressed in this state, the pattern number reverse-displayed in the address number display area R3 is incremented or decremented and if the set key K3 is pressed with any desired pattern number reverse-displayed, the pattern number is set and a transition is made to the OPERATION SYSTEM setting mode.

In the OPERATION SYSTEM setting mode, the operation system can be selected from among NORMAL, SOLAR, and REPETITION. In the NORMAL operation system in PATTERN, the pattern control time of load is set and when the current time reaches the setup time, pattern control selected with the pattern number is performed. The SOLAR operation system performs pattern control selected with the pattern number at the sunrise time and the sunset time at the installation location of the program timer unit. Time setting in the NORMAL operation system and setting ADVANCE or DELAY of the sunset time or the sunrise time in the SOLAR operation system are almost the same as those in INDIVIDUAL described above and therefore will not be discussed again in detail.

On the other hand, in the REPETITION operation system, the load control start time (start time), the load control end time (end time), and the control execution interval (interval time) are set and pattern control selected with the pattern number is performed every interval time between the start time and the end time.

When REPETITION is selected as the operation system, character string REPETITION is reverse-displayed below the character string OPERATION SYSTEM on the screen 108*a*. If the set key K3 is pressed, a transition is made to a mode of setting the start time, character string ON is reverse-displayed below the character string CONTROL on the screen 108*a*, and the time (hours minutes) is reverse-displayed in the setup time display area R4 below the character string TIME (see FIG. 32). Display of hours in the setup time display area R4 is incremented or decremented and is set to the hours of the start time by pressing the up key K4 or the down key K5, then the set key K3 is pressed for making a transition to a mode of setting minutes of the start time. Likewise, using the up key K4 or the down key K5, the reverse display of minutes in the setup time display area R4 is set to the digits of the minutes of the start time. If the set key K3 is pressed in this state, a transition is made to a mode of setting the end time. Display of hours in the setup time display area R4 is incremented or decremented and is set to the hours of the end time by pressing the up key K4 or the down key K5, then the set key K3 is pressed for making a transition to a mode of setting minutes of the end time. Likewise, using the up key K4 or the down key K5, the reverse display of minutes in the setup time display area R4 is set to the digits of the minutes of the end time. If the set key K3 is pressed in this state, a transition is made to a mode of setting the interval time. Display of hours in the setup time display area R4 is incremented or decremented and is set to the hours of the interval time (0 to 2) by pressing the up key K4 or the down key K5, then the set key K3 is pressed for making a transition to a mode of setting minutes of the interval time. Likewise, using the up key K4 or the down key K5, the reverse display of minutes in the setup time display area R4 is set to the digits of the minutes of the interval time (0 to 60). Further, if the set key K3 is pressed from this state, the mode of setting the day of the week for controlling load is entered and the character string OPERATION DAY is reverse-displayed below the character string in the setup time display area R4 on the screen 8*a* (see FIG. 32). The operation in the setting mode is as previously described and therefore will not be discussed again. Upon completion of selecting the day of the week according to a similar procedure to that when NORMAL or SOLAR is selected, the microcomputer 102 creates a load control program based on the contents set so far and stores the created control program in the memory 103 in relation to the first selected program number.

By the way, if the operator presses the mode key K1 for selecting the special mode, the marker M corresponding to the character string SPECIAL is reverse-displayed on the screen 8*a* of the liquid crystal display section 108 (see FIG. 28). Five modes of SPECIAL DAY 1 OPERATION, SPECIAL DAY 2 OPERATION, TIMER OFF, AUTOMATIC TURNING OFF, and DISTRICT are available as the special mode. Just after the special mode is selected, the SPECIAL DAY 1 OPERATION mode is selected and the marker M corresponding to the character string SPECIAL DAY 1 OPERATION is reverse-displayed (see FIG. 28). In the SPECIAL DAY 1 OPERATION and SPECIAL DAY 2 OPERATION modes, the channel number and the load number of the switch of the operation terminal 131 assigned as a discrete switch are set, whereby when the switch is pressed and the corresponding control data is transmitted from the transmission unit 130, the day following the point in time can be set to special day 1 or 2. When the switch is operated once more, the special day 1 or 2 set according to the procedure can be canceled. This means that the special day 1 or 2 can be set and reset by operating the remote switch, improving the ease-of-use of the program timer unit. If the special-day 1 operation key K7 or the special-day 2 operation key K8 belonging to the key matrix of the operation switch section 101 is pressed, the day following the key pressing can also be set to the special day 1 or 2 as the switch is pressed.

If the TIMER OFF mode is selected, the marker M corresponding to the character string TIMER OFF is reverse-displayed (see FIG. 28). In the TIMER OFF mode, the channel number and the load number of the switch of the operation terminal 131 assigned as a discrete switch (switch different from the switch for the special day 1 or 2) are set, whereby when the switch is pressed and the corresponding control data is transmitted from the transmission unit 130, the microcomputer 102 does not perform timer control following the control program. When the switch is operated once more, the microcomputer 102 performs timer control following the control program as usual. This means that the timer control of the microcomputer 102 can be turned on and off by operating the remote switch, improving the ease-of-use of the program timer unit. If the timer off key K9 belonging to the key matrix of the operation switch section 101 is pressed, the timer control can also be turned on and off as the switch is pressed. The procedure of setting the address (channel number and load number) in the SPECIAL DAY 1 OPERATION, SPECIAL DAY 2 OPERATION, and TIMER OFF modes is the same as the address setting procedure in CONTROL TYPE of INDIVIDUAL and therefore will not be discussed again.

Further, if the DISTRICT SETTING mode is selected, the marker M corresponding to the character string DISTRICT SETTING is reverse-displayed (see FIG. 28). That is, the Japan area is previously divided into 12 districts (Hokkaido, Tohoku, Kanto, Tokai, etc.,) and data of yearly sunset times and sunrise times for each district is stored in the memory 103 and in the DISTRICT SETTING mode, the district where the system is installed is specified by selecting the district number ranging from 1 to 12. When the SOLAR OPERATION SYSTEM is selected, the microcomputer 102 reads the data corresponding to the district number selected in the DISTRICT SETTING mode from the memory 103 and creates a control program, so that it is made very easy to set the sunset times and the sunrise times. In the embodiment, the data of the sunset times and the sunrise times in the 12 districts into which the Japan area is divided is stored in the memory 103; in addition, the data of the sunset times and the sunrise times responsive to the latitude and longitude may be stored in the memory 103 and the latitude and longitude of the location where the system is installed may be entered, whereby the sunset times and the sunrise times may be set automatically. This method is useful particularly to use the system oversea.

If the AUTOMATIC TURNING OFF mode is selected, the marker M corresponding to the character string AUTOMATIC TURNING OFF is reverse-displayed (see FIG. 28). In the AUTOMATIC TURNING OFF mode, the function of automatically turning off display on the liquid crystal display section 108 after the expiration of a predetermined time (for example, 10 minutes) from the last operation of the operation switch section 101 can be turned on and off. If the AUTOMATIC TURNING OFF function is turned on, the character string AUTOMATIC TURNING OFF is reverse-displayed below the calendar display area R5 on the screen 108*a* (see FIG. 32). When the AUTOMATIC TURNING OFF function is on, only the current time in the setup time display area R4 may be displayed without being turned off. Thus, display of the screen 108*a* of the liquid crystal display section 108 is turned off whenever unnecessary, whereby energy can be saved.

On the other hand, if the backlight key K11 belonging to the operation switch section 101 is pressed, the function of automatically turning off the backlight section 110 after the expiration of a predetermined time (for example, five minutes) from the last operation of the operation switch section 101 can be turned on and off. That is, to operate the operation switch section 101 for creating a control program, etc., if the backlight section 110 is turned on, the screen 108a becomes easier to see and workability is enhanced. In other cases, the backlight section 110 need not be turned on and thus can be turned off whenever unnecessary for saving energy.

If the daylight saving time key K10 belonging to the operation switch section 101 is pressed, the daylight saving time mode can be made effective or ineffective. That is, if the daylight saving time key K10 is pressed for making the daylight saving time mode effective, character string DAYLIGHT SAVING TIME is reverse-displayed below the calendar display area R5 on the screen 8a (see FIG. 32). The microcomputer 102 adopts the time resulting from advancing the time counted by the real-time clock 104 by a predetermined time as the current time for performing timer control, etc.

When the time counted by the real-time clock 104 (current time) matches the time set in the control program read from the memory 103 (on time, off time, sunset time, sunrise time, etc.), the microcomputer 102 generates supervisory data in sequence (for example, the same channel number and load number as the discrete switch Sa for individually controlling the illumination loads L to be controlled) and sends the supervisory data through the transmission signal transmission-reception circuit 105 to the transmission unit 130 via the signal line Ls for performing timer control of the illumination loads L.

Figure 35:
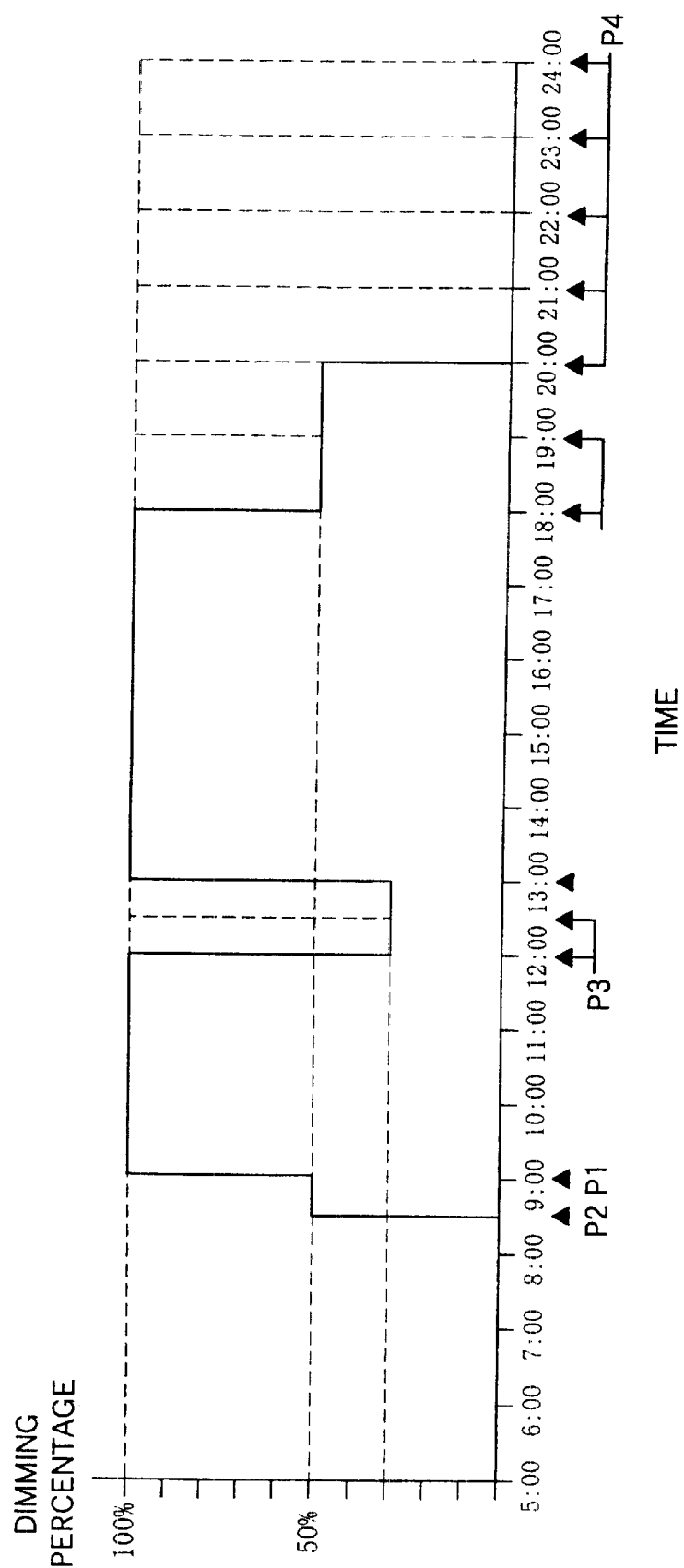
FIG. 35 is a schematic representation of the operation of the embodiment of the invention.

Next, the operation of the program timer unit A of the embodiment will be discussed by taking as an example, control of illumination loads L installed in an office in a system configuration as shown in FIG. 33. FIG. 34 shows examples of control programs. The control program with program number 1 executes pattern P2 with pattern number 2 for dimming the illumination loads L at a dimming percentage of 50% (assuming that output to the illumination loads L when all are turned on is 100%) at 8:30 from Monday to Friday and special day 2. The control program with program number 2 executes pattern P1 with pattern number 1 for turning on all illumination loads L at 9:00 from Monday to Friday and special day 2. The control program with program number 3 executes pattern P3 with pattern number 3 for dimming the illumination loads L at a dimming percentage of 30% at 30-minute interval time from the start time 12:00 to the end time 12:30 from Monday to Friday. The control program with program number 4 executes pattern P1 with pattern number 1 at 13:00 from Monday to Friday and the control program with program number 5 executes pattern P2 with pattern number 2 at one-hour interval time from the start time 18:00 to the end time 19:00 from Monday to Friday. The control program with program number 6 executes pattern P4 with pattern number 4 for turning off the illumination loads L at one-hour interval time from the start time 20:00 to the end time 24:00 from Monday to Friday. Further, the control program with program number 7 executes pattern P4 with pattern number 4 at one-hour interval time from the start time 7:00 to the end time 24:00 on Saturday, Sunday, and special day 1 and the control program with program number 8 executes pattern P4 with pattern number 4 at one-hour interval time from the start time 12:00 to the end time 24:00 on special day 2. Before the control programs are created, using a pattern setting unit, etc., the control state of each illumination load L corresponding to each pattern number is set and relation data is created and is transferred to the transmission unit 30, for example, as previously described in the related art example, In FIGS. 35 to 37, the dimming percentage of the illumination loads L [%] is taken on the vertical axis and the time (from 5:00 to 24:00) is taken on the horizontal axis and timer control on Monday to Friday, timer control on Saturday, Sunday, and special day 1, and timer control on special day 2 are shown. That is, as shown in FIG. 35, when the current time reaches 8:30 on every weekday (Monday to Friday), the microcomputer 2 executes timer control following the control program with the program number 1 for turning on the illumination loads L at a dimming percentage of 50% (pattern P2) and when the time reaches 9:00, the microcomputer 2 executes timer control following the control program with the program number 2 for turning on all illumination loads L (pattern P1). That is, assuming that the office work start time is 9:00, the illumination loads L are turned on at a dimming percentage of 50% from 8:30 (30 minutes before the work start time) to the work start time and when the work start time is reached, all illumination loads L are turned on, so that wasted illumination before the work start time is prevented for saving energy.

When the time reaches 12:00 (lunch break start time), the microcomputer 2 executes timer control following the control program with the program number 3 for turning on the illumination loads L at a dimming percentage of 30%. At this time, REPETITION is selected as the control mode and thus, for example, if someone operates the switch and all illumination loads are left on, the microcomputer 2 executes timer control for turning on the illumination loads L at a dimming percentage of 30% again after the expiration of the 30-minute interval time from 12:00. Thus, if someone forgets in turning off the illumination loads L as described above, the illumination loads L can be prevented from being turned on wastefully for saving energy. When the time reaches 13:00 (lunch break end time), the microcomputer 102 executes timer control following the control program with the program number 4 for turning on all illumination loads L and when the work end time (18:00) is reached, the microcomputer 102 executes timer control following the control program with the program number 5 for turning on the illumination loads L at a dimming percentage of 50%. In the control program with the program number 5, REPETITION at one-hour interval time is selected as the control mode. That is, assuming that the overtime is separated on a hourly basis, if an employee working overtime turns on all illumination loads L by operating the switch as required and leaves the office with all illumination loads L on, the microcomputer 102 executes timer control for turning on the illumination loads L at a dimming percentage of 50% again every expiration of one hour from the work end time (19:00 and 20:00), so that if the employee forgets in turning off the illumination loads L as described above, the illumination loads L can be prevented from being turned on wastefully for saving energy.

When the time reaches 20:00, the microcomputer 102 executes timer control following the control program with the program number 6 for turning off the illumination loads L (pattern P4). In the control program with the program number 6, REPETITION at one-hour interval time is selected as the control mode. Thus, if the employee working overtime forgets in turning off the illumination loads L and leaves the office as described above, the microcomputer 102 executes timer control for turning off the illumination loads L again every expiration of one hour from 20:00, so that if the employee forgets in turning off the illumination loads L as described above, the illumination loads L can be prevented from being turned on wastefully for saving energy. The timer control of the program time unit A is not performed from 24:00 to 8:30 on the following morning.

Figure 36:
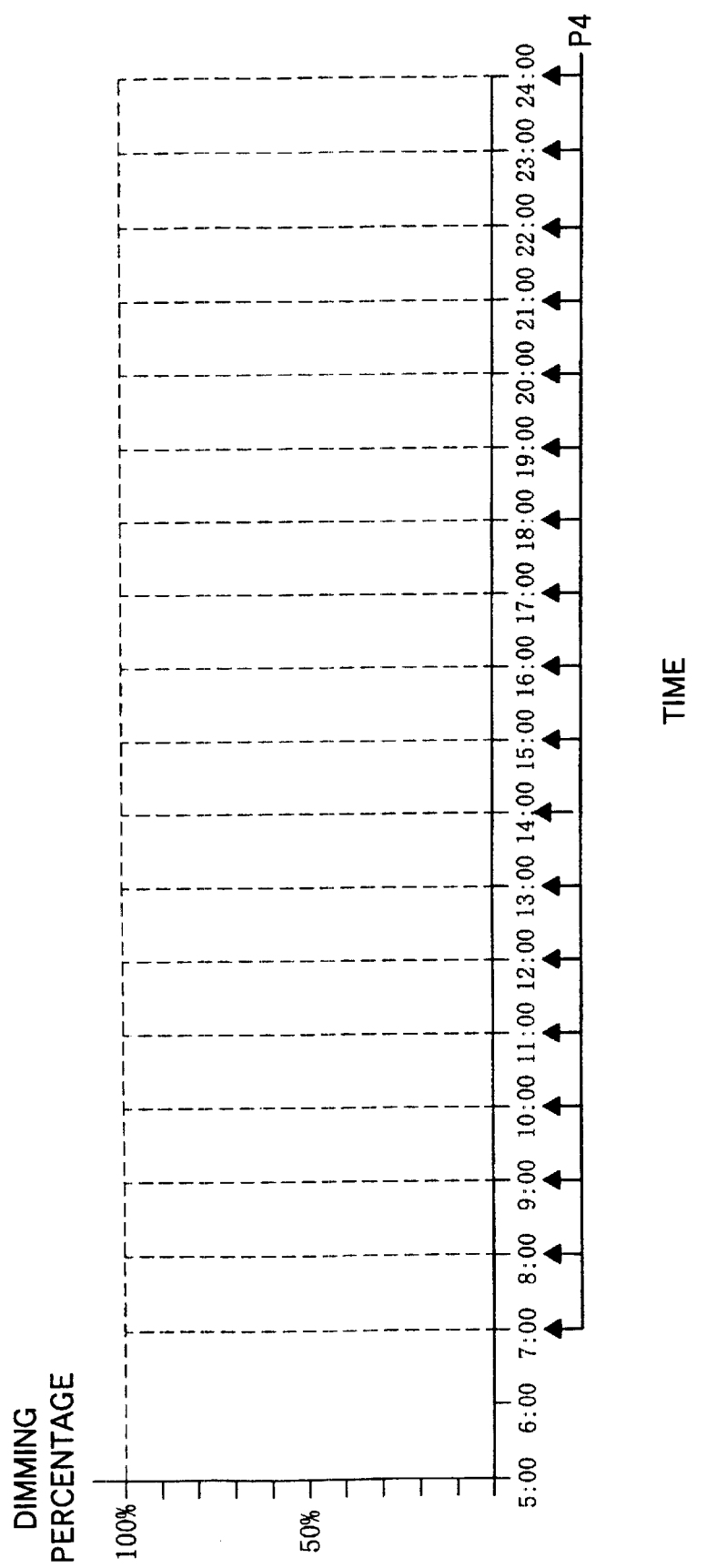
FIG. 36 is a schematic representation of the operation of the embodiment of the invention.

On the other hand, on office holidays, namely, Saturday, Sunday, and special day 1, when the time reaches 7:00, the microcomputer 102 executes timer control following the control program with the program number 7 for turning off the illumination loads L (pattern P4), as shown in FIG. 36. In the control program with the program number 7, REPETITION at one-hour interval time is selected as the control mode. Thus, for example, if an employee working in the office on a holiday forgets in turning off the illumination loads L and leaves the office, the microcomputer 2 executes timer control for turning off the illumination loads L again every hour on the hour from 7:00 to 24:00, so that if the employee forgets in turning off the illumination loads L as described above, the illumination loads L can be prevented from being turned on wastefully for saving energy.

Figure 37:
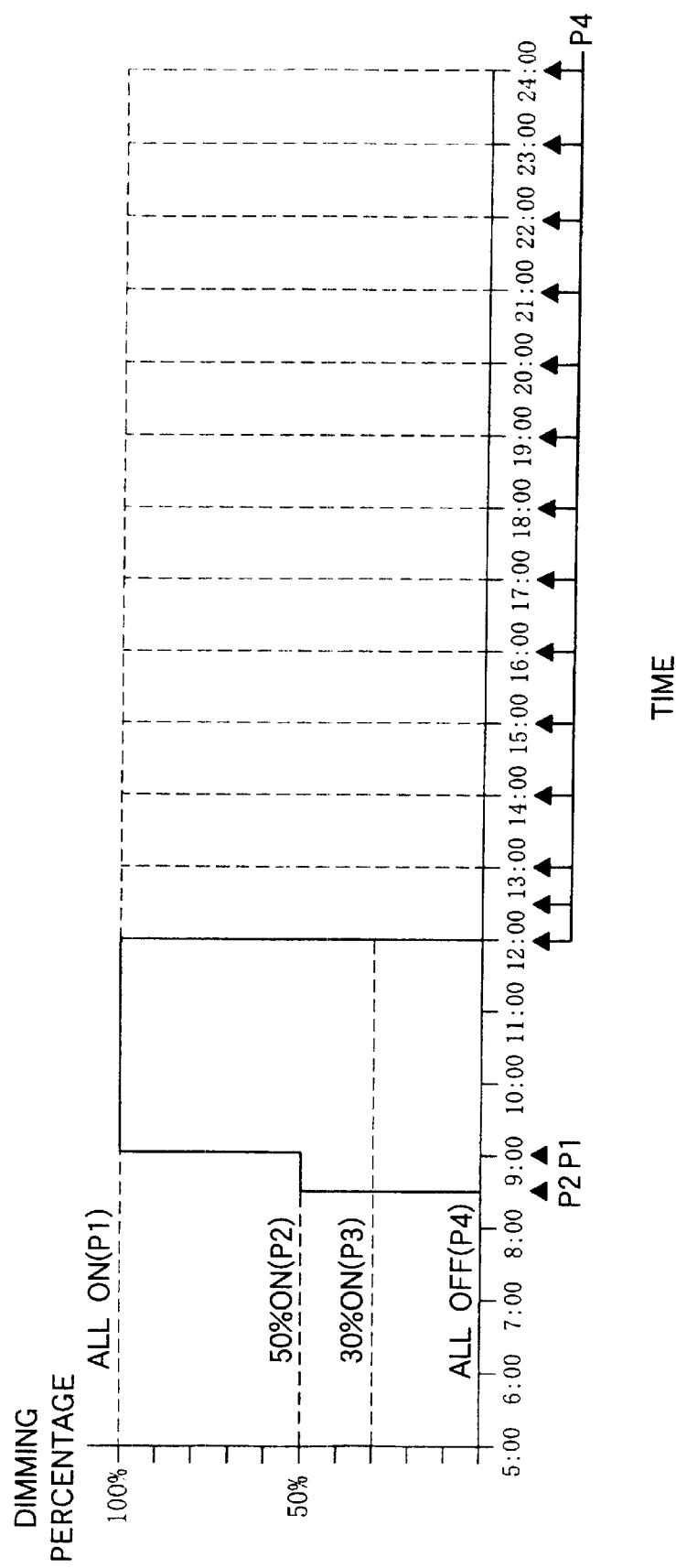
FIG. 37 is a schematic representation of the operation of the embodiment of the invention.

If a half-working day (9:00 to 12:00) is set to the special day 2, as shown in FIG. 37, when the time reaches 8:30, the microcomputer 102 executes timer control following the control program with the program number 1 for turning on the illumination loads L at a dimming percentage of 50% (pattern P2) and when the time reaches 9:00, the microcomputer 2 executes timer control following the control program with the program number 2 for turning on all illumination loads L (pattern P1). Further, when the time reaches 12:00 and the work time is finished, the microcomputer 102 executes timer control following the control program with the program number 8 for turning off the illumination loads L (pattern P4). In the control program with the program number 8, REPETITION at one-hour interval time is selected as the control mode. Thus, for example, if an employee working overtime after the work time forgets in turning off the illumination loads L and leaves the office, the microcomputer 102 executes timer control for turning off the illumination loads L again every hour on the hour from 12:00 to 24:00, so that if the employee forgets in turning off the illumination loads L as described above, the illumination loads L can be prevented from being turned on wastefully for saving energy.

As described above, in the program timer unit A of the embodiment, when the current time of the real-time clock 104 matches the time set in the control program read from the memory 103, the microcomputer 102, the timer control means, generates supervisory data in sequence and sends the supervisory data through the transmission signal transmission-reception circuit 105 to the transmission unit 130 via the signal line Ls for performing timer control of the illumination loads L. Thus, the program timer unit A can be connected directly to the signal line and built in the system without using any contact input terminal required in the related art example, and costs and the installation space can be reduced. The microcomputer 102, the program creation means, can create a weekly program in which the control time and the control contents of the illumination loads L are set for each day of the week and a special-day program in which the control time and the control contents of the illumination loads L are set for special date and time, thus different control times and control contents can be set for each day of the week according to the weekly program and for a special day such as a holiday, a special-day program can be created for setting different control times and control contents from those on usual days of the week; administration of the system can be facilitated.

By the way, the program timer unit of the embodiment comprises the synchronous input section 111 to which a time correction signal input via an electric wire from the outside on the hour and the synchronous output section 112 for outputting a time correction signal via an electric wire to the outside on the hour. When the time correction signal is input from the synchronous input section 111 to an input port, the microcomputer 102 corrects the time counted by the real-time clock 104 based on the time correction signal. The time correction signal is output from any other timer machine, clock, etc., for example. Since the time counted by the real-time clock 104 is corrected on the hour based on the time correction signal, the precision of the current time can be enhanced and the time lag can be prevented from occurring between the program timer unit and any other timer machine. The microcomputer 102 can also output the time correction signal input through the synchronous input section 111 from an output port for transfer to an external machine through the synchronous output section 112, whereby the time lag can be more reliably prevented from occurring between the program timer unit and any other timer machine.

What is claimed is:

1. A program timer used with a remote supervisory control system comprising:

a plurality of terminals including unique addresses, the terminals being connected to a signal line, a transmission signal being transferred according to a time-division multiplex transmission system between a transmission unit connected to the signal line and the terminals, and load connected to another terminal can be controlled in response to supervisory input to one of the terminals using the address correspondence;

a program storage section for storing a set of the address related to the load to be controlled and the control contents and the control time of the load as a time schedule;

a setting and operation section for setting the control contents and the control time by address and setting a time schedule in said program storage section;

a clock section for counting the current time, and a signal processing section, when the control time in each time schedule stored in said program storage section matches the current time counted by said clock section, for functioning as a terminal with the control contents in the time schedule as supervisory input with the address in the time schedule as the address.

2. The program timer as claimed in claim 1, wherein said time schedules corresponding to a plurality of days are stored in said program storage section on a daily basis and wherein a basic time schedule repeatedly used and a special-day time schedule other than the basic time schedule can be set as the time schedules, said program timer further including a special-day specification terminal to which external contact input of no voltage can be connected for specifying which of the basic time schedule and the special-day time schedule is to be used.

3. The program timer as claimed in claim 1, wherein said time schedules corresponding to a plurality of days are stored in said program storage section on a daily basis, wherein the time schedules sets as a basic time schedule repeatedly used and a special-day time schedule other than the basic time schedule, said signal processing section includes a schedule mode flag for specifying which of the basic time schedule and the special-day time schedule is to be used, and wherein when the address of a transmission signal transmitted via the signal line matches the address related to the schedule mode flag, said signal processing section switches the schedule mode flag in response to the control contents of the transmission signal.

4. The program timer as claimed in claim 1, wherein time schedules corresponding to a plurality of days are stored in said program storage section on a daily basis, wherein the time schedules sets as a basic time schedule repeatedly used and a special-day time schedule other than the basic time schedule, and wherein if a schedule mode flag is set so as to specify the special-day time schedule before the current time counted by said clock section reaches a specific time, said signal processing section automatically switches the schedule mode flag to setting of indicating the basic time schedule at the specific time.

5. The program timer as claimed in claim 1 further comprising:

a timer control stop terminal to which external contact input of no voltage can be connected for selecting load control based on the time schedule or stopping the load control based on the time schedule.

6. The program timer as claimed in claim 1 wherein said signal processing section includes a control mode flag for selecting load control based on the time schedule or stopping the load control based on the time schedule and when the address of a transmission signal transmitted via the signal line matches the address related to the control mode flag, said signal processing section switches the control mode flag in response to the control contents of the transmission signal.

7. The program timer as claimed in claim 1 wherein said signal processing section includes a control mode flag for selecting load control based on the time schedule or stopping the load control based on the time schedule and if the control mode flag is set so as to specify stopping the load control based on the time schedule before the current time counted by said clock section reaches a specific time, said signal processing section automatically switches the control mode flag to setting of specifying the load control based on the time schedule at the specific time.

8. The program timer as claimed in claim 1 wherein when the address of a transmission signal transmitted via the signal line matches the address set as a synchronous address, said signal processing section instructs said clock section to adjust the current time to a stipulated time.

9. The program timer as claimed in claim 1 further comprising:

a program-by-time-zone storage section for storing a set of one operation address by time zone related to a terminal receiving supervisory input, at least one control address by time zone related to the load to be controlled, and a time zone using the control address by time zone as time zone control data, wherein when the address of a transmission signal transmitted via the signal line matches the operation address by time zone, said signal processing section functions as a terminal with the control contents specified by the supervisory input as supervisor input with the control address by time zone paired with the operation address by time zone as the address in the time zone containing the current time counted by said clock section and if either of the operation address by time zone and the control address by time zone is unset, said signal processing section does not function as a terminal.

10. The program timer as claimed in claim 1, wherein said setting and operation section has a function of setting the number of repetitions and the time interval of placing the load in the same control state as a time schedule.

11. The program timer as claimed in claim 1 further comprising:

a daylight saving time terminal to which external contact input of no voltage can be connected for selecting a mode of advancing the current time counted by said clock section by a given time or a mode of restoring the time to the former time mode.

12. The program timer as claimed in claim 1 further comprising:

a daylight saving time flag for selecting a mode of advancing the current time counted by said clock section by a given time or a mode of restoring the time to the former time mode, wherein when the address of a transmission signal transmitted via the signal line matches the daylight saving time address related to the daylight saving time flag, said signal processing section switches the daylight saving time flag in response to the control contents of the transmission signal.

13. A program timer unit used with a remote supervisory control system comprising:

an operation terminal and a control terminal each having a unique address are connected to transmission unit via a two-wire signal line, data being transmitted and received with a time-division multiplex transmission signal, the transmission unit sending a transmission signal containing address data to the signal line to access the operation terminal and the control terminal separately, and upon reception of supervisory data from the operation terminal with supervisory input in a signal return period setting in synchronization with the transmission signal, the transmission unit generating control data based on the supervisory input and transmitting the control data to the control terminal having preset address correspondence with the operation terminal generating the supervisory data for controlling load connected to the control terminal;

input means for inputting data containing load control time and control contents;

program creation means for creating a load control program based on the data input through said input means;

storage means for storing the created control program;

clock means for counting the current time;

transmission signal transmission-reception means for transmitting and receiving a transmission signal to and from the transmission unit via the signal line; and timer control means for generating supervisory data in sequence based on the current time data output from said clock means and the control program read from said storage means and causing said transmission signal transmission-reception means to send the generated supervisory data to the signal line.

14. The program timer unit used with the remote supervisory control system as claimed in claim 13 further comprising:

a cabinet for housing said input means, said program creation means, said storage means, said clock means, said transmission signal transmission-reception means, said timer control means said means, respectively, the cabinet being formed as dimensions corresponding to dimensions of circuit breaker for agreement type wiring for light distribution panelboard.

15. The program timer unit used with the remote supervisory control system as claimed in claim 13, wherein said program creation means creates a weekly program in which the load control time and control contents are set for each day of the week and a special-day program in which the load control time and control contents are set for special date and time.

16. The program timer unit used with the remote supervisory control system as claimed in claim 13, further comprising:

display means for displaying at least items of data that can be input through said input means.

17. The program timer unit used with the remote supervisory control system as claimed in claim 13, wherein data of sunset times and sunrise times for each district is stored in said storage means and wherein said program creation means reads the data of the sunset times and the sunrise times in the district specified through said input means from said storage means and creates a control program based on the read data.

18. The program timer unit used with the remote supervisory control system as claimed in claim 17, wherein the Japan area is divided into a plurality of districts and data of yearly sunset times and sunrise times in each district is stored in said storage means.

19. The program timer unit used with the remote supervisory control system as claimed in claim 13, further comprising:

synchronous signal input/output means for inputting and outputting a time correction signal from and to the outside at least on the hour, wherein the current time of said clock means is corrected based on the time correction signal input from the synchronous signal input/output means on the hour.

* * * * *